United States Patent [19]

Law et al.

[11] 4,012,719

[45] Mar. 15, 1977

[54] COMMUNICATION MULTIPLEXER MODULE

[75] Inventors: Wendell A. Law, Kaysville; William G. Barrett, Bountiful; Norman F. Priebe; Harry D. Wise, both of Salt Lake City, all of Utah

[73] Assignee: Sperry Rand Corporation, New York, N.Y.

[22] Filed: Apr. 11, 1975

[21] Appl. No.: 567,479

[52] U.S. Cl. .......................................... 340/172.5

[51] Int. Cl.² .......................................... G06F 3/00

[58] Field of Search .............. 340/172.5; 179/15 A, 179/15 BA; 445/1

[56] References Cited

UNITED STATES PATENTS

| | | | |
|---|---|---|---|
| 3,599,160 | 8/1971 | Nestle et al. | 340/172.5 |
| 3,618,037 | 11/1971 | Wollum et al. | 340/172.5 |
| 3,699,525 | 10/1972 | Klavins | 340/172.5 |
| 3,828,325 | 8/1974 | Stafford et al. | 340/172.5 |
| 3,842,405 | 10/1974 | Key et al. | 340/172.5 |
| 3,863,226 | 1/1975 | Ryburn | 340/172.5 |

*Primary Examiner*—Charles E. Atkinson

*Attorney, Agent, or Firm*—Griffin, Branigan and Butler

[57] ABSTRACT

A communications multiplexer module (CMM) assembles serial by bit data from a plurality of input ports into parallel-by-bit characters before transmitting them to a host computer. On output operations the host computer supplies characters parallel-by-bit to the communications multiplexer module and the module disassembles the characters into serial by bit data for distribution to output ports. The CMM includes a main memory for storing control words, there being one control word for each port. The main memory is scanned in a fixed sequence so that the control words are read out of the main memory in the same sequence that the input and output multiplexers for the ports are scanned. This permits most of the logic circuits of the CMM to be time shared between all ports the logic circuits being controlled in turn by each control word. Any port may be an input or an output port, the designation being determined by bits of the control word associated with the port. The control word also contains bits designating whether the port is to function in association with a synchronous or an asynchronous line adapter connected to the port, the number of bits in each character, and other information necessary for assembling input or disassembling output data and controlling the transfers between the ports and the computer. The control word has a character assembly/disassembly area where characters are assembled a bit at a time during input operations, and are disassembled a bit at a time during output operations. Characters are transferred between the assembly/disassembly area and the host computer through a storage area in the control word. Character detect tables are provided for sensing each input character after assembly, or each output character before disassembly and, if it is a control character, converting it into a standard control word code used within the CMM. The outputs from the character detect table control certain hard wired functions and, in addition, may address a second memory containing a plurality of control interpretation tables. In the character interpretation tables, each bit represents a specific function to be performed within the CMM. The control word associated with each port contains bits designating which character detect table and which control interpretation table is to be utilized with the port. This enables the CMM to recognize and respond to control functions in a uniform manner, even though the functions themselves may be represented by characters in different codes. Programmable procedure counters are provided for detecting various conditions such as a failure to detect an end character. Full error checking procedures are included in the CMM.

10 Claims, 55 Drawing Figures

COMMUNICATION MULTIPLEXER MODULE

BRIEF SUMMARY OF THE INVENTION

This invention relates to communications multiplexer modules of the type used to provide an interface between a plurality of remote terminals and a host computer. The remote terminals may operate at different data rates, in different codes, or they may be synchronous or asynchronous or have other diverse characteristics.

In the prior art, it has been conventional to provide a communications multiplexer module (CMM) for serving a plurality of input or output line adapters, and providing communications between these adapters and the host computer. However, in the past this has been done by providing the CMM with two types of ports, one type for connection to line adapters serving as input adapters and another type of port for connection to line adapters serving as output adapters. Furthermore, it has been conventional in the past to provide in each line adapter the means for performing longitudinal redundancy checks, vertical redundancy checks, and cyclic redundancy checks. Thus, one set of checking circuits has been required for each line adapter.

An object of the present invention is to provide a CMM wherein any port may serve as either an input port or an output port. A control memory is provided for storing control words, one word for each port. A scanner scans the ports and at the same time addresses the memory to read out the control word associated with that port. The control word contains a bit or bits for designating whether the multiplexer is to operate in the input or the output mode for that adapter. Data bits are received from the line adapters serial by bit and are assembled in an assembly/disassembly area of the control word. After each character is assembled it is transferred to the host computer interface. On output operations, characters are transferred one at a time from the host interface to the assembly/disassembly area where they are disassembled and transferred one bit at a time to the line adapter.

Parity checking of characters of longitudinal redundancy checking or cyclic redundancy checking of messages is accomplished by circuitry in the CMM that is time shared. This eliminates the necessity for having individual checking circuits in each of the line adapters. Therefore, a further object of this invention is to provide a CMM wherein common multiplexed circuitry is provided for performing various checks for a plurality of line adapters.

A further object of this invention is to provide character detection and control interpretation tables which are program loaded and provide a means whereby control characters received from a line adapter, or transferred to a line adapter, may be interpreted in the same way, even though the characters may be expressed in different codes. Each word transferred through the CMM is used to address one of four tables, the particular table being addressed being determined by bits within the control word. The tables are program loaded with the desired values and when a table is addressed a word is read out to perform certain hard wired functions and to possibly address a second set of tables. If the second set of tables is addressed, the particular table selected is also determined by predetermined bits in the control word. When the second set of tables is addressed, it reads out an N-bit word, each bit of the word being used to perform a specific function. The second set of tables is also program loaded. Therefore, any character expressed in any code may be utilized to perform any desired functions.

A further feature of the invention is the provision of a line procedure timer which is program controlled to function as a utility gross timer, a response timer, or a receive timer. The line procedure timer circuits operate in conjunction with a counting field in each control word and the timer is programmed by further bits within the control word to determine in which mode the circuits will operate. When operating as a gross timer, it detects long periods of inactivity on a communication channel. When operating as a response timer, it detects an invalid, or no response, from an adapter. When operating as a receive timer, it protects against non-recognition of an end character, such as ETB or ETX.

DETAILED DESCRIPTION OF THE INVENTION

Preliminary Considerations

Figure 1A:
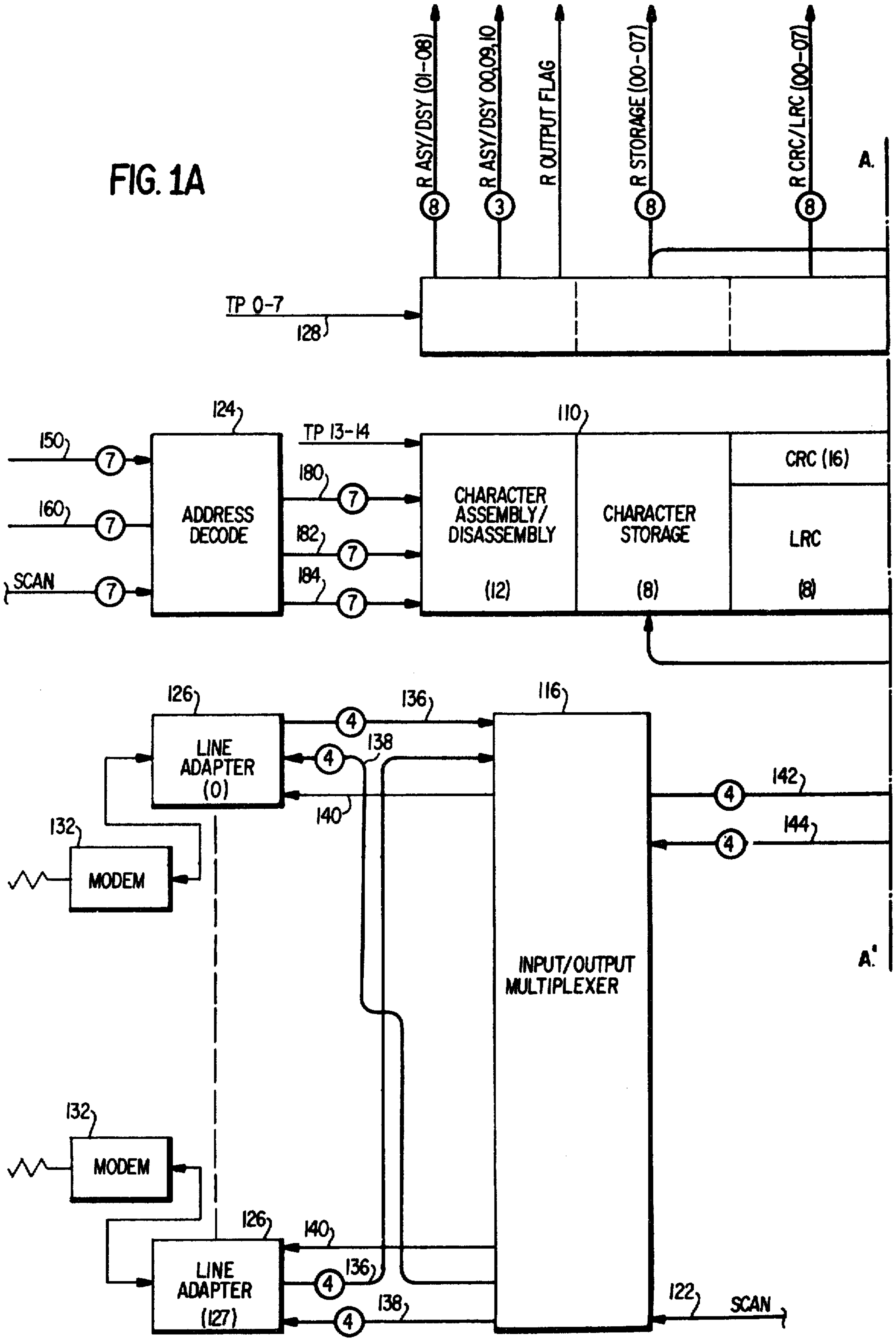
FIGS. 1A–1C, when arranged as shown in FIG. 1D, comprise a block diagram of a CMM employing the invention.

The following conventions are employed in the drawings and the following description.

All reference numerals have either three or four digits. For a three digit reference numeral, the first digit represents the figure where the element is located. For four digit reference numerals, the first two digits represent the figure where the element is located. There is one exception to this rule. Signal input leads to a figure bear a reference numeral which indicates the figure where the source of the signal is located. Those input leads with no reference numeral but having legends preceded by the letter R come from a holding register 112 as subsequently described.

A logical OR gating circuit is represented in the drawings by an O. These may be of two general types. An OR may be of the type which produces a high level output signal when any one of its inputs is at a low level, as illustrated by OR 206, or it may be of the type which produces a low level output signal when all of its inputs is at the high level, as illustrated by OR 774.

A logical AND gating circuit is represented by the letter A. An AND may be one of two general types. The first type produces a high level output signal when all inputs are at a low level, as illustrated by AND 905. The second type of AND produces a low level output signal when all of its inputs are at a high level, as illustrated by AND 909.

A circuit performing an inversion or the logical NOT function is represented by the letter N and the symbol XO designates a circuit for performing the Exclusive OR logic function. Again, the arrow designation on the input and output leads indicates the level of the input or output signal.

OVER-ALL SYSTEM — FIG. 1

Figure 1B:
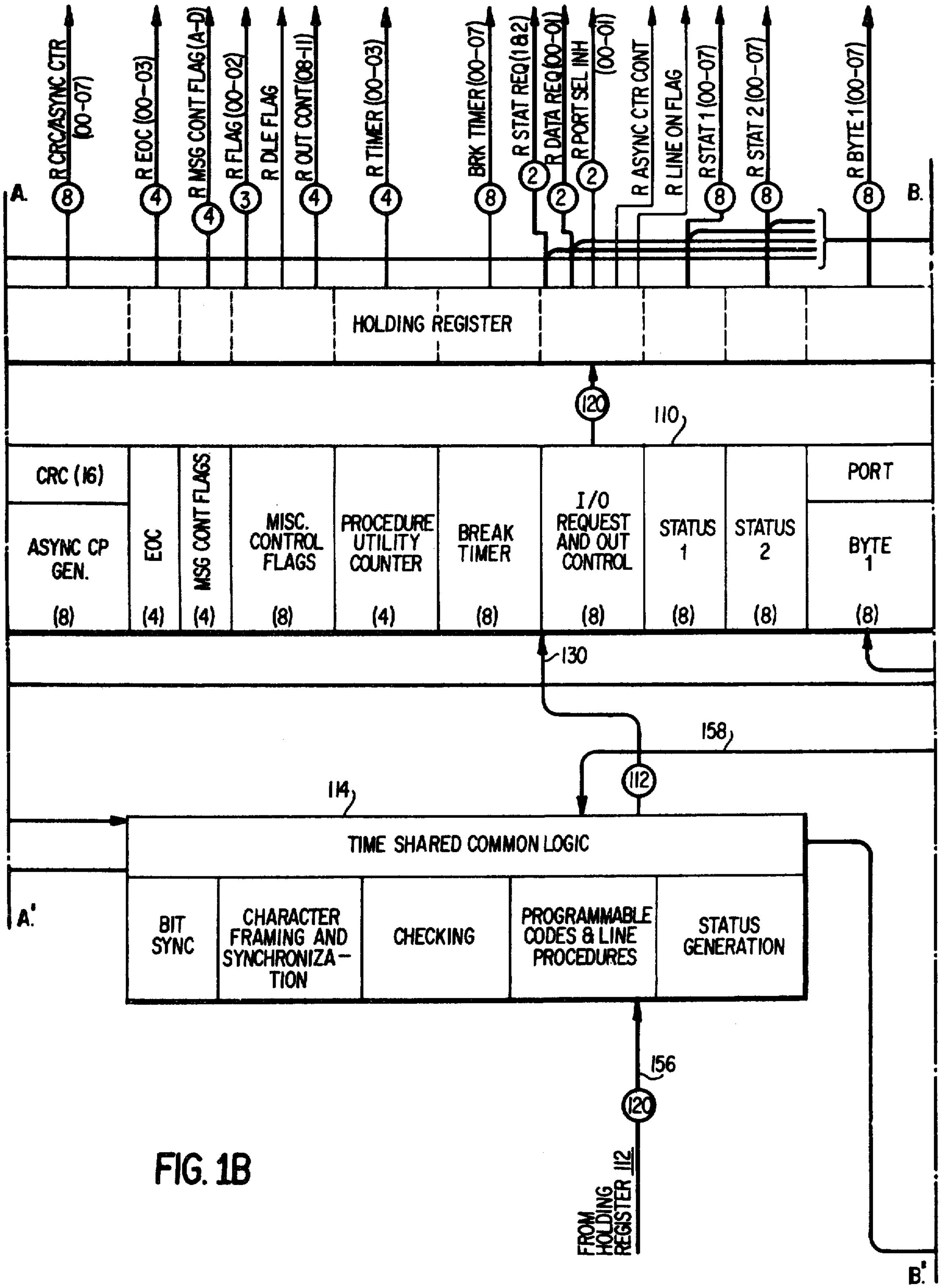
Figures 1C, 1D:
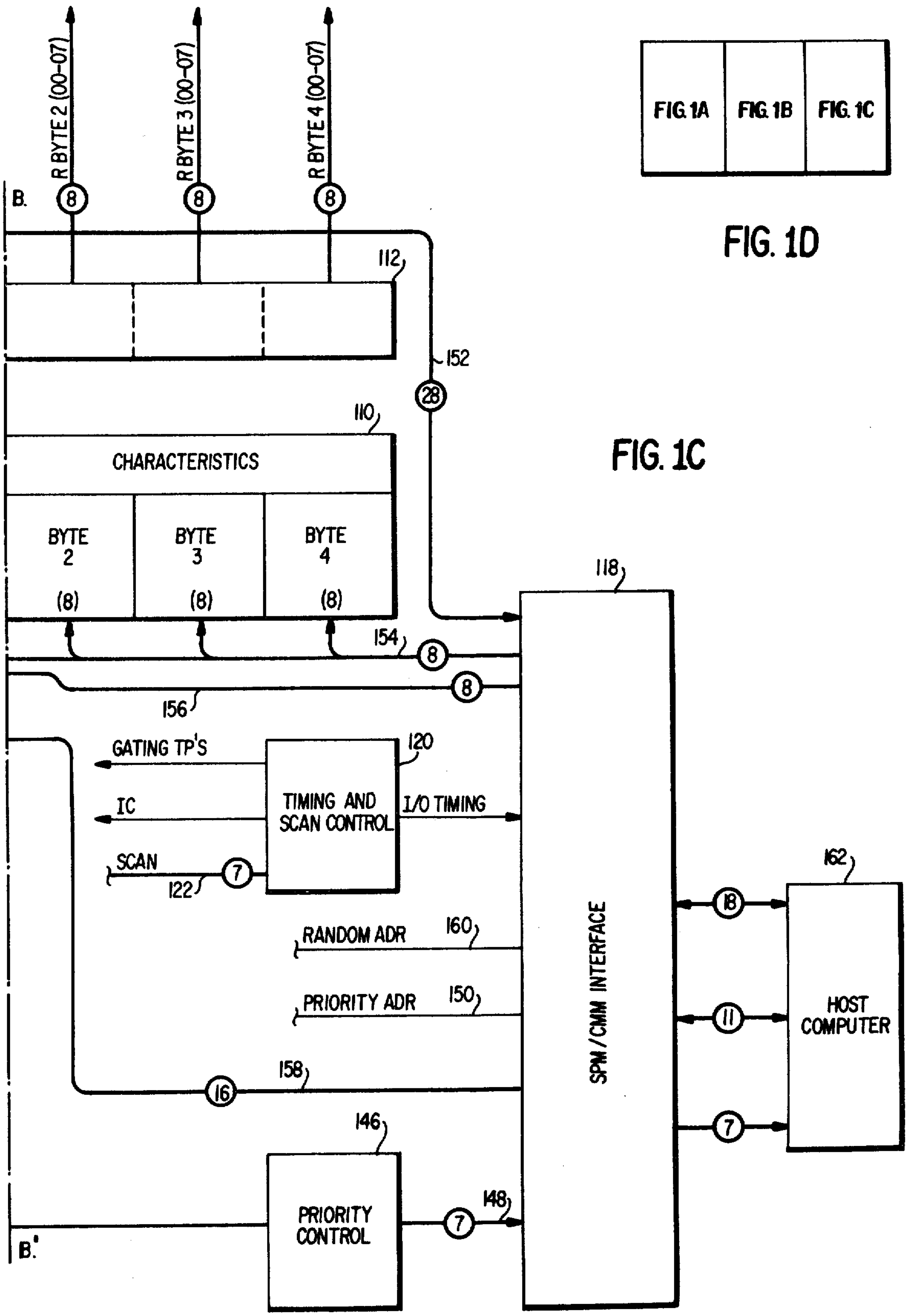

FIGS. 1A–1C, when arranged as shown in FIG. 1D, comprise a block diagram of a communications multiplexer module (CMM) embodying the principles of the present invention. Generally speaking, the CMM comprises a Main Memory 110, a Holding Register 112, a time shared common logic circuit 114, an Input/Output Multiplexer 116, and an SPM/CMM interface circuit 118.

Main Memory 110 stores a 120 bit control word for each port. Assuming a normal configuration of 128 ports, Main Memory 110 comprises 128 addresses, each capable of storing a 120 bit word. A timing and scan control circuit 120 sequentially generates addresses 0-127 on a bus 122 and these addresses are applied through an address decode circuit 124 to sequentially enable the addresses in Main Memory 110 for read out. The scan addresses on bus 122 are also applied to the input/output multiplexer 116 so as to sequentially enable communication with one of 128 line adapters 126, which are connected with the 128 output ports. Thus, each time a port is addressed, its corresponding control word is read out of memory.

The time allotted for the servicing of one port is defined as a minor cycle. Each minor cycle is divided into 16 intervals designated TP 0-15. At each TP 15, the scan address on bus 122 is incremented and another minor cycle begins. For the purpose of the present description it is sufficient to assume that the 128 addresses in Main Memory 110, are scanned sequentially, one after the other. In actual practice, provision may be made for scanning some ports at a greater frequency than other ports, because of the speed of the remote terminals connected to those ports. The time between one minor cycle for a given port, and the next minor cycle for that same port, comprises a major cycle.

When a particular control word is addressed, it is read out of Main Memory 110 and applied to Holding Register 112. This Holding Register comprises 120 latches which are enabled to receive the output from the memory during TP 0-7 of each minor cycle. The latches comprising Holding Register 112 are disabled from receiving further inputs from the memory at the end of time TP 7. However, the latches continue to hold the control word until TP 0 of the next minor cycle when the gating pulse on lead 128 again enables the latches to receive another control word.

The 120 bit output of the Holding Register 112 is applied to the time shared common logic circuit 114 from TP 0 of one minor cycle until the beginning of TP 0 of the next minor cycle. During this interval the contents of the Holding Register control the various functions performed by the time shared common logic. The time shared common logic during this interval, develops a 112 bit word on bus 130 which is returned to the memory at time TP 13-14 of the same minor cycle in which the word was read out of memory. Only port characteristic Byte 4 of the Main Memory receives no input from the time shared common logic over the bus 130.

Standard modems 132 receive data from, or transmit data to remote communications terminals. Each modem 132 is connected to a line adapter 126. Each line adapter is connected to the Input/Output Multiplexer 116 through a port comprising an input bus 136, an output bus 138 and a lead 140. The buses 136 provide status information from the line adapters, buses 138 supply commands to the line adapters, and the lines 140 select which line adapter is to receive the command on buses 138.

Multiplexer 116 is connected to the time shared common logic 114 by an input bus 142 and an output bus 144. Although buses 142 and 144 are shown as having four leads each, data input and output through the multiplexer 116 is on a serial by bit basis. As is conventional in such systems, the low order bit represents data if bit 3 on the bus is a 1.

Each control word in Main Memory 110 has a plurality of areas, each of these areas serving a different function. Although all of these areas are not used in connection with the present invention, they are shown in FIG. 1. The character assembly/disassembly area performs two main functions. During an input operation, characters are assembled in this area one bit at a time, one bit being added to the area and the preceding bits being shifted to the right each time the control word is read out, provided a data clock has been received from a modem through the line adapter. This clock is applied to FIG. 15 to generate the signal DATA CLOCK which is used throughout the CMM. The EOC area of the control word counts the number of data clocks and thus determines when a complete character has been assembled in the assembly/disassembly area. After a complete character has been assembled, it is transferred to the character storage area of the control word and a data input request is transmitted from the time shared common logic to a priority control circuit 146. When priority is allotted, the priority control circuit generates the address of the control word on bus 148 and this is transmitted to the SPM/CMM interface. The SPM/CMM interface circuits then generate the priority address on bus 150 and this address is applied through Address Decode circuits 124 to the memory to read out the character from the storage area. In addition to the character from the storage area, other portions of the control word are sampled at the output of the Holding Register 112 and transferred to the SPM/CMM interface circuit by way of bus 152. These areas include the Status Request and Data Request bits from the I/O Request area, and all bits of the Status 1 and Status 2 areas.

Once a character has been assembled in the assembly/disassembly area and transferred to the character storage area, the assembly/disassembly area is free to begin assembling a new character while the storage area waits for its input request to be acknowledged.

On an output operation, characters are loaded one at a time into the character storage area of a control word and then transferred to the character assembly/disassembly area where they are disassembled one bit at a time and transferred through the Time Shared Common Logic 114 and Multiplexer 116 to the line adapter associated with the control word. As soon as each character is transferred from character storage area to the character assembly/disassembly area, an output data request is made so that the SPM/CMM may load the character storage area with the next character while the previous character is being disassembled.

Eight bits of a control word are reserved for making a longitudinal redundancy check. In addition, 16 bits of the control word are reserved for making a cyclic redundancy check. Since the longitudinal redundancy check and the cyclic redundancy check areas of the control word overlap, only one of these checks may be carried out for a given port at any one time. However, the CMM may be programmed as subsequently explained to carry out the cyclic redundancy check for some ports, while at the same time carrying out a longitudinal redundancy check for other ports.

The CMM is designed such that it may operate with either synchronous or asynchronous devices, may operate in an input mode for some ports and an output mode for others, and may operate with ports receiving or sending characters expressed in different codes, and otherwise generally functioning with external devices having many diverse characteristics. The CMM is programmed so as to determine which mode or modes it will operate in when servicing a particular port. General speaking, port characteristic Bytes 1, 2, 3 and 4 of each control word define the mode of operation of the CMM when servicing the port associated with that control word. The format of each of the Bytes 1 through 4 is given below. In considering the following formats it should be noted that, for the purpose of simplifying the present description, the asynchronous mode of operation of the CMM is not described, as are other features not comprising a part of the present invention.

Byte No. 1.

| Characteristics (7–6) | Modifiers (5–4) | Command Functions (3–0) |
|---|---|---|

COMMAND FUNCTIONS

| Bit 3210 | Data Line Adapters |
|---|---|
| 0000 | LA Clear |
| 0001 | Turn Off |
| 0010 | Enable Input |
| 0011 | New Sync |
| 010X | Enable Output |
| 011X | Enable Output & New Sync |
| 1000 | Disconnect |
| 1001 | Enable DSR Monitor |
| 1010 | LA Test |
| 1011 | Set Full Duplex |
| 1100 | |
| 1101 | Modem Test |
| 1110 | |
| 1111 | Set Busy |

MODIFIERS

| Bit 5 4 | Output | Input |
|---|---|---|
| 0 0 | Line Off (Marking) | Line Off (Ring Disabled) |
| 0 1 | Normal Data | Normal Input (Ring Enabled) |
| 1 0 | Send Space | Look for Sync |
| 1 1 | Send Idle | Rate Search (ADRD) |

CHARACTERISTICS

Bit 7 6 Synchronous
- 0 Input (specific start character
- 1 Input (any non-syn start)
0 - Output (2 pads + 2 syn's)
1 - Output (4 syn's)

The command functions and modifiers are essentially independent with command functions being interpreted by the line adapters and modifiers being interpreted by the CMM. The loading of Byte No. 1 to perform useful functions must consider potential conflicts between command and modifier actions, however.

Byte No. 2.

| CD Table Select (7–6) | Character Length (5–4) | (3–0) |
|---|---|---|

| Bit 5 4 | Character Length (excluding parity) |
|---|---|
| 0 0 | 5 bits/char. |
| 0 1 | 6 bits/char. |
| 1 0 | 7 bits/char. |
| 1 1 | 8 bits/char. (parity is not allowed) |

| Bit 7 6 | Character Detection (CD) Table Select |
|---|---|
| 0 0 | Table 1 |
| 0 1 | Table 2 |
| 1 0 | Table 3 |
| 1 1 | Table 4 |

Byte No. 3.

| CI Table Select | | Start Char. inclusion in BCC | Parity Functions |
|---|---|---|---|
| 7 6 | 5 | 4 | 3 0 |

PARITY FUNCTIONS

| Bit 3 2 1 0 | VRC | Control Char. | LRC | LRC Parity | CRC* |
|---|---|---|---|---|---|
| 0 0 0 0 | | No Parity | Checking | | |
| 0 0 0 1 | Odd | Even | | | |
| 0 0 1 0 | Odd | Odd | | | |
| 0 0 1 1 | Even | Even | | | |
| 0 1 0 0 | Even | Odd | | | |
| 0 1 0 1 | Even | Even | Even | Even | |
| 0 1 1 0 | | | SPARE | | |
| 0 1 1 1 | | | SPARE | | |
| 1 0 0 0 | Odd | Even | Even | Even** | |
| 1 0 0 1 | Odd | Odd | Even | Odd | |
| 1 0 0 1 | Odd | Odd | Even | Odd | |
| 1 0 1 0 | Odd | Odd | Even | Even | |
| 1 0 1 1 | Odd | Odd | Even | Odd | |
| 1 1 0 0 | Odd | Odd | | | No. 1 |
| 1 1 0 1 | | | | | No. 1,4*** |
| 1 1 1 0 | | | | | No. 2 |
| 1 1 1 1 | | | | | No. 3 |

*CRC
No. 1 $X^{16} + X^{15} + X^{2} + 1$
No. 2 $X^{16} + X^{12} + X^{5} + 1$
No. 3 16 bit Strap Selected (RPQ)
No. 4 $X^{12} + X^{11} + X^{3} + X^{2} + X^{1} + 1$
**LRC character parity is not checked on input.
***Use of CRC 1 or 4 is determined by bits 5 and 4 of Byte 2. For BSC, this choice enables transmission of SYN-SYN or DLE-SYN once per second.

| Bit 4 | Inclusion of Start Character in BCC |
|---|---|
| 0 | Start Char. Excluded. |
| 1 | Start Char. Included. |

Stop character accumulation in BCC is determined by CI bit 8. Bit 4 and CI bit 8 apply only to non-transparent operation.

| Bit 5 | Not used. |
|---|---|
| **Bit 7 6** | **Control Interpretation Table** |
| 0 1 | Table 1 |
| 0 1 | Table 2 |
| 1 0 | Table 3 |
| 1 1 | Table 4 |

Byte No. 4.

| Diagnostic Control | Syn/Async Clock | D/T | Sy/Async | R/G |
|---|---|---|---|---|
| 7 4 | 3 | 2 | 1 | 0 |

where,

Bit 0 = 0 for Gross Timer function = 1 for Response/-Receive Timer function

Bit 2 = 0 for Line Procedure Timer function = 1 for Diagnostic Control functions Bits 1 and 3 are encoded as follows:

| Bit 3 | Bit 1 | Meaning |
|---|---|---|
| 0 | 0 | Asynchronous Operation (int. clock) (not used) |
| 0 | 1 | Synchronous Operation or dialer |
| 1 | 0 | Asynchronous (external clock) (not used) |
| 1 | 1 | Spare |

Bits 4–7 are encoded as shown in the following tables.

| Bit 7 6 5 4 | Timer Increment | Timer Duration (seconds)* Max. | Min. |
|---|---|---|---|
| 0 0 0 0 | — | Timer Stopped | Timer Stopped |
| 0 0 0 1 | — | Timer Stopped | Timer Stopped |
| 0 0 1 0 | .071 | 1.42 | .071 |
| 0 0 1 1 | .071 | .213 | .142 |
| 0 1 0 0 | .071 | .284 | .213 |
| 0 1 0 1 | .284 | .568 | .284 |
| 0 1 1 0 | .284 | .852 | .568 |
| 0 1 1 1 | .284 | 1.136 | .852 |
| 1 0 0 0 | .284 | 1.420 | 1.136 |
| 1 0 0 1 | 1.136 | 2.343 | 1.420 |
| 1 0 1 0 | 1.136 | 3.479 | 2.556 |
| 1 0 1 1 | 1.136 | 4.615 | 3.692 |
| 1 1 0 0 | 1.136 | 5.751 | 4.828 |
| 1 1 0 1 | 1.136 | 6.887 | 5.964 |
| 1 1 1 0 | 1.136 | 8.023 | 7.100 |
| 1 1 1 1 | 1.136 | 9.159 | 8.236 |

*Response/Receive Timer if bit 2 = 0, Bit 0 = 1 and Control bit 9 = 0; Utility Timer if bit 2 = 0, bit 0 = 1, Control Bit 9 = 1 and output mode is programmed.

| Bit 7 6 5 4 | Timer Increment | Gross Timer Duration (seconds)* Max. | Min. |
|---|---|---|---|
| 0 0 0 0 | — | Timer Stopped | Timer Stopped |
| 0 0 0 1 | — | Timer Stopped | Timer Stopped |
| 0 0 1 0 | 1.136 | 2.272 | 1.136 |
| 0 0 1 1 | 1.136 | 3.408 | 2.272 |
| 0 1 0 0 | 1.136 | 4.544 | 3.408 |
| 0 1 0 1 | 1.136 | 5.680 | 4.544 |
| 0 1 1 0 | 1.136 | 6.816 | 5.680 |
| 0 1 1 1 | 1.136 | 7.952 | 6.816 |
| 1 0 0 0 | 1.136 | 9.088 | 7.952 |
| 1 0 0 1 | 1.136 | 10.224 | 9.088 |
| 1 0 1 0 | 1.136 | 11.360 | 10.224 |
| 1 0 1 1 | 1.136 | 12.496 | 11.360 |
| 1 1 0 0 | 1.136 | 13.632 | 12.496 |
| 1 1 0 1 | 1.136 | 14.768 | 13.632 |
| 1 1 1 0 | 1.136 | 15.904 | 14.768 |
| 1 1 1 1 | 1.136 | 17.040 | 15.904 |

*Bit 2 = 0, bit 0 = 0, Control Bit 9 = 0.

| Bit 7 6 5 4 | Timer Increment | Utility Timer Duration (milliseconds)* Max. | Min. |
|---|---|---|---|
| 0 0 0 0 | — | Timer Stopped | Timer Stopped |
| 0 0 0 1 | — | Timer Stopped | Timer Stopped |
| 0 0 1 0 | 17.76 | 35.52 | 17.76 |
| 0 0 1 1 | 17.76 | 53.28 | 35.52 |
| 0 1 0 0 | 17.76 | 71.04 | 53.28 |
| 0 1 0 1 | 17.76 | 88.80 | 71.04 |
| 0 1 1 0 | 17.76 | 106.56 | 88.80 |
| 0 1 1 1 | 17.76 | 124.32 | 106.56 |
| 1 0 0 0 | 17.76 | 142.08 | 124.32 |
| 1 0 0 1 | 17.76 | 159.84 | 142.08 |
| 1 0 1 0 | 17.76 | 177.60 | 159.84 |
| 1 0 1 1 | 17.76 | 195.36 | 177.60 |
| 1 1 0 0 | 17.76 | 213.12 | 195.36 |
| 1 1 0 1 | 17.76 | 230.88 | 213.12 |
| 1 1 1 0 | 17.76 | 248.64 | 230.88 |
| 1 1 1 1 | 17.76 | 266.40 | 248.64 |

*Bit 2 = 0, bit 0 = 0, Control Bit 9 = 1, and output mode.

As an example of programming a particular port, assume that it is desired to operate in the input mode with a synchronous device. In this case, Byte 1, bits 3, 2, 1 and 0, should be 0010 while bits 5 and 4 should be 01, to thus define an input mode. Byte 4, bits 3 and 1 should be 0 and 1 to define synchronous operation. If the incoming message comprises seven bit characters without parity, then Byte 2, bits 5 and 4 should be 1 and 0 to define the character lengths. If the only checking to be performed is a vertical redundancy check, (parity check) and parity is to be even for both control and non-control characters, Byte 3, bits 3-0 should be set to 0011. If a specific start character is required at the start of the message, Byte 1, bit 6 should be a 0.

From the above illustration, it should be obvious as to how the format given above for Bytes 1 through 4 may be utilized to control a port by loading a certain configuration of bits into the port characteristic byte areas.

Another area of each control word in Main Memory 110 is reserved for a procedure utility counter. This area is a storage area which may be incremented at certain intervals, while the control word is being applied to the time shared common logic 114, and the incremented value returned to the Main Memory. This timer may be programmed for many uses such as, for example, detecting no response from the terminal on input, or detecting failure to recognize an end character, such as ETB or ETX.

Other areas of each control word provide for the storage of message and other miscellaneous control flags which report the progress or status of the message and certain conditions existing with respect to the message.

Port characteristic Byte 1, 2, 3 and 4 are loaded in response to write commands from the SPM/CMM interface circuit 118. There are four write commands, one for each Byte. The information to be loaded into the byte area is transferred from the SPM/CMM to the Main Memory 110 over a bus 154. Loading is accomplished by random addressing of the Main Memory through Address Decode circuits 124.

As subsequently explained, the time shared common logic includes two programmable memories otherwise identified as the CD and CI tables. Two additional write commands are generated by the SPM/CMM to initially load these tables with the desired values. The SPM/CMM interface 188 generates a write command and places on the bus 158 a 16 bit word used to both address the memory and store the desired word in the addressed location.

SYNCHRONOUS DATA INPUT

As previously indicated, input data is loaded into the assembly/disassembly area of Memory 110 one bit at a time and the assembled bits are shifted to the right as each new bit is received. Because the incoming characters may be 5, 6, 7 or 8 bits in length, as specified by Byte 2, bits 04 and 05, the bit position of the assembly/-disassembly area into which the data is initially entered must be varied.

Figure 2:
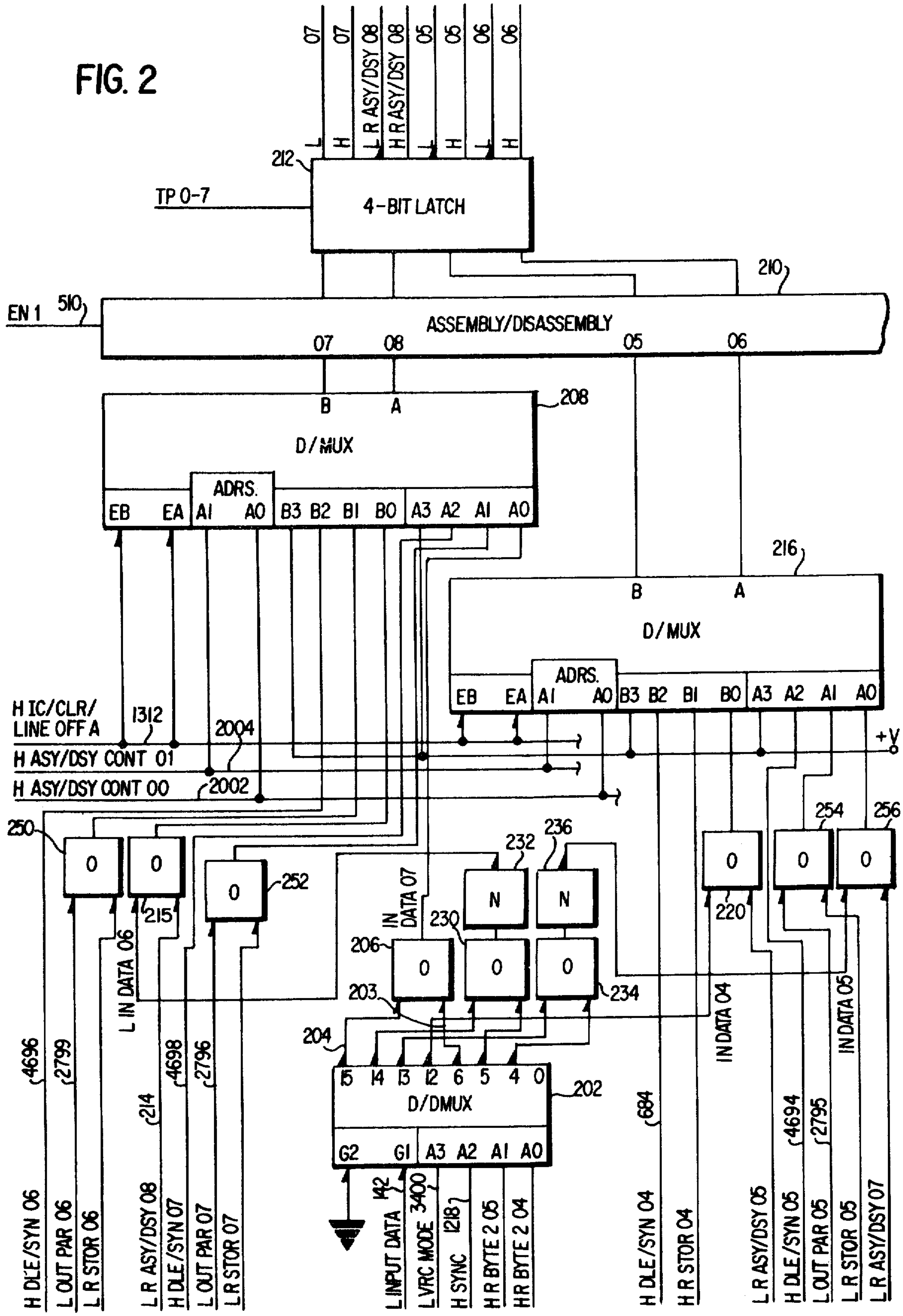
FIG. 2 is a logic diagram showing the path of data during an input operation.

FIG. 2 shows the path of the input data bit from the input multiplexer 116 to the assembly/disassembly area of Main Memory 110. The input data is applied to the G1 gating input of a Decoder/Demultiplexer (D/DMUX) 202. The G2 input of D/DMUX 202 is always at low level during synchronous operation, hence when the signal Input Data drops to the low level, the D/DMUX 202 produces an output signal on one of 16 output leads as determined by the combination of bits applied to the A0-A3 inputs. Some of the outputs are not shown since they are employed only during asynchronous operations. During synchronous input, the signal SYNC is at a high level and enables the A2 input of D/DMUX 202.

Consider first the case where the input data is in the form of eight bit characters without parity. In this case, Byte 2 bits 04 and 05 of the control word for the port being serviced, will be loaded with ones so that the signals applied to the A0 and A1 inputs of D/MUX 202 from the Holding Register 112 will be at high level when the control word is read out on the minor cycle that the port is being serviced. Furthermore, assuming that there is no parity bit to be checked, the signal VRC, obtained by decoding Byte 3, bits 0–3, holds input A3 of D/DMUX 202 at a high level. Under the assumed conditions, D/DMUX 202 produces a low level output signal on lead 204 that passes through an OR 206 to the A0 input of a decoder/Multiplexer (D/MUX) 208.

D/MUX 208 has 4 inputs A0–A3 which may be selectively connected to the A output, the A output being connected to the bit 08 input of the Assembly/Disassembly area 210 of the Main Memory 110. D/MUX 208 has four further inputs, B0–B3 which may be selectively connected to the B output and this B output is connected to the input of bit position 07 of the Assembly/Disassembly area. D/MUX 208 is addressed by the signals Assembly/Disassembly Control 01 and Assembly/Disassembly Control 00. These signals are applied to the A1 and A0 addressing inputs of the D/MUX. Depending upon the combination of signals applied to the A0 and A1 addressing inputs, inputs A0 and B0, A1 and B1, A2 and B2, or A3 and B3, are connected to the A and B outputs of the D/MUX. The A3 and B3 data inputs are tied to a high level voltage source. The signal IC/CLR/LINE OFF A is normally at the low level to enable D/MUX 208.

Writing into the Main Memory takes place at time TP13–14 when the signal ENABLE 1 is applied to the memory. Therefore, at each time TP 13–14, the input data bit passes through OR 206 to the A output of D/MUX 208, and from that output is stored in bit position 8 of the Assembly/Disassembly area.

It should be understood that a particular control word is addressed only once during each major cycle. The addressing inputs to Assembly/Disassembly area 210 are not shown in FIG. 2, for simplification, but are shown in FIG. 1A. When the first input data bit is written into Assembly/Disassembly area 210 of a control word, it remains in position 08 for one major cycle until the same control word is again addressed. Then, at TP 0–7 of the minor cycle in which the control word is next addressed, the four bit latch 212, which comprises four positions of the 120 bit Holding Register 112, is enabled and loaded with the contents of bits 08, 07, 06, and 05 of the Assembly/Disassembly Area of the control word. Although the enabling signal for the latch is terminated at TP 7, the latch retains the data stored therein until the next TP 0.

When the next input data bit is received, it passes through D/MUX 202, OR 206 and D/MUX 208 and at time TP 13–14 it is stored bit position 08 of the Assembly/Disassembly Area 210. At the same time, the previously received bit, still stored in four bit latch 212, is applied over lead 214 and through OR 215 to the B0 input of D/MUX 208, so that it is entered into bit position 07 of the Assembly/Disassembly area at the same time the second input bit is loaded into bit position 08.

Figure 3:
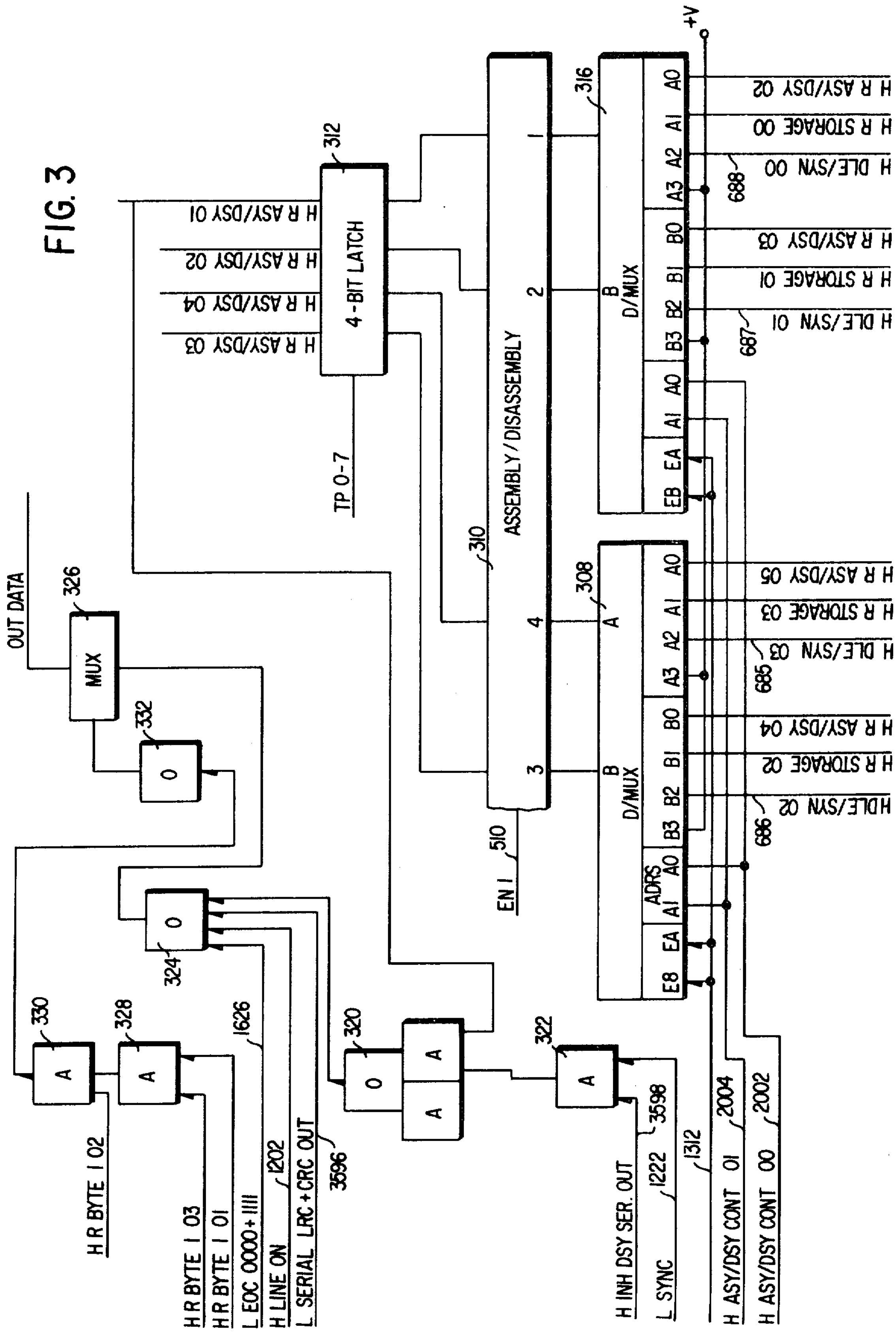
FIG. 3 is a logic diagram showing the path of data during an output operation.

On each minor cycle that the control word is addressed, the incoming data bit, if there is a data clock, is loaded into bit position 8 of the Assembly/Disassembly area and the bits already stored therein are shifted one position to the right. This sequence of operations continues until a complete character of 8 bits has been assembled. Thus, the complete character is assembled in the Assembly/Disassembly area at time TP 13–14 of the eighth data clock that the control word is addressed, with the 4 high order bits being stored in that portion 210 of the Assembly/Disassembly register shown in FIG. 2, and the 4 low order bits being stored in that portion of the Assembly/Disassembly Area 310. As shown in FIG. 3, the 4 low orders of the Assembly/-Disassembly Area receive data through two D/MUX's 308 and 316 in the same manner as the high order positions receive data through D/MUX's 208 and 216. D/MUX's 308 and 316 and enabled and addressed by the same signals that address and enable D/MUX's 208 and 216. The four low order bits of the Assembly/-Disassembly Area can have data written therein only upon occurence of the signal ENABLE 1, as with the high order bits. The four low order bits of the Assembly/Disassembly Area are read out into a 4 bit latch 312, (part of Holding Register 112) during TP 0–7 of a minor cycle and remain stored in the latch until TP 0 of the next minor cycle.

After the complete character has been assembled, it is transferred from the Assembly/Disassembly area 210–310 to the 8 bit Storage Area 410 of the Main Memory 110. In addition, a request signal is generated and applied to the priority control 146 to inform the SPM that the port has a character ready for transfer.

Figure 4:
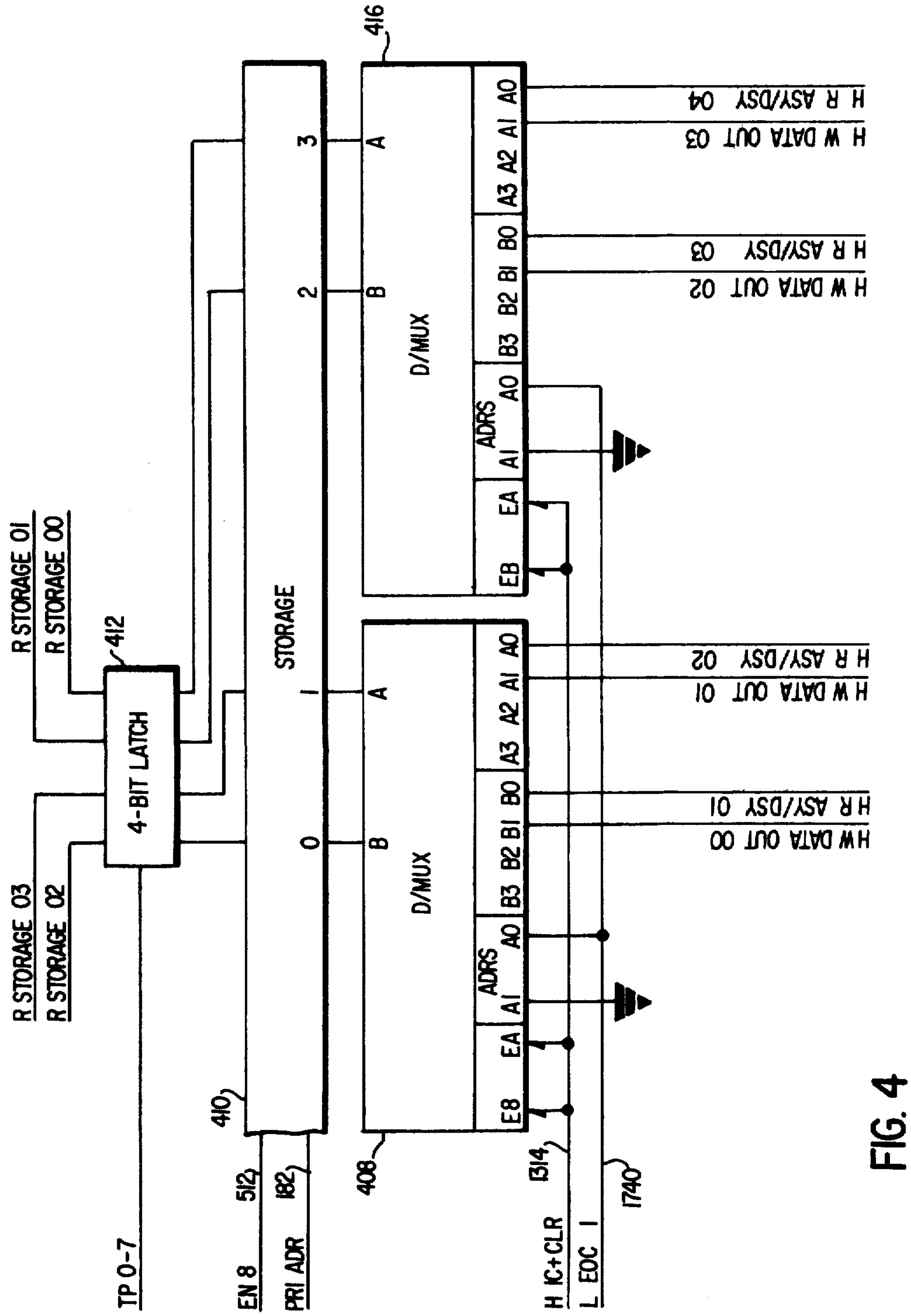
FIG. 4 shows the storage area of the main memory, and the input multiplexing thereto.

FIG. 4 shows only the four low order stages (03-00) of the storage area, the four high order stages being similar to those shown. Two D/MUX's 408 and 416 are provided for selectively gating data into the lower order stages of the storage area. The D/MUX's are enabled by the signal IC+CLR which is normally at a low level. The A1 addressing input of each D/MUX is tied to ground. The signal EOC 1 is applied to the A0 addressing input of the D/MUX's and this signal is normally at a high level. This enables the A1 and B1 inputs of the D/MUX's to be gated through to the storage area. However, these data inputs are normally at a low level, except when a character is being loaded into the storage area during an output operation. The contents of the Assembly/Disassembly area are applied the A0 and B0 inputs of the D/MUX's 408 and 416. The high level signal EOC normally blocks these inputs, but on the minor cycle which occurs one major cycle after a complete character has been assembled in the Assembly/-Disassembly area, the signal EOC 1 drops to the low level and the contents of the Assembly/Disassembly area are gated to the storage area. At TP 13–14 of this minor cycle, the signal ENABLE 8, enables the storage area so that the character from the Assembly/Disassembly area is written therein.

The contents of the storage area are read out to two 4 bit latches, one latch 412 being shown. The latches are part of Holding Register 112. The data is gated into the latches from the storage area by the timing pulse TP 0–7 and remains in the latches for one minor cycle.

It should be noted that the storage area, in addition to being addressed by the scan control in the normal manner, may be addressed by the output of the priority circuits for the purpose of transferring a completed input character to the SPM. The priority address on bus 182 may occur any time after the completed character has been transferred to the storage area. On the minor cycle in which it occurs, the completed character is read out of the storage area and through latches 412 to holding registers (not shown) for transfer to the SPM.

The preceding description assumed that the input character contained 8 bits without parity. If it contained 7 bits with parity, then the operation would have been essentially the same. However, under these conditions, the signal VRC Mode (FIG. 2) would be at the low level, as would the signal R Byte 2 04. D/DMUX 202 therefore would produce an output signal from output 6 which would pass through OR 206 to become the input data.

As a further example, assume that the input data is in the form of 5 bit characters without parity. The signals R Byte 2 04 and R Byte 2 05 are at the low level, while the signals VRC mode and SYNC are at the high level. D/DMUX 202 produces an output signal at its output 12 that passes through OR 220 to the B0 input of D/MUX 216. The succeeding four bits of the character are entered into the same position with the data bits being shifted to the right, so that after the fifth bit has been entered into the Assembly/Disassembly area, they are contained in bits locations 04-01. On the next following major cycle, they are transferred to the storage area in the manner described above.

From the foregoing illustrations, it should be obvious that, depending upon the combinations of signals applied to the A0–A3 inputs of D/DMUX 202, it will produce an output signal at one of its outputs for each data input bit the output signal being grated into either bit position 5, 6, 7 or 8 of the Assembly/Disassembly area. Depending upon the length of the characters, the end of character counter will cause the signal EOC 1 to be produced as subsequently described, thereby gating the assembled character into the storage area from when it may be transferred to the SPM.

GATING CONTROL — SYNCHRONOUS INPUT

Assume that a control word has been stored in a particular location in the Main Memory 110, this control word having a configuration for controlling the synchronous input of data through the port to which the control word is assigned. Each time that the multiplexer is addressed to gate data into the CMM, the control word is addressed to control the gating logic. For either a normal data input or output, Byte 1, bit 4 will contain a one so that a high level signal R Byte 4 01 will be available at the output of the Holding Register 112. This signal is applied to FIG. 12 where it blocks and AND 1200. AND 1200 produces the low level signal LINE ON on lead 1202. The output of AND 1200 is passed through a NOT 1204 to become the high level signal LINE ON.

The output of NOT 1204 is applied to the X input of a Decoder 1206. The Y input of the Decoder is connected to a low level voltage source and the SY input is enabled by the low level output of AND 1200.

Decoder 1206 has two addressing inputs, A0 and A1, which receive the signals R Byte 1 02 and R Byte 4 01. Byte 1, bit 02 is a zero for an input operation, hence the A0 input of Decoder 1206 is disabled. Byte 4, bit 01 of the control word is a 1 to program the port for synchronous operation, hence the A1 input of the Decoder 1206 is enabled. Therefore, each time the port is addressed and the control word is read out of Main Memory 110, a low level signal is produced at the Y2 output of Decoder 1206. This signal appears on lead 1208 as the low level signal SYNC IN. The Y2 output of Decoder 1206 passes through a NOT 1210 to become the high level signal SYNC IN on lead 1212. The output of NOT 1210 is applied to one input of AND 1214 which further receives the signal EOC on the minor cycle occuring one major cycle after a complete input character is formed in the Assembly/Disassembly area of the Main Memory. When both inputs are conditioned, AND 1214 produces the low level signal SYNC IN EOC.

The signal R Byte 4 01 passes directly to output lead 1218 where it becomes the high level signal SYNC. It is also applied through a NOT 1220 to become the low level signal SYNC on lead 1222. The input designator bit of the control word Byte 1, bit 02, is at a low level and blocks an AND 1224. Therefore, during an input operation AND 1224 produces the high level signal $\overline{IC}$·OUT. The output of AND 1224 is passed through NOT 1228 to become the low level signal $\overline{IC}$·OUT on lead 1230. At this point it should be noted that the signal IC, applied to AND 1224 is in the nature of a master clear signal. The signal and its complement are produced by the timing circuits 120 when a port and its control are to be cleared.

The low level signal derived from the Y2 output of Decoder 1206 is applied to the SY input of a Decoder 1232. The SX, A1 and Y inputs of the Decoder are tied to a low voltage level and the A0 input of the Decoder receives the signal R Byte 1 06, which is at a low level if a specific start character is required to start a message, and at a high level if any non-SYN character may begin the message. Although the X input of Decoder 1232 receives the signal R Byte 1 07, the X outputs of the Decoder are not used for synchronous operations.

A low level signal to the SY input of the Decoder in combination with a low level signal applied to the A0 input causes Decoder 1232 to produce a low level signal at its YO output. This signal is inverted by a NOT 1234 to become the high level signal SYNC IN 2. On the other hand, a low level input signal to SY in combination with a high level input to A0 causes the Decoder to produce a low level signal at its Y1 output. This signal is inverted by NOT 1238 to become the high level signal SYNC IN 1.

The signal LINE ON is produced by AND 1200 on the first minor cycle that a control word is addressed after Byte 1 has been loaded. After inversion by NOT 1204, the output of AND 1200 passes through OR 1260 and NOT 1262 to become the signal WRITE LINE ON FLAG. At TP13–14 of the minor cycle this signal sets one bit in the I/O Request and Out Control Area of the control word when the word is restored in Main Memory 110.

Figure 13:
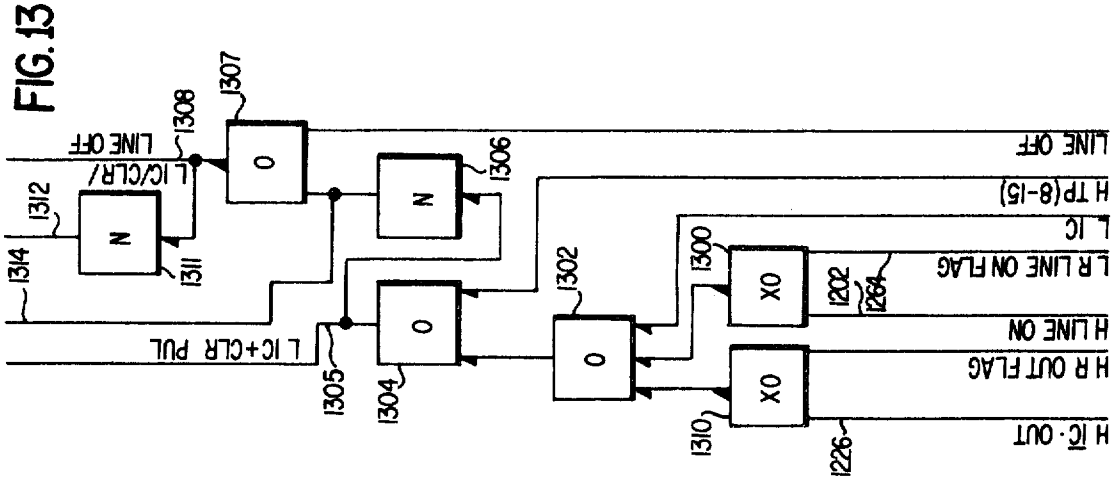
FIG. 13 shows the LINE ON and CLEAR logic circuits.

On the minor cycle that the LINE ON flag is set, but before it is set, the signal LINE ON is applied to FIG. 13 where it passes through Exclusive OR 1300 and OR 1302, to block one input OR 1304. The other input of OR 1304 is driven to the high level by timing pulse TP8–15 so that on this minor cycle the IC + CLR/PUL signal is produced. This signal is utilized throughout the CMM is initialize conditions for the particular port involved. The output of OR 1304 passes through NOT 1306 and OR 1307 to become the signal IC/CLR/LINE OFF which is used for similar purposes.

On the next minor cycle that the control word is addressed, the signal R LINE ON FLAG will be at a high level and will block the signal LINE ON at Exclusive OR 1300. Exclusive OR 1310 will also be producing a high level output and the signal IC will be at a high level. With all inputs high, OR 1302 produce a low level output that is inverted by OR 1304 to drive both of the signals IC+CLR PUL and IC/CLR/LINE OFF on leads 1305 and 1308 to the high level. Thus, the signals on leads 1305 and 1308 are at the low level only on the first minor cycle the control word is addressed to clear or initialize port conditions.

INPUT SYNC AND CHARACTER FRAMING

At the beginning of an input operation, it is necessary to determine which incoming data bits comprise one character, and once this has been determined it is necessary that each succeeding predetermined number of bits be grouped together as each succeeding character. The Assembly/Disassembly area 1410 and the EOC area 1510 of the Main Memory 110 accomplish these functions in association with a Confidence Adder 1400 and the End of Character Adder 1500.

Figure 5:
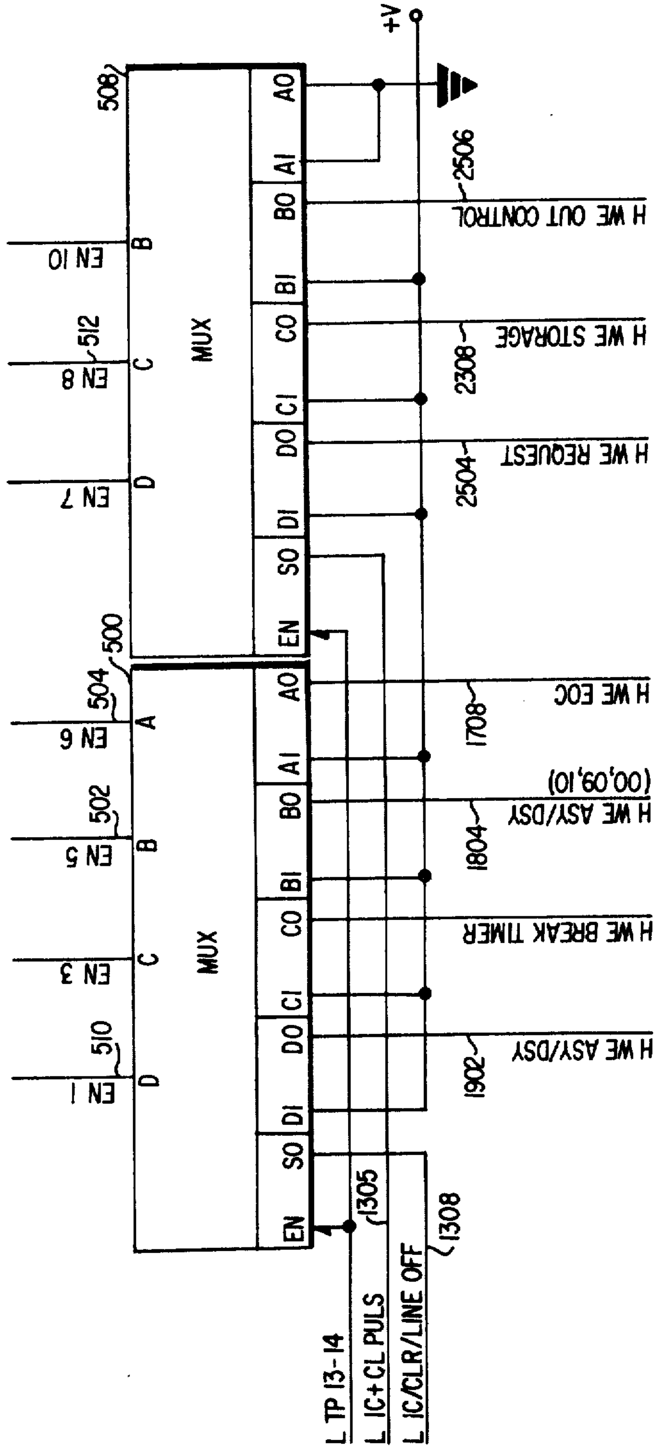
FIG. 5 illustrates typical multiplexers employed for enabling the writing into various areas of main memory on a selective basis.
Figure 28:
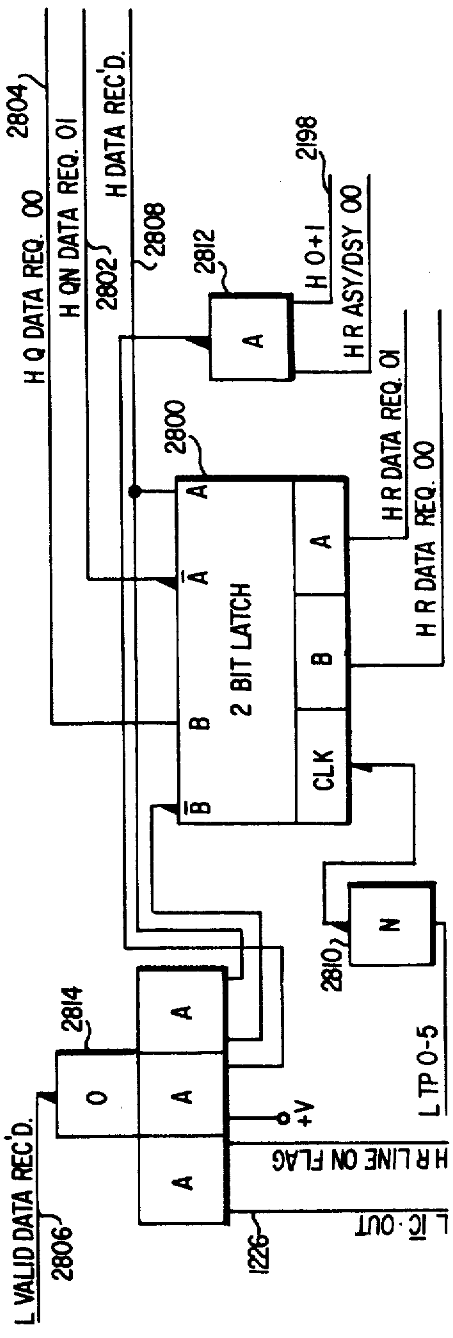
FIG. 28 is a logic circuit for generating a signal when valid data is received.

The EOC area 1510 of Main Memory 110, is set to 0000 one major cycle after the control word is loaded into the main memory. The signal IC/CLR/LINE OFF is at a low level at this time and blocks the inputs of AND's 1502, 1504, 1506, and 1508, so that high level signals are applied to all four input positions of the EOC area 1510. In FIG. 5, the low level signal IC/CLR/LINE OFF, selects the A1, B1, C1, and D1 inputs of Multiplexer 500, all of these inputs being tied to a high voltage level. At TP 13–14, the multiplexer is enabled and it produces the signals ENABLE 1, 3, 5, and 6. The ENABLE 1 signal serves to clear the Assembly/Disassembly area bits 01–08. The ENABLE 6 signal is applied to FIG. 15, where it enables the writing into the EOC area 1510. Thus, at time TP 13–14 of the minor cycle occuring one major cycle after the control word is loaded into the main memory, the EOC is set to 0000.

At the same time, the Assembly/Disassembly Area 1410 is set to 000. The signal IC/CLR/LINE OFF is passed through a NOT 1400 and disables AND's 1402, 1404 and 1406 so that they apply low level signals to the 00, 09, and 10 bit positions of Assembly/Disassembly area 1410. The signal $\overline{IC}$·OUT is at a high level at this time and is inverted by NOT 1408 to apply a low level signal to the fourth input of Assembly/Disassembly area 1410. This fourth position stores a flag which is set only during output operations. The Multiplexer 500 produces the signal ENABLE 5 to enable the writing of 000 into Assembly/Disassembly area 1410 at time Tp 13–14 of the minor cycle occuring one major cycle after the control word is loaded into the main memory.

Figure 15:
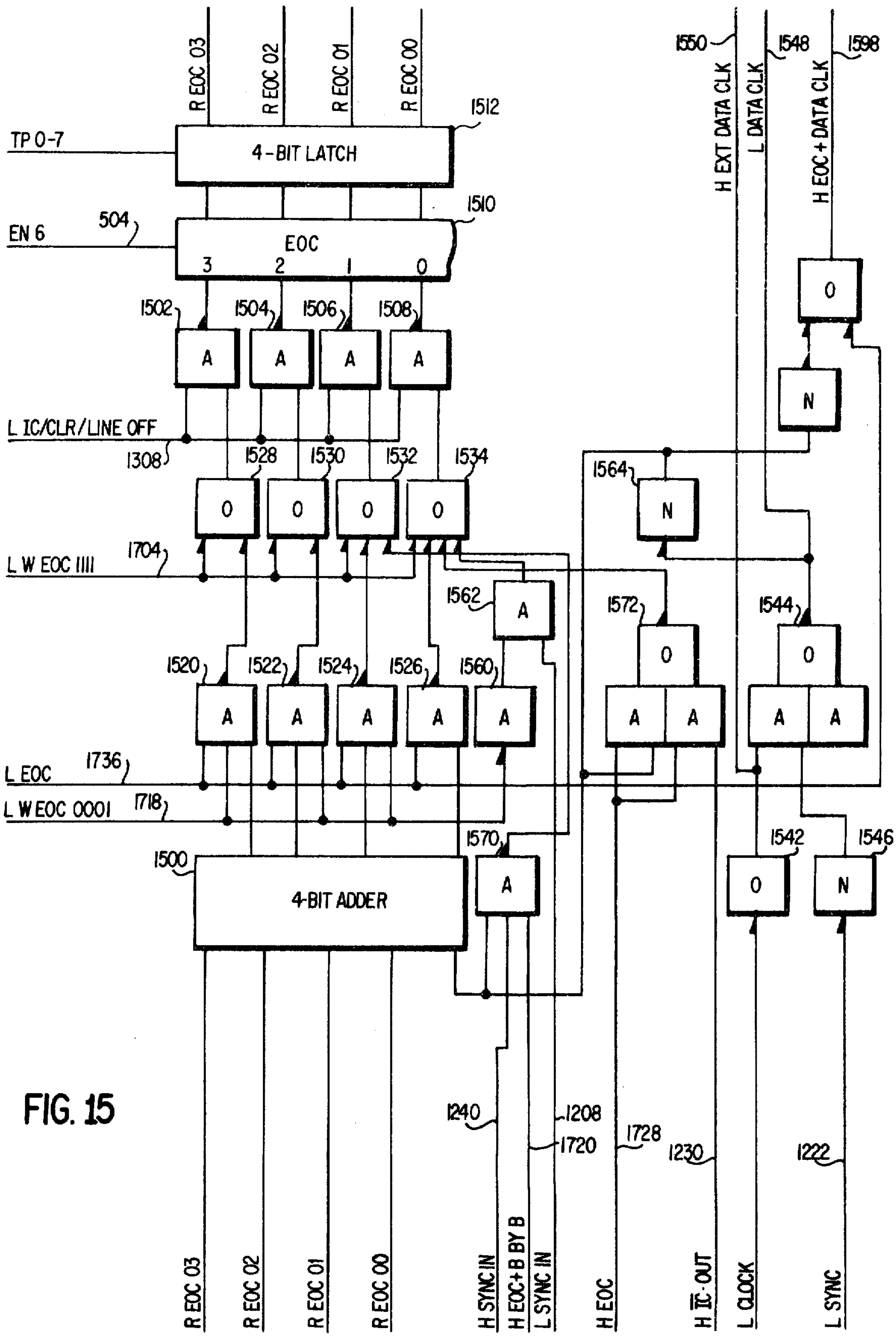
FIGS. 15, 16 and 17 show the end of character counter and its control logic.
Figure 16:
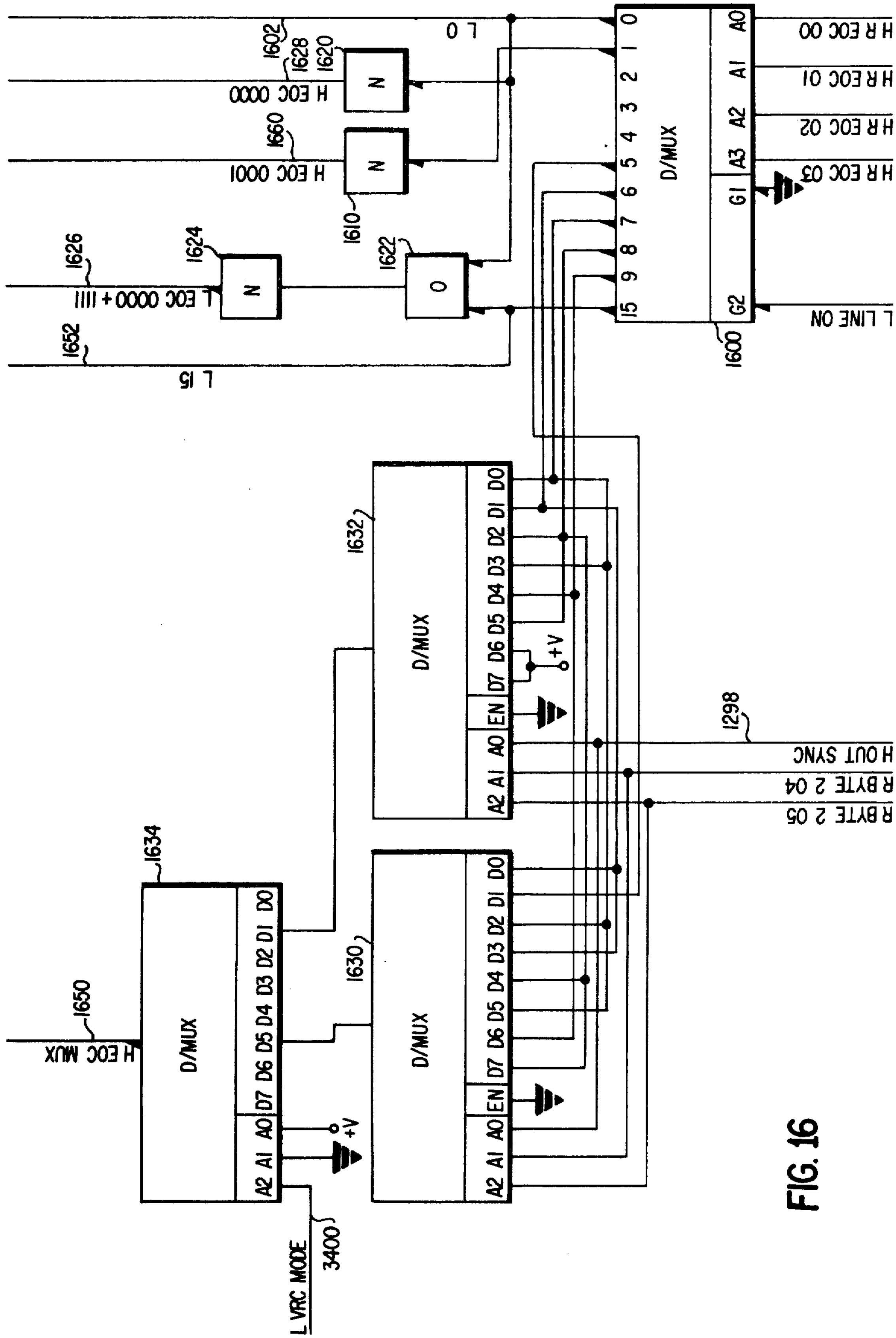
Figure 17:
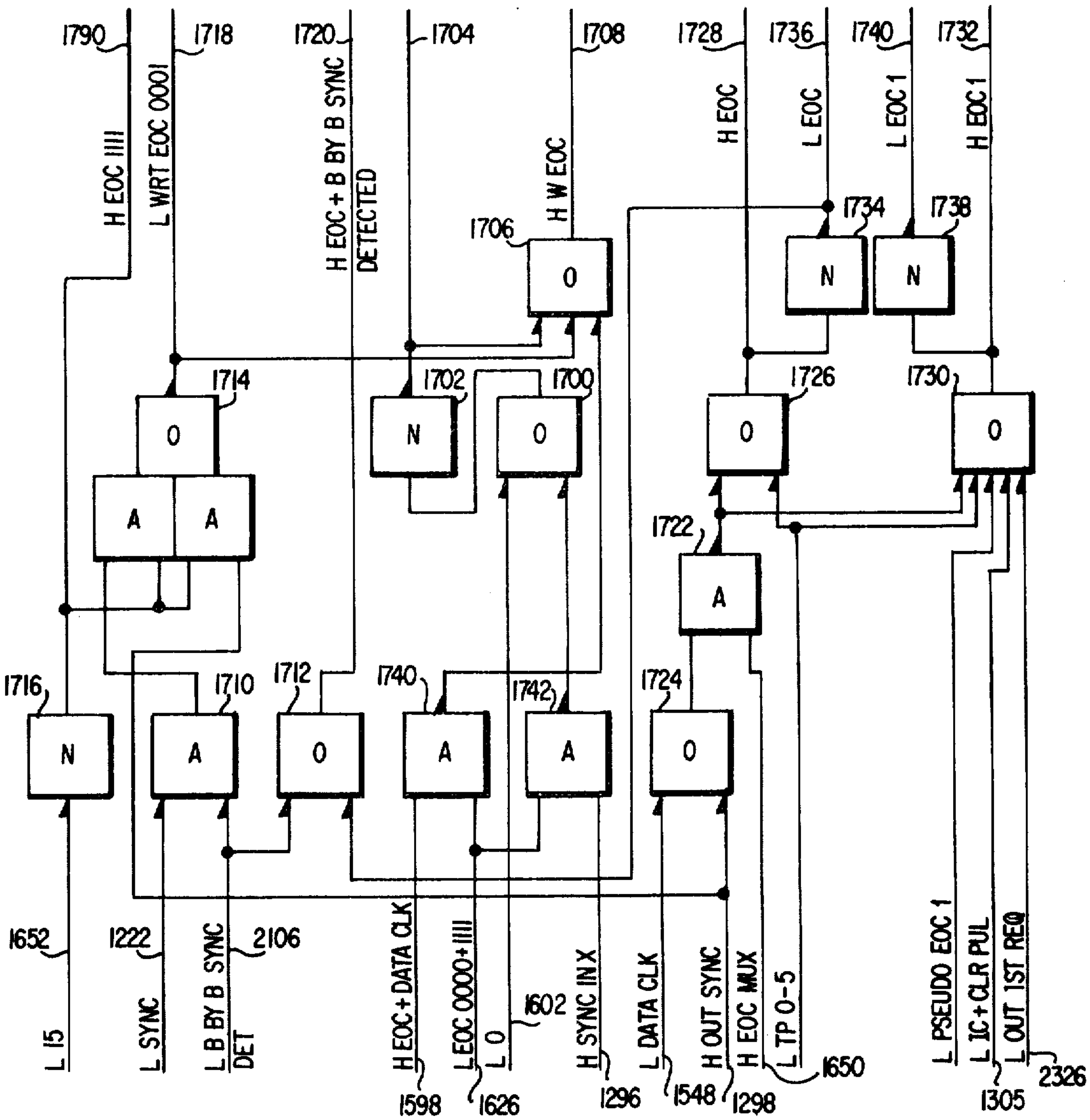

On the minor cycle occuring one major cycle after the control word is loaded into the main memory, (hereinafter referred to as line on time) the EOC area 1510 is set to the value 1111 and the Assembly/Disassembly bits 10, 09 and 00 are set to the value 011. When the value 0000 is read out of EOC area 1510, it is applied to the four bit adder 1500 and to a Decoder Multiplexer 1600. In FIG. 15, the outputs of adder 1500 are blocked as subsequently described. In FIG. 16, D/MUX 1600 is enabled by the signal LINE ON because, for a synchronous operation, the G1 input is for all practical purposes tied to a low level. The low level input signals applied to the A0–A3 inputs of D/MUX 1600 cause the D/MUX to produce the low level output signal 0. This signal is applied to FIG. 17 where it passes through an OR 1700 and a NOT 1702 to become the signal WRITE EOC 1111. This low level signal is applied to each of the OR's 1528, 1530, 1532 and 1534 and the OR's produce high level signals which pass to AND's 1502, 1504, 1506 and 1508. The signal IC/CLR/LINE OFF is at a high level, so AND's 1502, 1504, 1506 and 1508 produce low level output signals to write ones into the four positions of the EOC area 1510. The actual writing takes place at time TP 13–14, when the ENABLE 6 signal is applied to the EOC area 1510. In FIG. 17, the signal WRITE EOC 1111 passes through an OR 1706 to become the signal WRITE EOC. This signal is applied to the A0 input of MUX 500. Since the signal IC/CLR/LINE OFF is at a high level, the A0 input of MUX 500 is gated through to the A output as the signal ENABLE 6 when the gating pulse TP 13–14 enables the MUX.

After the EOC area 1510 has been set to contain 1111 the EOC counter remains inactive until the first SYN character is detected. Once each major cycle the EOC area 1510 is read out but, because OR 1706 does not produce the signal WRITE EOC, the value 1111 remains in the EOC area and is not replaced by any output from the adder.

Figure 14:
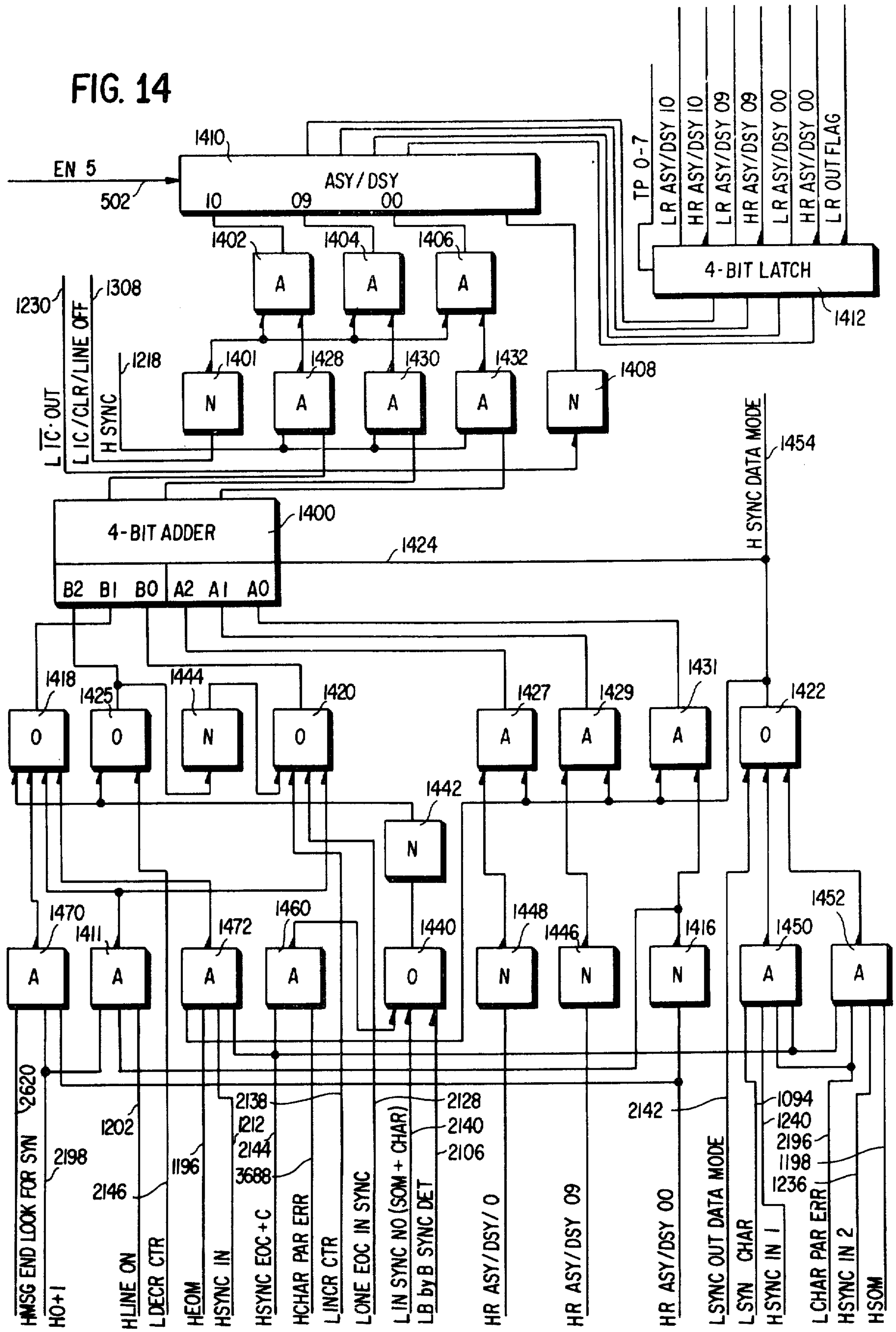
FIG. 14 shows the character sync and confidence counter and its control logic.

During the same minor cycle that the value 1111 is first loaded into the EOC area, the Assembly/Disassembly area 1410 (i.e. bits 10, 09 and 00) is set to the value 011. In FIG. 14, the signal LINE ON is at a high level and conditions one input of AND 1411. When the Assembly/Disassembly area 1410 is read out and stored in the four-bit latch 1412, at time TP 0–7, bit 00 is at a low level and is applied to NOT 1416. The output of NOT 1416 conditions the second input of AND 1411. Since bits 10 and 09 are both zeros, the signal 0+1 on lead 2198 will enable the third input of AND 1411 and it produces a low level output signal that passes through an OR 1418 to the B1 input of adder 1400, and through an OR 1420 to the B0 input of the adder. All inputs to OR 1422 are at the high level, so that no carry input signal is applied over lead 1424 to the adder. The output of OR 1422 is applied as an enabling input to AND's 1427, 1429 and 1431. However, Assembly/-Disassembly bits 00, 09 and 10 are all 0's so the NOT's 1416, 1446 and 1448 block the AND's thereby applying a low level signal to each of the A inputs of the adder. Finally, both inputs to OR 1425 are at a high level and it applies a zero to the B2 input of adder 1400. Therefore, the adder produces a low level output signal to AND 1428 while producing a high level output signal to AND's 1430 and 1432. The signal SYNC is high at this time, so AND's 1430 and 1432 produce low level output signals to enable AND's 1404 and 1406, but the output of AND 1428 blocks AND 1402. The signal IC/CLR/LINE OFF is at a high level, so that the second inputs of AND's 1404 and 1406 are enabled and at time TP 13–14, when the ENABLE 5 signal occurs, the value 011 is written into the Assembly/-Disassembly area 1410.

Figure 18:
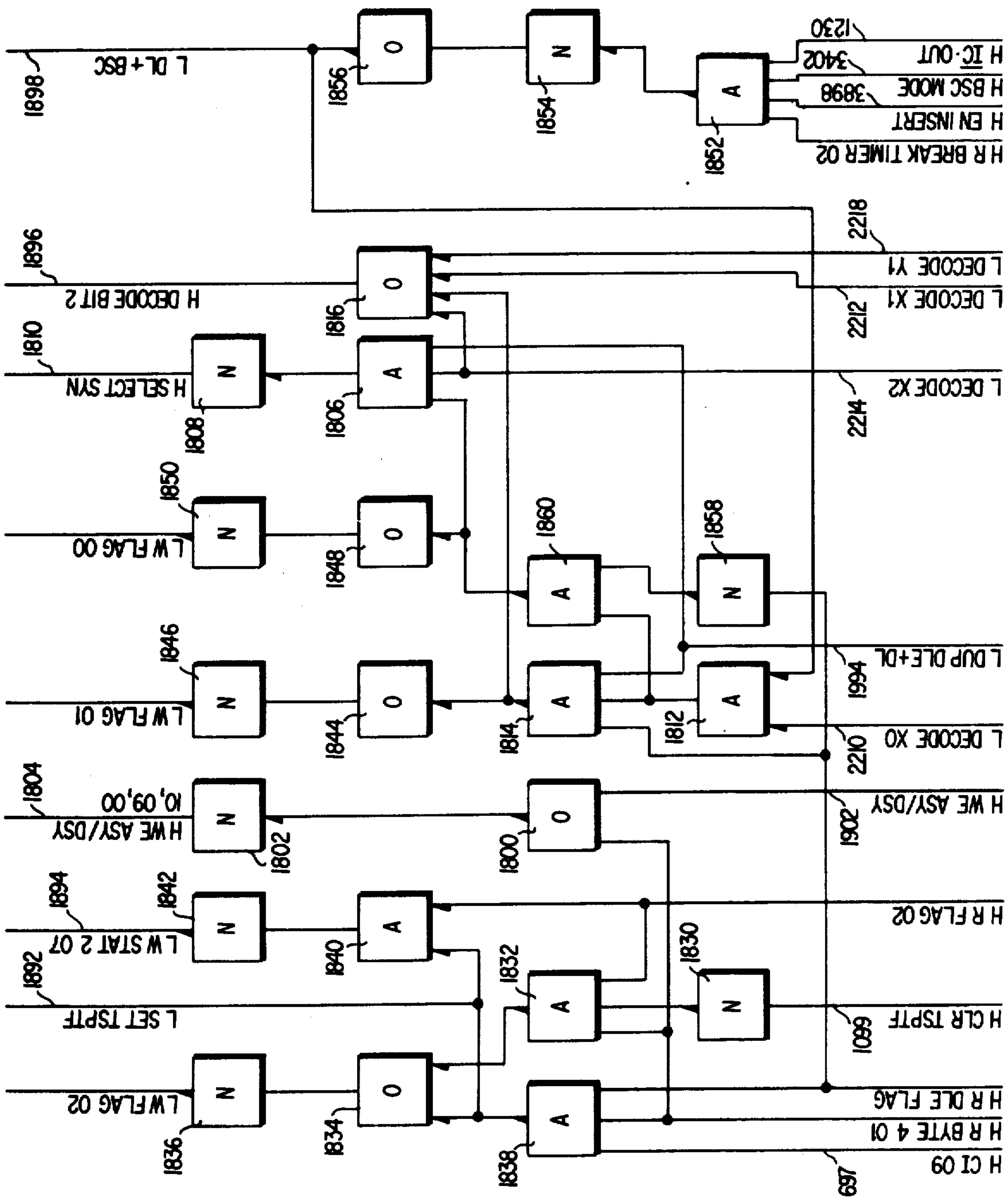

The ENABLE 5 signal is generated as follows. In FIG. 18, the signal R Byte 401 is at a high level because the control word is specifying a synchronous operation. The signal passes through an OR 1800 and a NOT 1802 to become the signal WRITE ENABLE ASSEMBLY/-DISASSEMBLY 10 09 00. This signal is applied to FIG. 5, where it enables the B0 input of MUX 500. The signal IC/CLR LINE OFF is at a high level so that the A0, B0, C0 and D0 inputs of the MUX are selected. The timing pulse TP 13–14 enables MUX 500 so that the B0 input becomes the signal ENABLE 5.

Figure 20:
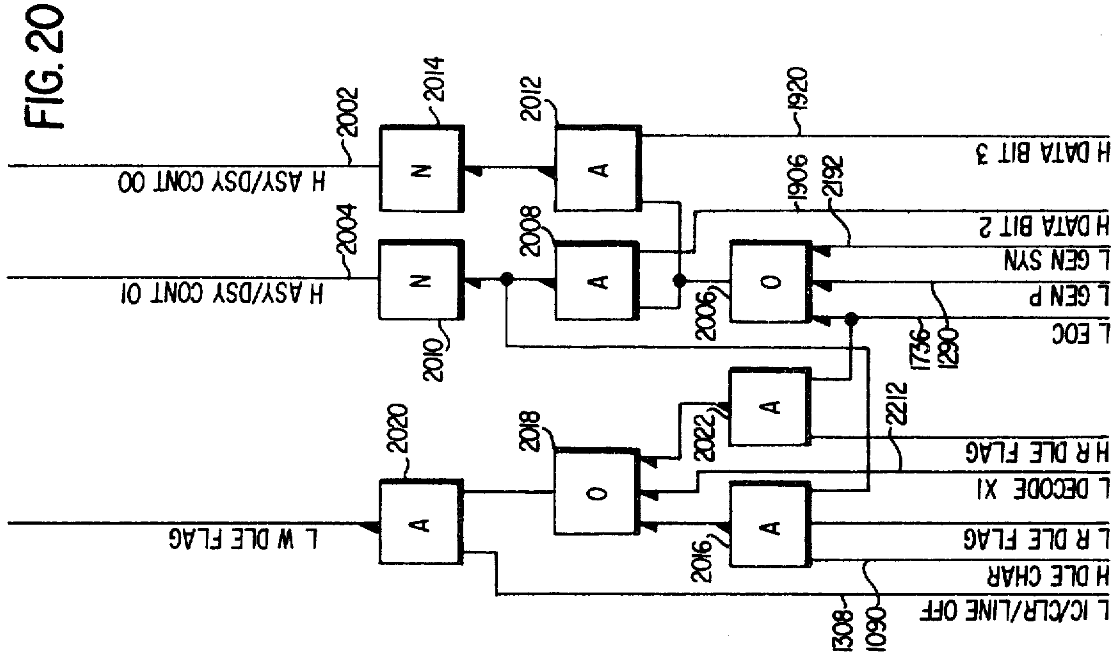
FIGS. 18, 19 and 20 show the logic circuits for setting certain control and status flags in a control word.
Figure 19:
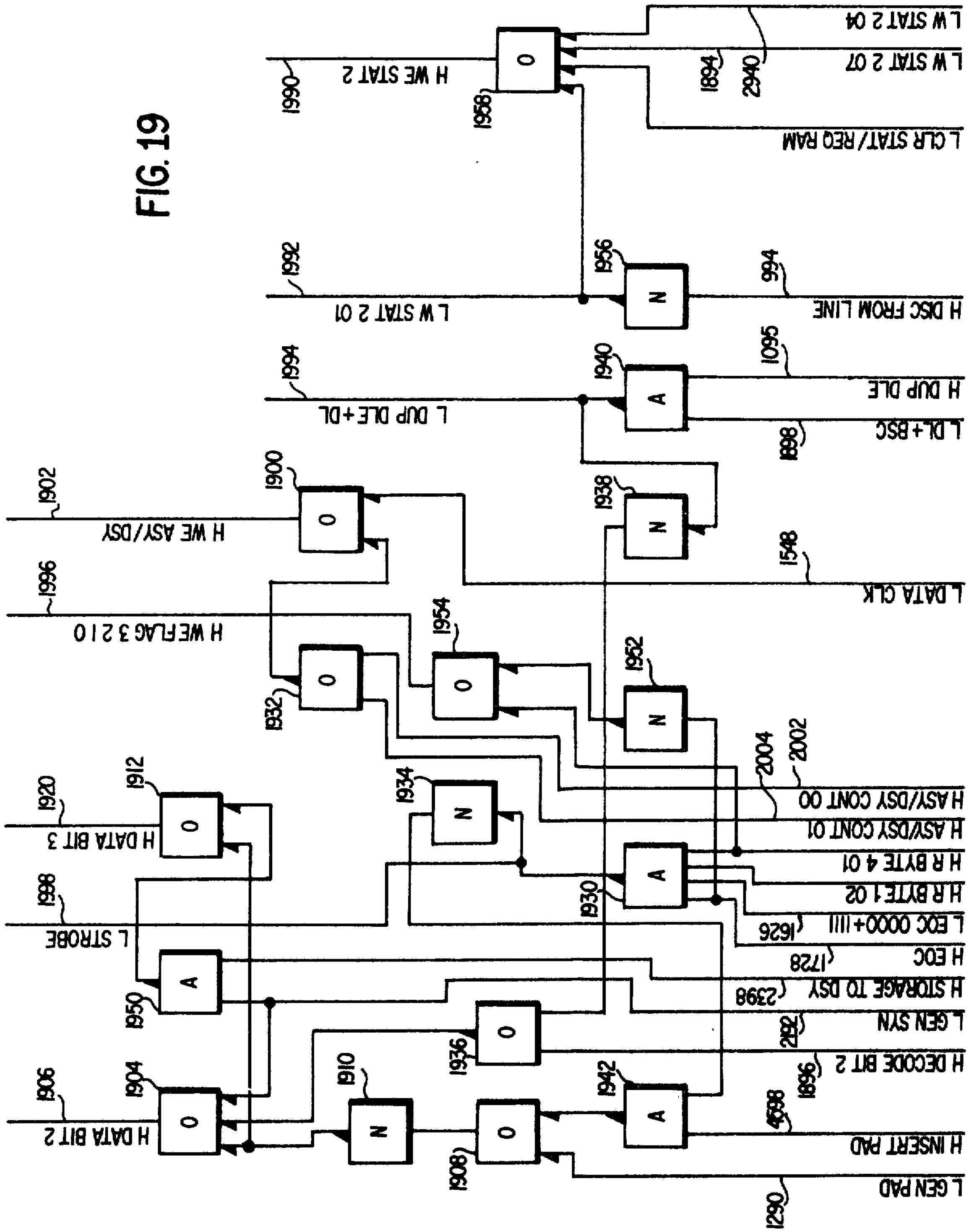

Once the Assembly/Disassembly bits 10, 09 and 00 are set to 011 these values are read out and restored into the memory once each major cycle until a SYN character is detected. During this interval each incoming data bit is entered into the Assembly/Disassembly area 210 at the same time the preceding data bits are restored in the Assembly/Disassembly area 210–310 with a shift of one position to the right. In FIG. 20, the signals ASSEMBLY/DISASSEMBLY CONTROL 00 and ASSEMBLY/DISASSEMBLY CONTROL 01 are both at the low level. In FIGS. 2 and 3 these signals enable the input multiplexers to the Assembly/Disassembly areas 210–310 so that each incoming bit of data is stored at the same time the preceding bits are restored with a shift of one position to the right of the position from which they are read out. In FIG. 15, one input of OR 1542 receives the low level CLOCK signal (TP 0–5). The output of OR 1542 is applied to one input of an AND-OR inverter 1544. The low level signal SYNC is inverted by a NOT 1546 to condition the second input of AND-OR inverter 1544 which produces the low level signal DATA CLOCK. In FIG. 19 the signal DATA CLOCK passes through an OR 1900 to become the signal WRITE ENABLE ASSEMBLY/-DISASSEMBLY. This signal is applied to FIG. 5 to enable the writing into the assembly/disassembly area 210–310 of each of the incoming data bits, and the shifting of the previously stored bits.

On each major cycle, that is after each new bit is assembled, the contents of the Assembly/Disassembly area 210–310 are applied to the CD tables to determine if the configuration of bits in the Assembly/Disassembly area could represent a SYN character. This operation is explained below in connection with FIGS. 6–11. When the configuration of bits in the Assembly/Disassembly area is such that it may by a SYN character, the CMM assumes for the moment that it is a SYN character. In FIG. 10, AND 1013 of the CD table gating circuits produces the signal SYN CHARACTER BIT BY BIT. This signal is applied to FIG. 21 where it enables one input of an AND 2100. This AND further receives the signal EXTERNAL DATA CLOCK which is at a high level during the interval TP0–5. AND 2100 produces an output signal that passes through OR 2102 to enable one input of an AND 2104. In FIG. 12, AND 1250 produces a low level output signal if Assembly/-Disassembly bits 10, 09, and 00 have the value 011. The output of AND 1250 is inverted by NOT 1252 to become the high level signal $A \cdot B \cdot \overline{C}$. This signal is applied to FIG. 21 where it enables a second output of AND 2104. The AND produces the low output signal BIT BY BIT SYNC DETECTED. This signal is used to set the EOC counter to a value of 0001 and the value in the Assembly/Disassembly bits 10, 09 and 00 to 010.

In FIG. 14 the signal BIT BY BIT SYNC DETECTED passes through OR 1440, NOT 1442, and OR 1418 to the B1 input of adder 1400. The output of NOT 1442 also passes through OR 1426 to apply a high level signal to the B2 input of adder 1400. The output of OR 1425 is inverted by NOT 1444 and applied to OR 1420 which in turn applies a high level signal to the B0 input of adder 1400. Thus, the value 111 is applied to the B inputs of adder 1400. At the same time, the contents of Assembly/Disassembly area 1410 are applied to the A inputs. Bits 00, 09 and 10 of the Assembly/Disassembly area are passed through NOT's 1416, 1446 and 1448 to one input of ANd's 1431, 1429 and 1427. These AND's are further conditioned by a low level output signal from OR 1422 since all inputs to the OR are at a high level at this time. Thus, the value 011 from the Assembly/Disassembly area 1410 is applied to the A input of adder 1400 at the same time the value 111 is applied to the B inputs. The output of OR 1422 is at a low level so no carry signal is applied to the low order of the adder. The adder sums these values and produces the value 010 at its outputs. This value is gated through the two sets of AND gates between the adder 1400 and the Assembly/Disassembly area 1410 because the signals SYNC and IC/CLR/LINE OFF are at the high level. Therefore, at time TP 13–14 of the minor cycle in which the SYN character is detected, the value 010 is written into the Assembly/Disassembly area 1410.

At the same time the Assembly/Disassembly area 1410 stores the value 010, the EOC area 1510 stores the value 0001. In FIG. 17, the signal BIT BY BIT SYNC DETECTED enables one input of AND 1710 and passes through OR 1712 to become the signal EOC + BIT BY BIT SYNC DETECTED. The second input of AND 1710 is further enabled by the low level signal SYNC so AND 1710 produces an output signal to enable one input of AND-OR Inverter 1714. In FIG. 16 Decoder/MUX 1600 is receiving the value 1111 read out of the EOC area 1510 at time TPO and stored in latches 1512. Decoder/MUX 1600 decodes this value and produces the low level signal 15. This signal is applied to FIG. 17 where it passes through a NOT 1716 to become the high level signal EOC 1111. The output of NOT 1716 conditions a second input of AND-OR Inverter 1714 and this circuit produces the low level signal WRITE EOC 0001. The output of AND/OR Inverter 1714 also passes through OR 1708 to become the signal WRITE EOC. This latter signal is applied to FIG. 5 where it permits the generation of the ENABLE 6 signal at time TP13–14 to enable the writing of a new value into the EOC area 1510. The signal WRITE EOC 0001 is applied to FIG. 15 where it blocks AND's 1520, 1522 and 1524 and passes through a NOT 1560 to enable one input of AND 1562. However, the signal SYNC IN is at a low level so AND 1562 is blocked.

The value 1111 which has been stored in the EOC area 1510 and transferred to the four bit latches 1512 at time TPO, is available throughout the minor cycle. This value is applied to the adder 1500.

Since the value 1111 is applied to the four bit adder and since there is no carry input to the adder, it produces the value 1111 at its outputs. However, gates 1520, 1522 and 1524 are blocked by the low level signal WRITE EOC 0001 so only AND 1526 is conditioned to produce a low level output signal that passes through OR 1534 and AND 1508 to the bit 0 position of the EOC area 1510. Bits 1, 2 and 3 all receive high level inputs hence the value 0001 is written into the EOC area 1510 at time TP 13–14 when the signal ENABLE 6 occurs.

At this point, it is assumed that the first SYN character has been framed so that the EOC counter begins counting data clock pulses in order to determine when the next complete character has been assembled in the Assembly/Disassembly area 210–310. In FIG. 15, the data clocks pass through OR 1542, AND–OR Inverter 1544, and NOT 1564 to apply a carry input signal to the four bit adder 1500. The contents of the EOC area 1510 are read out to the latches 1512 beginning at time TP 0 of the minor cycle and the output of the latches is applied to the four bit adder along with the carry input. The output of the adder is applied back to the EOC area 1510 and at time TP 13–14 of the minor cycle the incremented value is written back into the EOC area. As subsequently described, either 5, 6, 7, or 8 incrementations may take place before the next character is assembled. This, of course, depends on the number of bits in each of the incoming characters.

The second character of an incoming sequence must be a SYN character since all incoming messages are preceded by at least two SYN characters. After the second character has been assembled the signal EOC MUX will be produced by the circuits of FIG. 16. This signal is applied to FIG. 17 where it conditions one input of AND 1722. The signal OUT SYNC is at a low level so the output of OR 1724 conditions a second input of AND 1722. The AND produces an output signal that passes through OR 1726 to become the high level signal EOC, and passes through OR 1730 to become the high level signal EOC 1. The output of OR 1726 is passed through a NOT 1734 to become the low level signal EOC and the output of OR 1730 is passed through a NOT 1738 to become the low level signal EOC 1.

Figure 9:
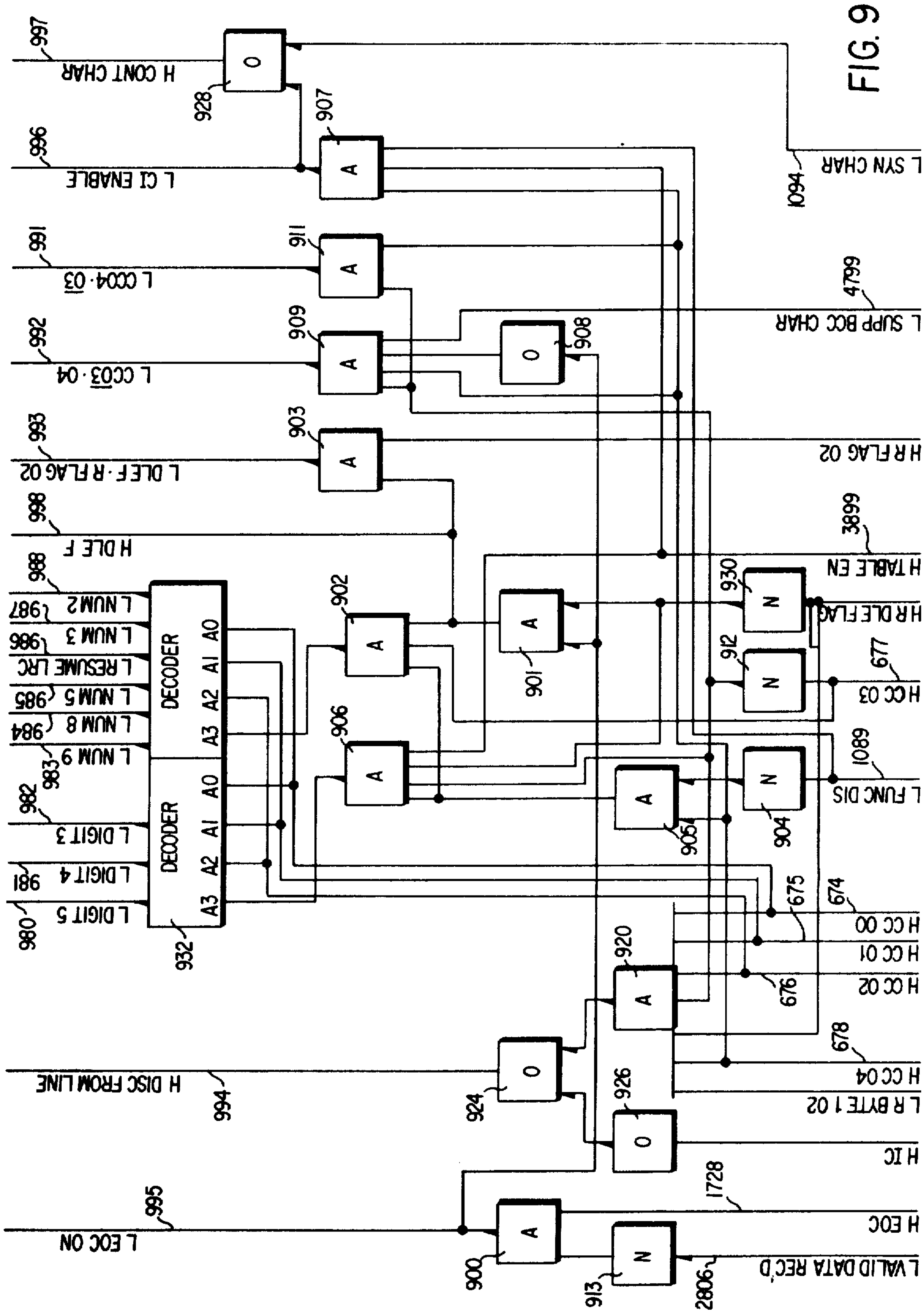
Figure 10:
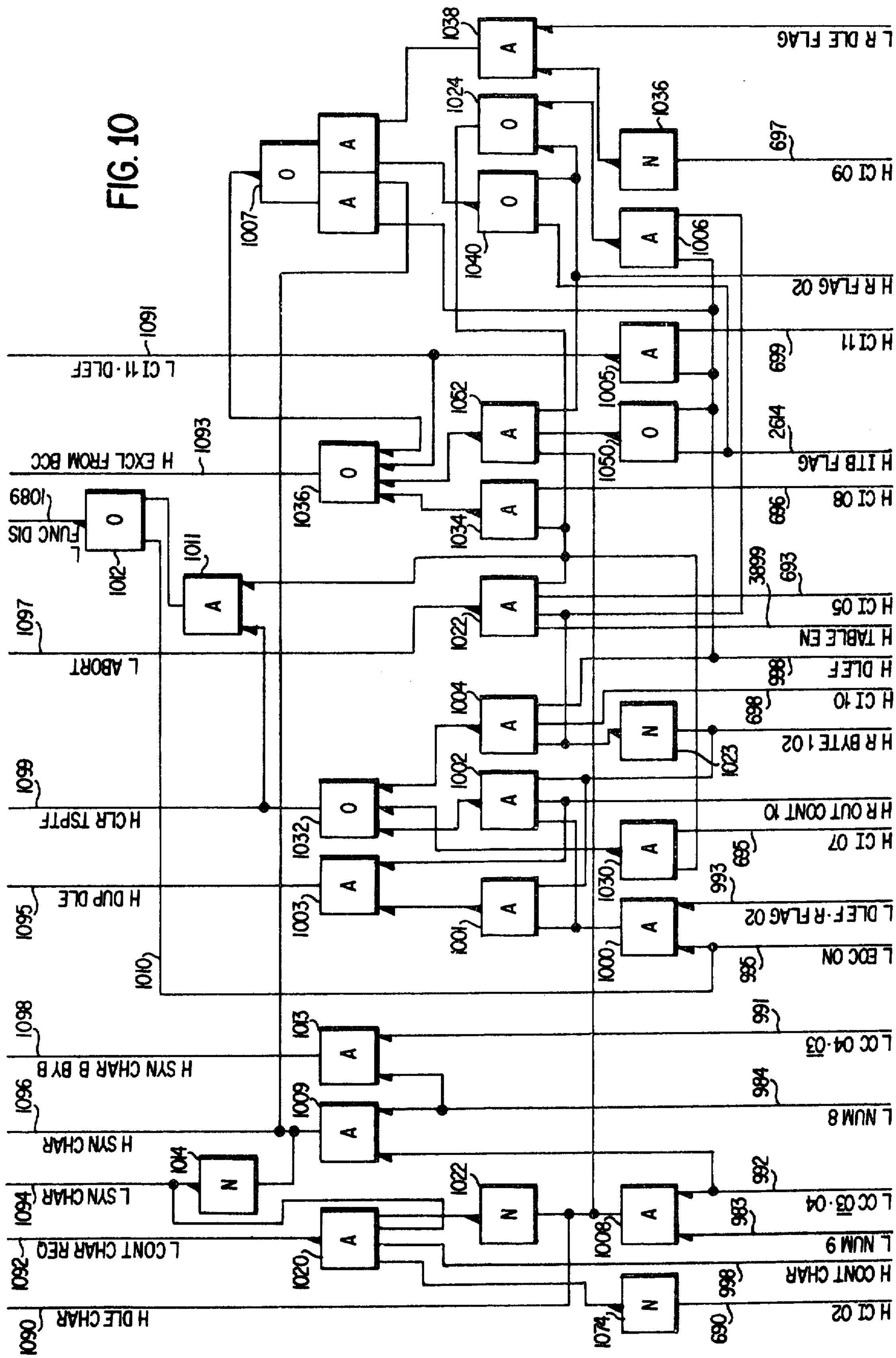

In FIG. 9, the signal EOC enables AND 900 and, if the second character is valid, AND 900 enables the gating circuits controlled by the outputs from the CI and CD tables. During the EOC cycle, which is the minor cycle occurring one major cycle after the one in which the complete character is assembled in the Assembly/Disassembly area 210–310, the character is applied as an addressing input to the CD tables. Since this character should be a SYN character, AND 1009 produces the high level signal SYN CHARACTER while NOT 1014 produces the low level signal SYN CHARACTER.

The SYN character signal is applied to FIG. 9 where it passes through OR 928 to become the signal CONTROL CHARACTER. The signal SYN CHARACTER is also applied to FIG. 21 where it passes through NOT 2108 to block AND 2110. The signal SYN character also passes through OR 2112 to enable one input of AND 2114. However, AND 2114 is blocked at this time by the output of AND 2116.

The signal SYN CHARACTER is also applied to FIG. 14 where it blocks one input of AND 1450. It is this AND which generates a signal to place the CMM in the SYNC DATA MODE upon occurrence of the first non-SYN character if the CMM is so programmed by having Byte 1 bit 06 set to one.

Figure 21:
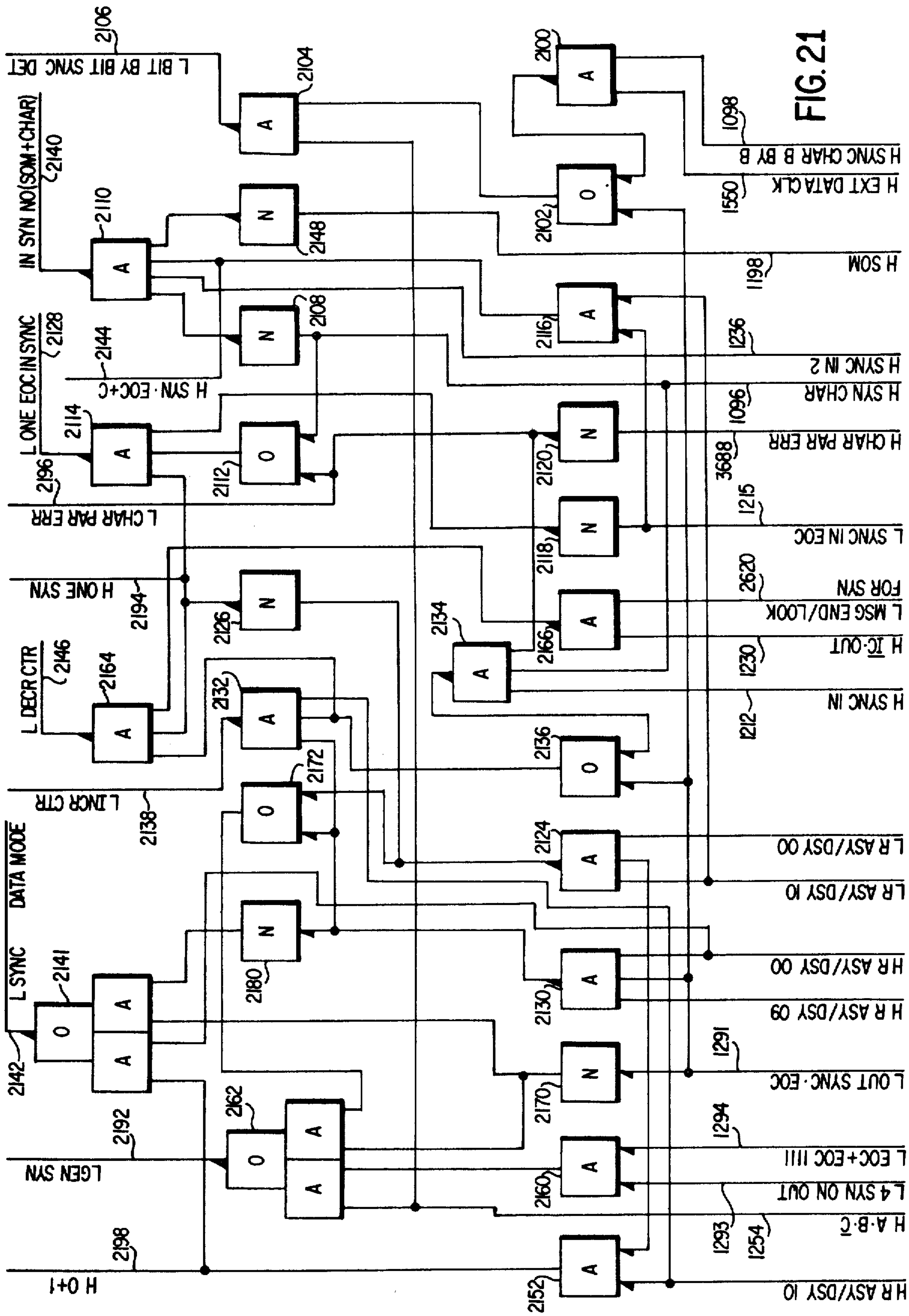
FIG. 21 is a logic diagram showing the generation of various control signals.

When it has been determined that the second character is a SYN character and has a valid parity, the Assembly/Disassembly area 1410 is set to a value of 111 which indicates that synchronization has been established. In FIG. 14, a low level output from OR 1422 enables AND's 1427, 1429 and 1431 so that the previously stored value of 010 is read into the A inputs of adder 1400. The low level output of OR 1422 means that no carry input is applied to the adder. The B inputs to the adder are derived as follows. In FIG. 21, all inputs to AND 2134 are high and it produces an output through OR 2136 to enable one input of AND 2164. Assembly/Disassembly bits 10, 09, and 00 are 010 to enable AND 2124. Its output passes through NOT 2126 to enable the second input of AND 2164. Finally, AND 2166 is blocked and its high level output enables AND 2164 to produce the signal DECREMENT COUNTER. In FIG. 14, this signal passes through OR 1425 to the B2 input of adder 1400, and through NOT 1444 and OR 1420 to the B0 input. The adder thus sums the values 010 and 101 to obtain the value 111. At time TP 13–14 thus value is gated into the Assembly/Disassembly area 1410.

If the second character had not been a SYN character or if it had had bad parity, the confidence counter (i.i. bits 10, 09, 00) would have been returned to the 011 state to again look for SYNC. This is accomplished as follows. In FIG. 21, the signal CHARACTER PAR- TY ERROR on lead 3688 will be at a high level and after passing through NOT 2120 and OR 2112 it enables one input of AND 2114. A second input of AND 2114 is enabled by the output of NOT 2118 since the signal SYNC IN EOC is at a low level. Since the value read out of the Assembly/Disassembly bits 00, 09 and 10 are 010, all inputs to AND 2124 are at a high level and after inversion by NOT 2126 the output of AND 2124 enables the third input of AND 2114. AND 2114 produces the low level signal ONE EOC IN SYNC which is applied to FIG. 14 where it passes through OR 1420 to the B0 input of adder 1400. The B1 and B2 inputs of the adder will be receiving low level inputs as will the carry input lead 1424. Therefore, the adder sums the values 001 and 010 to obtain the value 011 which is stored in the Assembly/Disassembly area 1410 at time TP 13–14.

Once the confidence counter has reached the value 111, synchronization is established. However, the CMM does not enter the synchronous data mode until either a non-SYN character or a specific start of message (SOM) character is assembled in the Assembly/-Disassembly area 210–310. Byte 1 bit 06 determines whether any non-SYN or a specific start character is required to enter the SYNC data mode. Subsequent to the time the confidence counter reaches the 111 state, and before the synchronous data mode is entered, the confidence counter continuously keeps track of the state of synchronization. If four more bad parity or non SYN characters occur than good parity SYN characters, then the counter is automatically decremented to the bit-by-bit look for SYN state (011) which requires that the synchronization be restarted as described above. The confidence counter is decremented with a bad parity or a non-SYN non-start character if Byte 1 bit 6 is a zero. The confidence counter is incremented if the character is a SYN with good parity.

In FIG. 21, all inputs to AND 2130 are at a high level if the confidence counter stands at a count of 111. The output of AND 2130 thus blocks AND 2132 to prevent the incrementing of the confidence counter if it is already at a full count. If the confidence counter contains a count less than 111, AND 2130 enables one input of AND 2132. Assembly/Disassembly bit 10 is applied to a second input of AND 2132 to enable the AND as long as the count in the confidence counter is greater than 100. Each time a SYN character with good parity is detected all inputs to AND 2134 are at a high level and an output signal is produced that passes through OR 2136 to enable the third input of AND 2132. AND 2132 produces the signal INCREMENT COUNTER which is applied to FIG. 14 where it passes through OR 1420 to the B0 input of adder 1400. This causes the value from the Assembly/Disassembly area 1410, now being applied to the A inputs of adder 1400, to be incremented by 1 before being returned to the Assembly/Disassembly area 1410.

After synchronization is established, but before the SYNC data mode is entered, any non-SYN non-start character decrements the confidence counter as follows. In FIG. 21, the signal START OF MESSAGE will be at a low level and after inversion by NOT 2148 enables one input of AND 2110. Because of the value in the confidence counter, Assembly/Disassembly bit 10 will be at a low level to condition one input of AND 2116. The signal SYNC IN EOC will be at a low level to condition the second input of AND 2116 so it will produce an output signal to enable a second input of AND 2110. The signal SYNC IN 2 will be at a high level to condition a third input of AND 2110. If the character is a non-SYN character NOT 2108 produces a high level output signal to enable AND 2110 to produce the signal IN SYN NO (SOM + CHAR). This signal is applied to FIG. 14 where it passes through OR 1440 and NOT 1442 to the input of OR's 1418 and 1425. The outputs of OR's 1418 and 1425 are applied to adder 1400 and, in addition, the output of OR 1425 passes through NOT 1444 and OR 1420 to apply a high level signal to the B0 input of the adder. Thus, the value 111 is added to the value in the confidence counter and this, in effect, subtracts one from the value in the confidence counter.

After synchronization is established and before the CMM enters the SYN DATA MODE, any character with bad parity will cause the confidence counter to be decremented by one. In FIG. 21, AND 2116 produces the high level output signal SYN EOC + C. This signal is applied to FIG. 14 where it enables one input of AND 1460. If a character has bad parity the signal CHARACTER PARITY ERROR is at a high level to enable the second input of AND 1460. The output of AND 1460 passes through OR 1440 and NOT 1442 or OR's 1418 and 1425 thus decrementing the confidence count as described above.

SYNCHRONOUS INPUT DATA MODE

Once synchronization has been established as described above, the CMM looks for a non-SYN character if Byte 1 bit 6 is a zero, or looks for a start of message character if Byte 1 bit 6 is a one. This bit is applied to FIG. 12 and generates the signal SYNC IN 1 or SYNC IN 2 depending upon whether the bit is a 1 or a 0. In FIG. 14, these signals are applied to inputs of AND's 1450 and 1452, respectively. Assume for the moment that Byte 1 bit 6 is a zero thus requiring any non-SYN character as the beginning of a message. The signal SYNC IN 1 will be at a high level to condition one input of AND 1450. If an incoming data character assembled in Assembly/Disassembly area 210–310 is a non-SYN character, then when this character is applied to the CD tables, the CI and CD table gating circuits of FIG. 10 will produce a high level signal on lead 1094 indicating that the character is not a SYN character. This latter signal is applied to a second input of AND 1450. If the character had good parity the signal CHARACTER PARITY ERROR will be at a high level to enable a third input of AND 1450. Finally, AND 1450 is enabled by the signal SYNC EOC + C which indicates that this is a synchronous operation, an end of character has been detected, and bit 10 of the confidence counter is at a high level. AND 1450 produces a low level output signal that passes through OR 1422 to become the signal SYNC DATA MODE. The output of OR 1422 is applied as a carry input to adder 1400. In addition, the output of OR 1422 blocks AND's 1427, 1429 and 1431 thereby preventing the previously stored value of the confidence counter from being applied to the A inputs of adder 1400. All of the B inputs of the adder 1400 are at a low level hence the adder produces outputs signals representing the value 001. At time TP 13–14 this value is entered into the Assembly/Disassembly area 1410.

If Byte 1 bit 6 is a one, then a Start of Message character (SOM) is required to enter the Sync DATA MODE. In FIG. 14, the signal SYNC IN 2 enables one input of AND 1452. If an assembled character in the Assembly/Disassembly area 210–310 is a Start Of Message character, it will, when applied to the addressing inputs of the CD table, cause the circuits of FIG. 11 to produce the signal SOM on lead 1198. This signal is applied to a second input of AND 1452. If the character has good parity, the signal CHARACTER PARITY ERROR will be at a high level to condition a third input of AND 1452. Finally, the signal SYNC EOC + C will be at a high level so AND 1452 will produce a low level output signal that passes through OR 1422 to become the high level signal SYNC DATA MODE. This signal applies a carry input to adder 1400 and blocks AND's 1427, 1429 and 1431 to enable the value 001 to be stored in the Assembly/Disassembly area 1410 as described above.

Figure 23:
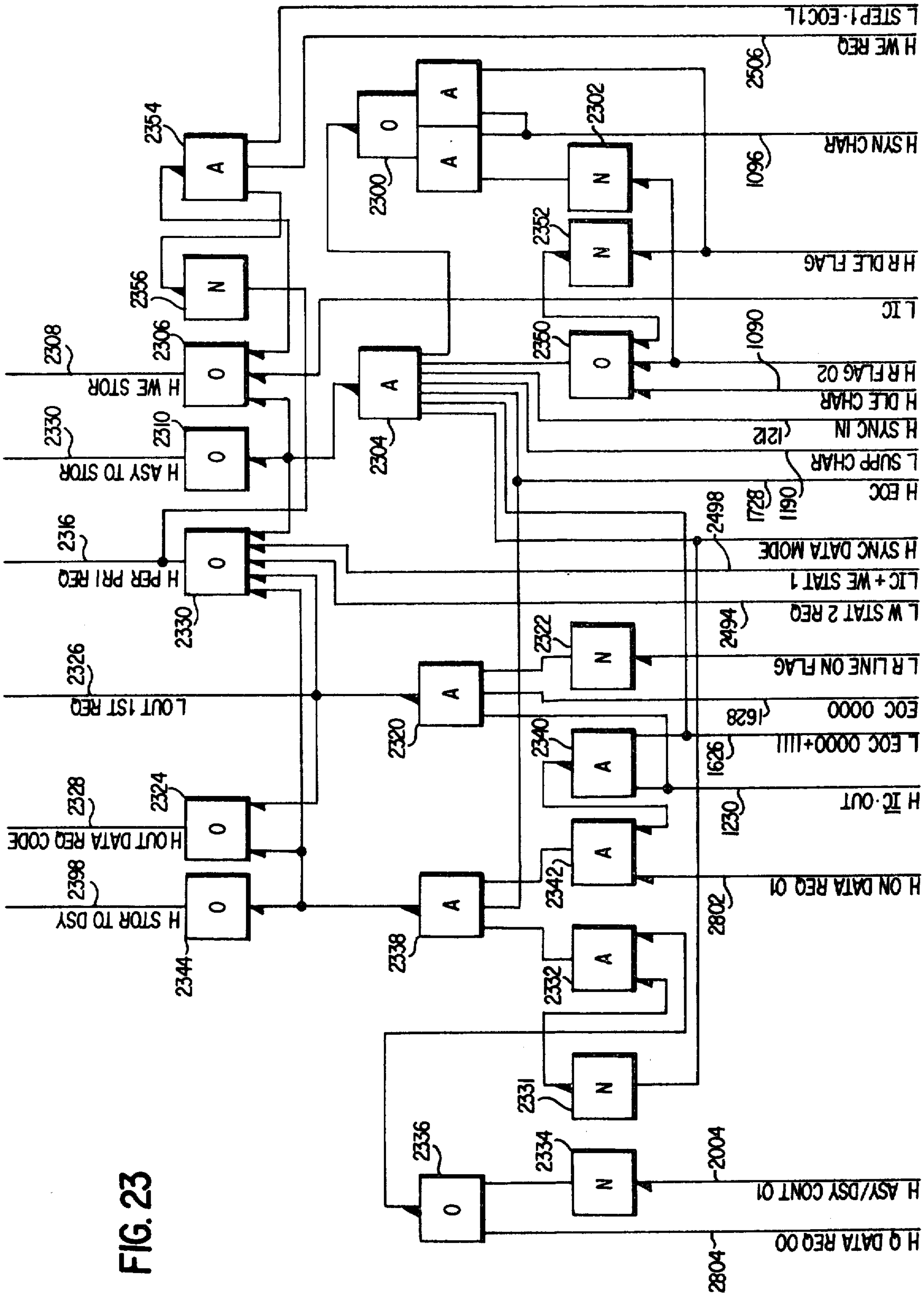
FIGS. 23, 24 and 25 show circuits for generating various data and status request signals.

Once the Sync data mode is established, the bits of a character are assembled one at a time in Assembly/-Disassembly area 210–310 as previously described, and at EOC time the assembled character is transferred to the storage area 410 of the main memory. In FIG. 23, AND 2304 produces a low level output signal that passes through OR 2306 to become the signal WRITE ENABLE STORAGE. In FIG. 5, this signal is applied to MUX 508 thus generating the signal ENABLE 8 for enabling the writing into the output of AND 2304 passes through OR 2310 to become the signal ASSEMBLY TO STORAGE. This signal is applied to FIG. 24 where it enables one input of AND's 2400, 2402 and 2404. If the assembled character is not a control character then the signal CONTROL CHARACTER REQUEST, produced by the CE and CI table gating circuits of FIG. 10, will be at a high level. AND 2402 produces a low level output signal which passes through OR 2046 to become the signal WRITE DATA REQUEST 00. If an assembled character should be a control character then the signal CONTROL CHARACTER REQUEST is inverted by NOT 2408 to enable AND 2404. In this case the ASSEMBLY TO STORAGE signal passes through AND 2404 and OR 2410 to become the signal WRITE DATA REQUEST 01.

Figure 25:
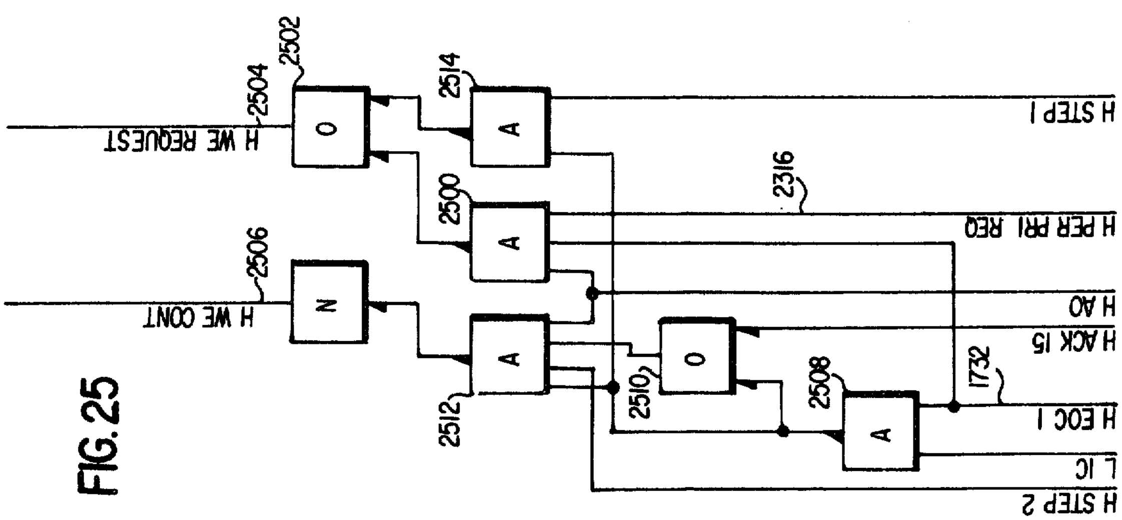
Figure 26:
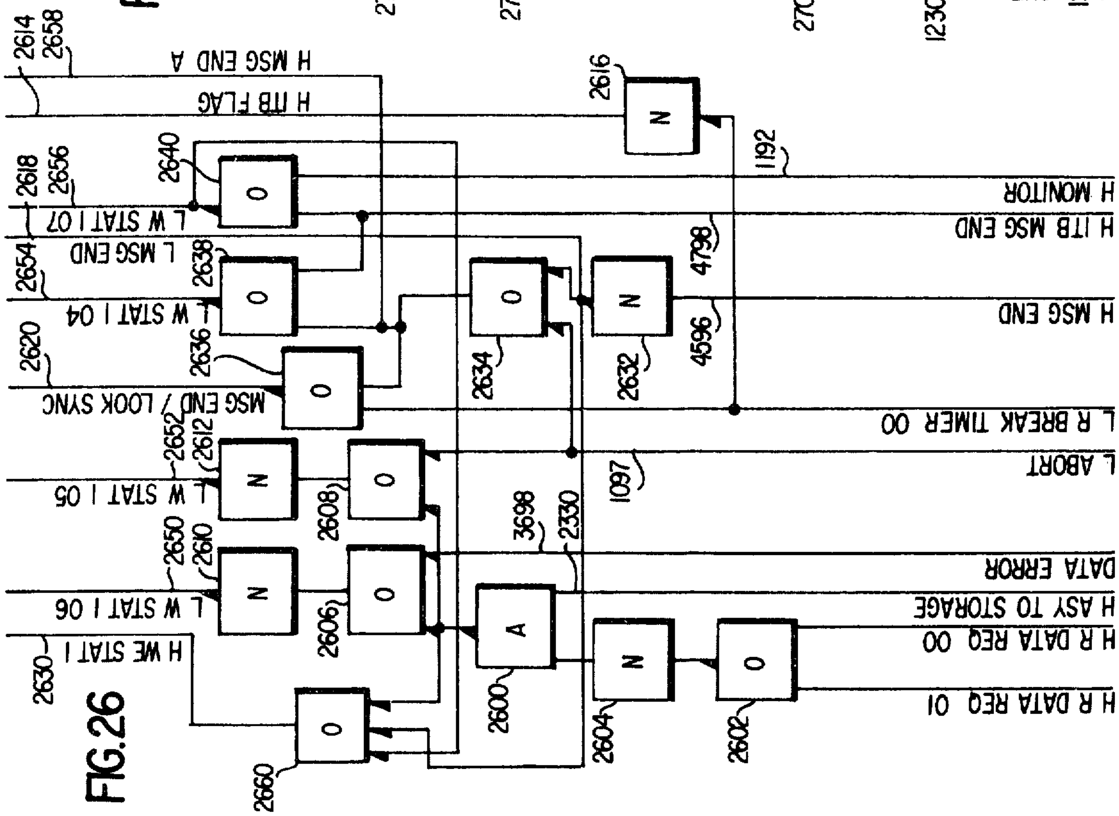
FIG. 26 shows the logic circuits for setting some of the status bits in a control word.

The WRITE DATA REQUEST signal generated by OR 2406 or OR 2410 is applied to the I/O request area of Main Memory 110. In order to write the date request signal into main memory, the signal WRITE ENABLE REQUEST must be generated. In FIG. 23, the output of AND 2330 passes through an OR 2314 to become the signal PERMIT PRIORITY REQUEST. In FIG. 25, this signal enables one input of AND 2500. A second input is enabled by EOC 1 and a third input is enabled by a timing pulse from the timing circuits. AND 2500 produces a low level output signal that passes through OR 2502 to become the signal WRITE ENABLE REQUEST. This signal is applied to FIG. 5 where it causes MUX 508 to produce the signal ENABLE 7, this latter signal being the write enabling signal for the I/O request area of Main Memory 110. Thus a request flag is stored in the main memory at the same time that an assembled character is transferred from the Assembly/-Disassembly area to the storage area of a control word. On the next major cycle, when the control word is again read out of the memory, the request flag is applied to the priority circuits to request that the assembled character be transferred from the storage area to a holding register. This request is acted on on a priority basis and may not be acknowledged at this time. However, since the CMM is free to begin assembling another character in the Assembly/Disassembly area all that is required is that the input request be honored before the next character is completely assembled. Should it not be honored, STATUS 1 bit 06 is set to indicate the problem. In FIG. 26, the signal Assembly to Storage is applied to one input of AND 2600 when the next character is assembled and ready for transfer to the storage area of Main Memory. If either the DATA REQUEST 00 or the DATA REQUEST 01 flag is still set, OR 2602 produces a low level output signal that is inverted by NOT 2604 to further enable AND 2600. AND 2600 produces a low level output signal that passes through OR's 2606 and 2608 and NOT's 2610 and 2612 to become the signals WRITE STATUS 1 06 and WRITE STATUS 1 05.

As previously stated, once the CMM has entered the Sync data mode the confidence counter maintains a count of 001. At an End Of Message this count is advance to 011 and the counter begins looking for sync again. When the message ends, the signal MESSAGE END/LOOK FOR SYN in FIG. 14 will go to the high level and condition one input of AND 1470. AND 1470 is further conditioned at this time by the signal 0 +0 1 which is at a high level because of the count in the confidence counter. Furthermore, because of this count the signal ASSEMBLY/DISASSMBLY 00 will be at a high level so AND 1470 produces an output signal that passes through OR 1418 to the B1 input of adder 1400. The B0 and B2 inputs of the adder receive low level signals. Therefore, the adder adds the two values 010 and 001 to obtain the value 011 which causes the circuits to begin looking again for synchronization.

There is one special situation in which the CMM enters the synchronous data mode but does not set the confidence counter to the value 001. This occurs when a single character is received. This character is interpreted by the CD and CI tables, and the gating circuits of FIG. 11 produce both of the signals SOM and EOM. The SOM signal passes through AND 1452 and OR 1422 before being applied to one input of AND 1472. The signal EOM is applied to a second input of AND 1472. The third input of AND 1472 is at a high level because of the SYNC IN signal. The signal SYNC EOC + C is at a high level because the confidence counter will be at a value of 1XX. With all inputs enabled, AND 1472 produces an output signal that passes through OR 1418 to the B1 input of adder 1400. The output of OR 1422 applies a carry input signal to adder 1400 and at the same time blocks AND's 1427, 1429 and 1431 so that low level signals are applied to the A inputs of the adder. The adder effectively adds the carry signal to the B input value of 010 to obtain the output value 011 which is stored in the Assembly/Disassembly area 1410.

During normal counting by the EOC counter, the signal Write EOC is produced in FIG. 17 by OR 1706 which is enabled by the output of AND 1740 during TP6–15. The Data Clock signal on lead 1548 is low from TP0–5 if a data pulse is received.

I/O SEQUENCING

Figure 48:
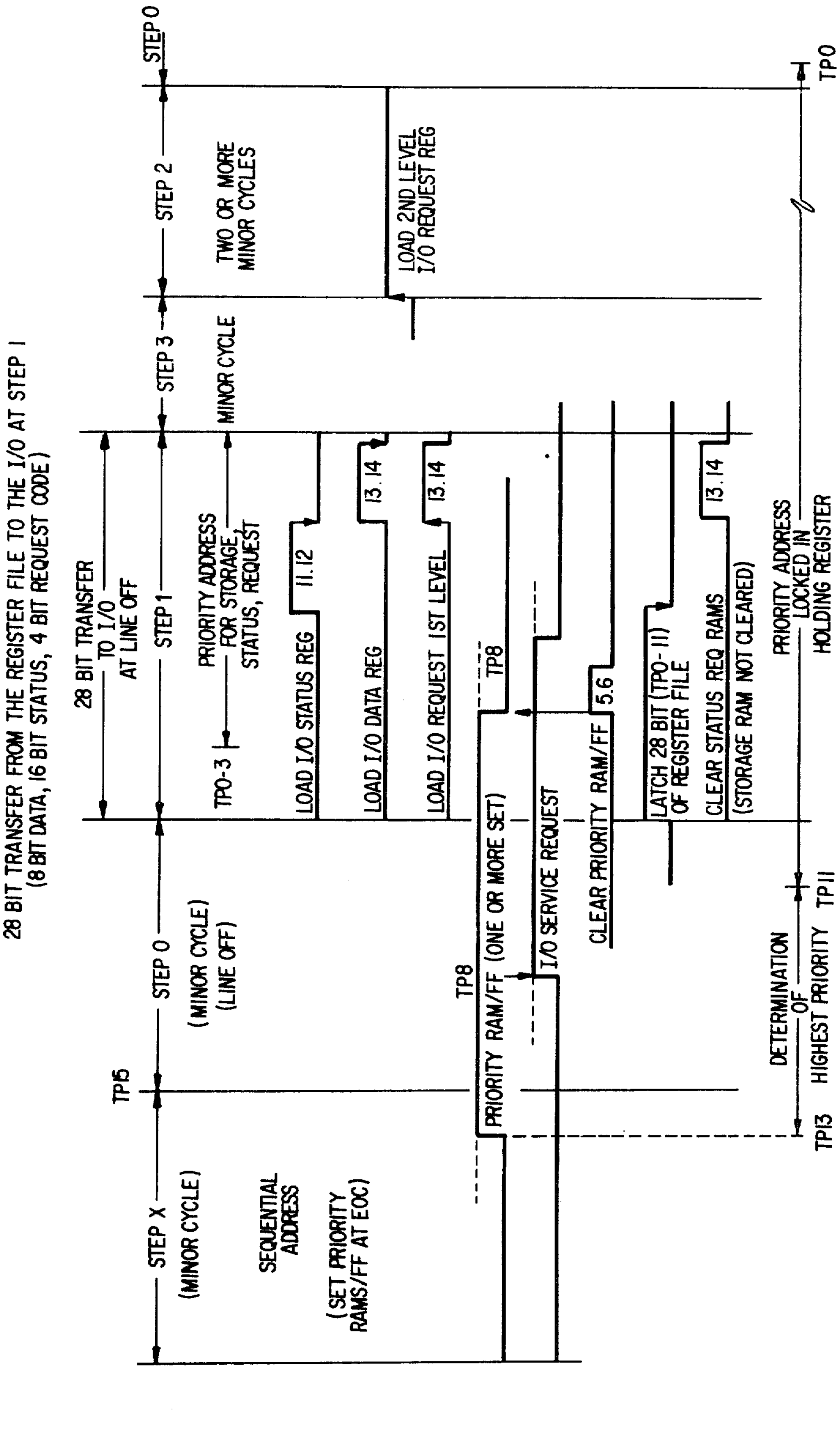
FIGS. 48, 49 and 50 are timing diagrams illustrating the I/O, input request and output request sequences.
Figure 49:
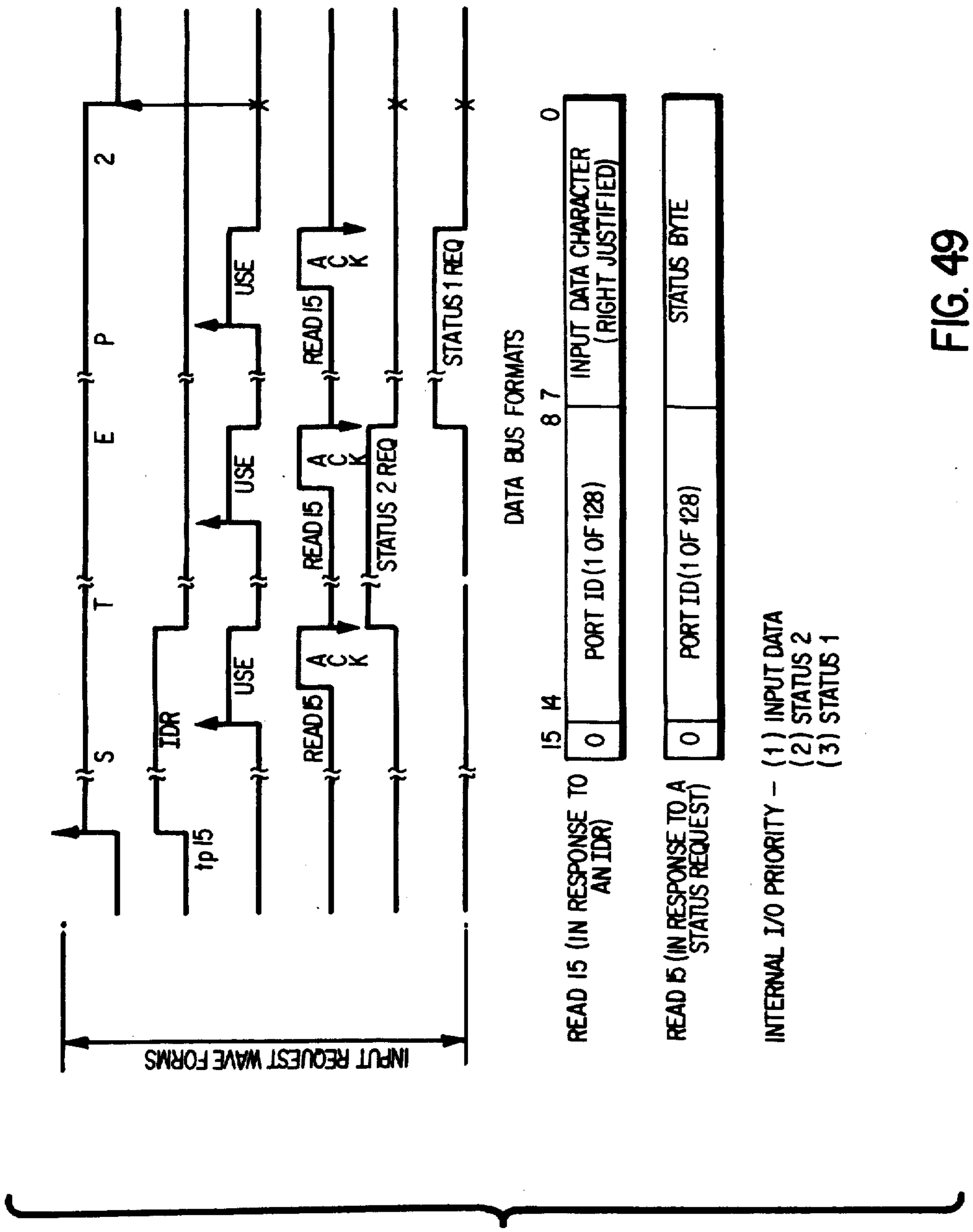
Figure 50:
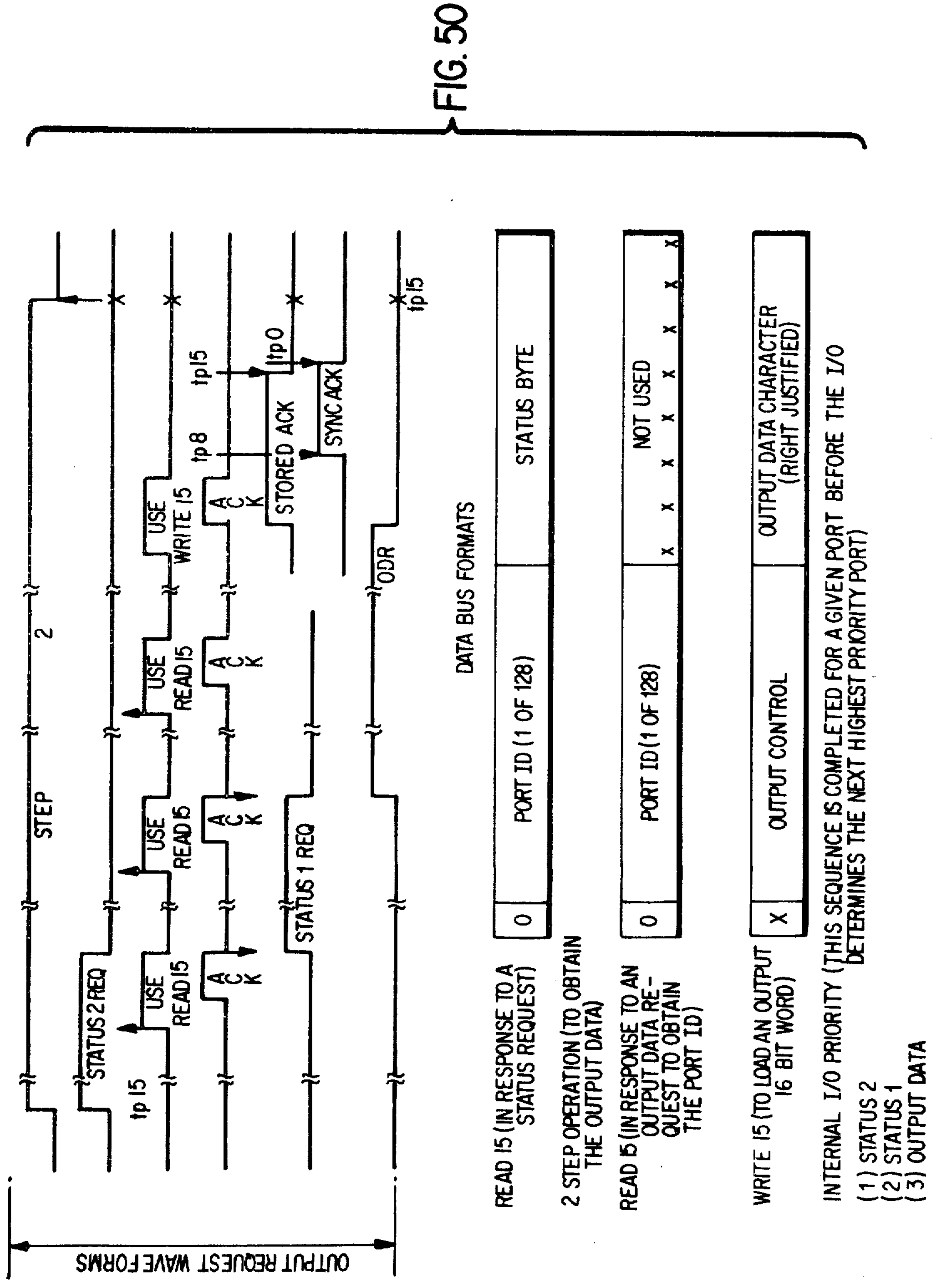

Although the details of all the logic circuits for executing an input or an output request are not shown in the drawing, FIGS. 48–50 do show the timing considerations involved.

In FIG. 48, on the EOC cycle, a request sets a flipflop in the priority circuits at TP13. The timing and scan control circuits begin a stepped sequence at TP15. In Step 0, at TP8, an I/O Service Request is made to the SPM. At the next TP15 the sequence is stepped to Step 1. During this step 28 bits are transferred from the main memory to holding registers, these bits including 8 data bits, 16 status bits, and 4 request bits, as described with reference to FIG. 1. The status bits are loaded into a status register at TP11–12, and the data is loaded into a data register at TP13–14. Also at TP13–14 an I/O Request is set and the status request memory is cleared. The sequence enters Step 3 which is merely a transition step until Step 2 occurs. At TP15 of Step 3, and I/O request register (2nd level) is loaded. The sequencer then enters Step 2 during which either the sequence shown in FIG. 49 is executed for an input operation, or the sequence shown in FIG. 50 is executed for an output operation. During these sequences, the SPM responds to the status requests by issuing Read 15 commands to transfer the data and status information to the SPM. In FIG. 50, the SPM issues the Write 15 command to load a new character into the storage area, and any output control bits into the I/O Request and control area, of the Main Memory.

SYNCRHONOUS OUTPUT OPERATION

Assuming that a control word has been loaded into the Main Memory 110 to control a port for a synchronous output operation, the operation of the CMM may be briefly described as follows. At LINE ON, the EOC Counter goes from 0000 to 1111 and simultaneously generates a first output data request for either the Normal Output mode or the SEND SYN mode. In the 1111 state the CMM checks to see if the line is a normal sync output line and if it is the EOC Counter goes to the 0001 state to begin generation of the first character of the synchronous output preamble. This character may be either a pad or a SYN character. At each DATA CLOCK the EOC Counter is advanced and a port select pulse is applied to the line adapter through the output multiplexer 116. At the proper EOC time, depending upon the character length, the CI and CD tables are activated to tell the CMM what to do with the particular character. The EOC time lasts only one minor cycle and the EOC Counter returns to the 0001 state. During the intervals preceding the first four EOC times the output preamble characters are disassembled. After the fourth preamble character has been transferred serially to the line adapter, the originally requested character is transferred from the Storage area of Main Memory 110 to the Assembly/Disassembly area provided the OUTPUT DATA REQUEST has been acknowledged by this time. If not, the data is late and the CMM automatically inserts a pair of SYN characters without raising any more output data requests, while it is awaiting the response to the first output data request. If the response is still late, two more SYN characters are inserted. When the OUTPUT DATA REQUEST is acknowledged, the CMM raises an OUTPUT DATA REQUEST for the next output character. If the character transferred from the SPM to the storage area of main memory is not valid then this character is thrown away and pair of SYN's are inserted. A new OUTPUT DATA REQUEST is raised for another character. The EOC counter continuously counts from 0001 to EOC time (depending on character length) and returns to 0001 until such time as the output line is turned off.

On the first minor cycle that the control word is read out of main memory after it has been stored therein, the following conditions prevail in FIG. 12. Either Byte 1 bit 4 or Byte 1 bit 5 will be at a high level and AND 1200 produces the low level signal LINE ON. This signal is inverted at NOT 1204 to give the high signal LINE ON. This latter signal is applied to FIG. 13 where it generates the IC + CLR PUL signal and the IC/CLR/-LINE OFF signal as previously described. These latter signals are applied to FIG. 5 to clear various areas of the control word. In FIG. 14 the signal IC/CLR/LINE OFF passes through NOT 1400 and blocks AND's 1402, 1404 and 1406 so that 000 is written into Assembly/Disassembly bits 00, 09 and 10.

In FIG. 12, the signal R Byte 4 01 will be at a high level because this bit is set for synchronous operation. The signal R Byte 1 02 is also at a high level because this bit is set to define an output operation. The signal IC is at a high level because there is no master clear operation at this time so AND 1224 produces the low level output signal $\overline{IC}$·OUT. The output of AND 1224 is inverted by NOT 1228 to give the high level signal $\overline{IC}$·OUT. In FIG. 14, the signal $\overline{IC}$·OUT passes through NOT 1408 to the Assembly/Disassembly area 1410 thereby enabling the OUT FLAG to be set at time TP 13–14. In FIG. 12, the output of NOT 1204 passes through OR 1260 and NOT 1262 to become the signal WRITE LINE ON FLAG. This enables the LINE ON FLAG to be written into the Assembly/Disassembly area control word at time TP 13 when the control word is returned to the Main Memory 110.

In FIG. 15, the low level signal IC/CLR/LINE OFF disables gates 1502, 1504, 1506 and 1508 so that the EOC area 1510 of the Main Memory is set to 0000 at time TP 13–14.

One major cycle later, when the control word is again read out of Main Memory, the EOC area 1510 is set to a value 1111. In FIG. 16, the value in the EOC area 1510 (0000) is applied to D/MUX 1600 which is enabled by the LINE ON signal. D/MUX 1600 produces the low level signal 0 on lead 1660 and this signal is applied to FIG. 17 where it passes through OR 1700 and NOT 1702 to become the signal WRITE EOC 1111. In FIG. 15, the signal WRITE EOC 1111 passes through OR's 1528, 1530, 1532 and 1534 and AND's 1502, 1504, 1506 and 1508 to the EOC area 1510. At time TP 13–14 of this minor cycle, the value 1111 is written into the EOC area 1510. The output of NOT 1702 is passed through OR 1706 to become the signal WRITE EOC, this signal being applied to FIG. 5 to generate the ENABLE 6 signals for writing into the EOC area.

Figure 24:
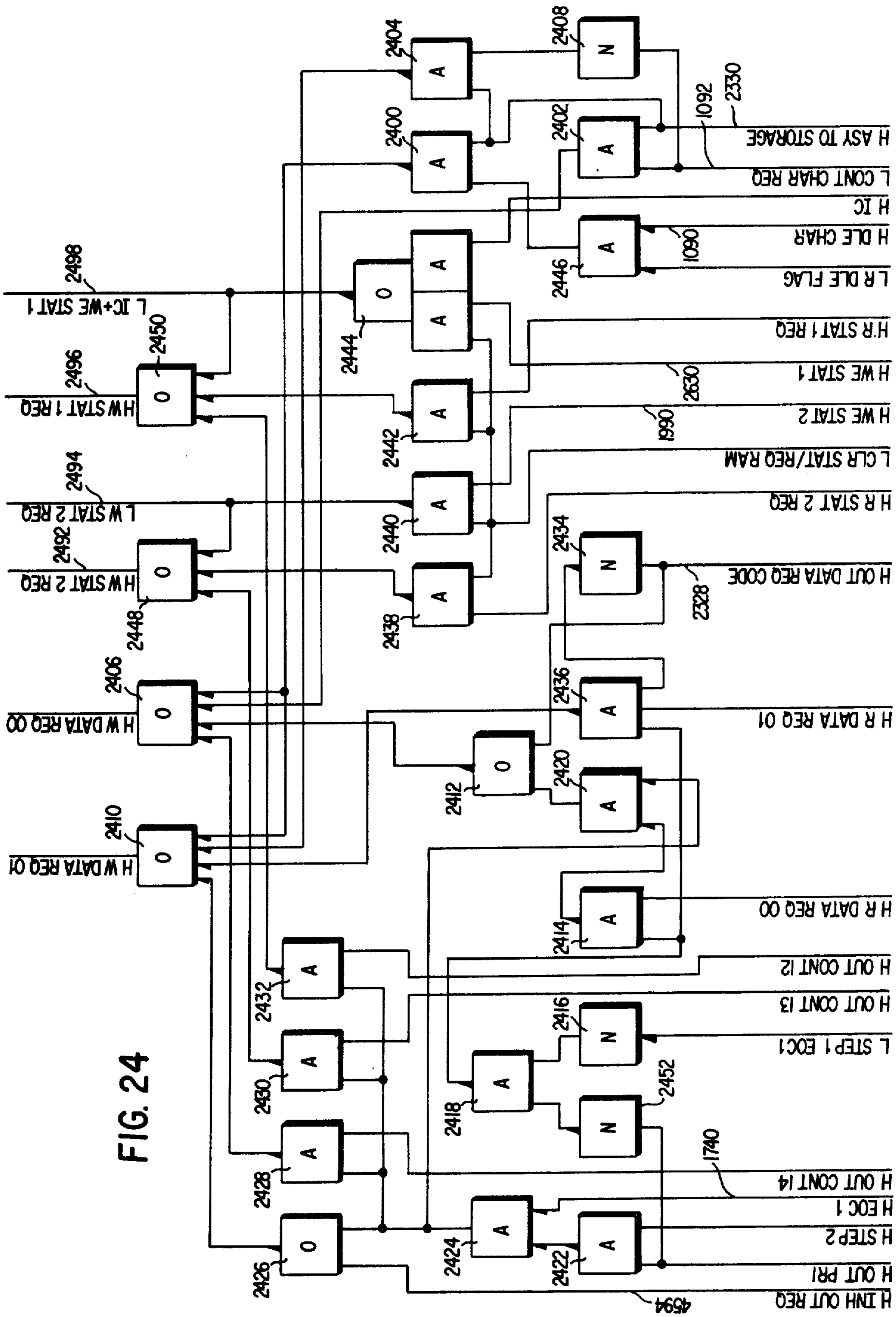

The 0 output of D/MUX 1600 is passed through a NOT 1620 to become the signal EOC 0000, and is passed through an OR 1622 and a NOT 1624 to become the signal EOC 0000 + 1111. In FIG. 23, the signal EOC 0000 enables one input of AND 2320. A second input is enabled by the signal $\overline{IC}$·OUT. The Line On Flag bit is passed through a NOT 2322 and enables a third input of AND 2320. The AND produces a low level output signal OUT FIRST REQUEST. The output of AND 2320 also passes through OR 2330 to become the signal PERMIT PRIORITY REQUEST, and passes through OR 2324 to become the signal OUTPUT DATA REQUEST CODE. In FIG. 17, the OUT FIRST REQUEST passes through OR 1730 to generate the signal EOC 1 and its complement on leads 1732 and 1740. In FIG. 24, the OUT DATA REQUEST CODE signal passes through OR 2412 and OR 2406 to become the signal WRITE DATA REQUEST 00. This data request signal is written into the memory at time TP 13–14 so that the next time the control word is read out of the memory this flag may seek access to the SPM through the priority circuits.

Since the Assembly/Disassembly area 1410 was cleared at the same time the EOC area was cleared at line on time, Assembly/Disassembly bits 00, 09 and 10 all contain zeros. In FIG. 21, bits 09 and 10 enable AND 1252 to produce the signal 0 + 1. In FIG. 14, the signal 0 + 1 passes through AND 1411 and through OR's 1418 and 1420 to the B1 and B0 inputs of Adder 1400. The value 000 from the Assembly/Disassembly area 1410 is applied to the A inputs of Adder 1400, and there is no carry input to the adder from the output of OR 1422. Therefore, the adder produces the value 011 which is stored in the Assembly/Disassembly area 1410 at time TP 13–14.

With the confidence counter containing the value of 011 and the EOC counter containing the value 1111, the CMM is ready to generate the preamble which must precede an output message. This preamble comprises four SYN characters if Byte 1 bit 7 is a 1, and comprises two pads (all ones) followed by two SYN characters if Byte 1 bit 7 is a 0.

In FIG. 12, R Byte 4 01 is at a high level for synchronous operation and the signal R Byte 1 02 is at a high level to designate an output operation. These signals are applied to decoder 1206 which also receives the low level output of AND 1200 at its SY input. The inverted output of AND 1200 enables the X input of decoder 1206, while the Y input is permanently enabled. The decoder unconditionally produces a low level output Y3 that is inverted by NOT 1270 to become the high level signal OUT SYNC. The output of NOT 1270 is applied to one input of AND 1272. The decoder produces a low level output X3 only if its input SX is at a low level. Assuming that the preamble is to comprise four SYN characters, Byte 1 07 will be at a high level to disable the SX input of decoder 1206, so that it cannot produce a low level at the X3 output. The signal R Byte 1 07 is applied to a second input of AND 1272 so as to produce the signal 4 SYN ON OUT. On the other hand, if the preamble is to comprise two PADS followed by two SYN's, the signal R Byte 1 07 is at a low level to block AND 1272. However, the signal R Byte 1 07 enables the SX input of decoder 1206 and the decoder produces a low level output signal to AND 1276. This AND is further conditioned by the output of OR 1278, either at EOC time or when the EOC counter contains a count of 1111. The output of AND 1276 enables one input of AND 1275, this latter gate being further conditioned by signals representing the count in the confidence counter derived from the Assembly/-Disassembly area 1410. If the value in the confidence counter is 011, then AND 1275 is enabled by the output of AND 1276 to produce the signal GENERATE PAD.

In FIG. 21, the signal 4 SYN ON OUT is applied to one input of AND 2160. The AND is further conditioned by the signal EOC + EOC 1111 derived from the output of OR 1278. The output of AND 2160 enables one input of AND-OR Inverter 2162. The second input of AND-OR Inverter 2162 is enabled by the signal $\overline{A} \cdot B \cdot \overline{C}$. AND-OR Inverter 2162 produces the signal GENERATE SYN which is applied to FIG. 20, where it passes through OR 2006 to enable one input of AND 2008. The signal GENERATE SYN is also applied to FIG. 19 where it passes through OR 1904 to become the signal DATA BIT 2. This latter signal is applied to a second input of AND 2008. The AND produces a low level output signal that is inverted by NOT 2010 to become the high level signal Assembly/Disassembly Control 01. The signal Assembly/Disassembly Control 00 will be at a low level at this time. In FIGS. 2 and 3, the signals Assembly/Disassembly Control 00 and 01 enable the A2 and B2 inputs of the D/MUX's at the input of Assembly/Disassembly area 210–310. These A2 and B2 inputs receive SYN characters from the DLE/SYN memory 680, either directly or indirectly as subsequently described.

Figure 7:
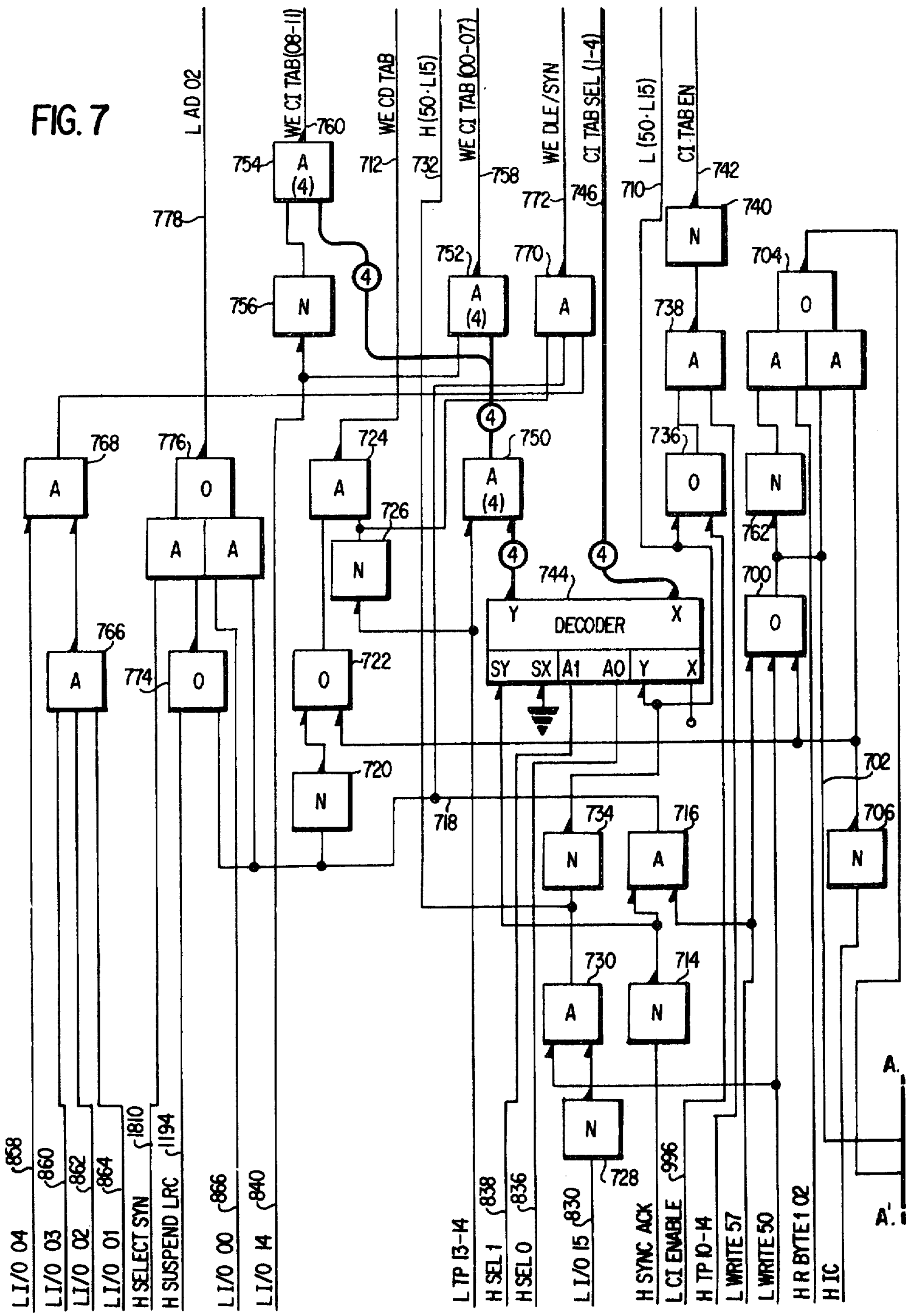
FIGS. 7 and 8 show the addressing and control circuits for CI, CD and DLE/SYN memories.

The SYN character is read out of the DLE/DYN memory 680 as follows. In FIG. 18, all inputs to AND 1806 are at a high level and the AND produces an output signal that is inverted by NOT 1809 to become the high level signal SELECT SYN. In FIG. 7, this signal is applied to one input of AND-OR Inverter 776. Both inputs to OR 774 are at a low level, so that its output enables the second input of AND-OR Inverter 776. The AND-OR Inverter produces the low level signal AD 02. This signal is applied as an addressing input to the DLE/SYN memory. In a manner subsequently explained, R Byte 2 07 and R Byte 2 06 are applied to a multiplexer 812 in FIG. 8, to generate two more addressing signals I/0 05 and I/O 06. These signals are applied to the DLE/SYN memory and, in combination with the signal AD 02, select an address in the memory which is storing a SYN character. The SYN character is then applied to the Assembly/Disassembly area 210–310. Actually, only DLE/SYN memory bits 00–04 are applied directly to the Assembly/Disassembly area. All of the memory bits are applied to a parity generator circuit as subsequently explained, and bits 05–08 of the Assembly/Disassembly area are filled from the priority circuit according to the length of characters the port is programmed to process.

If, instead of a SYN character, a PAD (all one's) is required as the first character of the preamble, it is generated as follows. In FIG. 12, AND 1275 produces the low level signal GENERATE PAD. This signal is applied to FIG. 19 where it passes through OR 1908, NOT 1910 and OR 1904 to become the signal DATA BIT 2. The output of NOT 1910 also passes through OR 1912 to become the signal DATA BIT 3. The signals DATA BIT 2 and DATA BIT 3 are applied to FIG. 20 where they enable AND's 2008 and 2012. The signal GENERATE PAD is also applied to FIG. 20, where it passes through OR 2006 to enable both AND's 2008 and 2012. The output of AND 2008 is inverted at NOT 2010 to become the high level signal Assembly/Disassembly Control 01. The output of AND 2012 is inverted by NOT 2014 to become the high level signal Assembly/Disassembly Control 00.

The signals Assembly/Disassembly Control 00 and 01 are applied to the D/MUX's in FIGS. 2 and 3 to enable the A3 and B3 inputs of these D/MUX's for writing into the Assembly/Disassembly area 210–310. The A3 and B3 inputs of the D/MUX's are all tied to a logic 1 voltage level, hence a PAD character comprising all 1's is written into the Assembly/Disassembly area.

At the same time the first character of the preamble is loaded into the Assembly/Disassembly area 210–310, the EOC counter is set to 0001. In FIG. 17, the output of NOT 1716 enables one input of AND-OR Inverter 1714 and the second input is enabled by the signal OUT SYNC which is at a high level. AND-OR Inverter 1714 produces the low level signal WRITE EOC 0001, which is applied to FIG. 15, where it blocks AND's 1520, 1522 and 1524, and enables AND 1562 through NOT 1560 to force a 1 into the low order. Thus, the value 0001 is written back into the EOC area 1510 at the same time the first preamble character is loaded into the Assembly/Disassembly area 210–310. In FIG. 17, the output of AND-OR Inverter 1714 passes through OR 1706 to become the signal WRITE EOC. In FIG. 5, this signal enables the writing into the EOC area by generating the signal ENABLE 6.

The CMM now goes through a character disassembly operation with the character in Assembly/Disassembly area 210–310 being disassembled one bit at a time and transferred to the line adapter. One bit is transferred each minor cycle that the control word is addressed if a data clock occurs. The EOC counter is set to 0001 as the first bit is removed from the Assembly/Disassembly area 210–310 and keeps track of the number of data clocks so as to determine when a complete character has been disassembled. AND 1740, acting through OR 1706, generates the Write EOC signal on each minor cycle so that the updated count may be written back into the EOC memory area.

When the EOC counter is set to 0001 the signal EOC 1111 is terminated and, in FIG. 12, the resulting high level output from OR 1278 blocks AND 1276 to prevent the signal GENERATE PAD, if the first preamble character was a pad. The output of OR 1278 is the signal EOC + EOC 1111 and, in FIG. 21, this signal blocks AND 2160 when it rises to the high level, thereby preventing the signal 4 SYN ON OUT from generating a SYN character, if the first character of the preamble was a SYN. In FIG. 20, the output of OR 2006 drops to the low level and blocks AND's 2008 and 2012, so that the signals Assembly/Disassembly Control 00 and 01 both drop to the low level.

FIG. 3 shows the path of the bits as they are disassembled in the Assembly/Disassembly area 310 and transferred to the line adapter. With the signals Assembly/-Disassembly Control 00 and 01 both at the low level, the AO and BO inputs of MUX's 308 and 316 are selected for entry into the Assembly/Disassembly area 310. The AO and BO inputs are the outputs of the Assembly/Disassembly area one bit to the left of the position being entered. That is, each time the Assembly/Disassembly area 210–310 is enabled by the ENABLE 1 signal, it shifts the bits therein one position to the right.

The data bits are removed from Assembly/Disassembly bit position 01 and are applied to and AND-OR Inverter 320. The signal SYNC is at a low level and, if the output data is not being inhibited, AND 322 produces a high level output signal to enable AND-OR Inverter 320. The AND-OR Inverter produces a low level output signal that passes through OR 324 to a multiplexer 326. For a normal data output, Byte 1, bits 01 and 03 will both be at the low level, thereby enabling AND 328 to produce a high level output signal to AND 330. AND 330 is further enabled by the signal R Byte 1 02 since the port is programmed for an output operation. AND 330 produces a low level output signal that is inverted by OR 332 and applied to MUX 326 to gate the output data through the MUX to the Input-Output Multiplexer 116, from whence it passes to the line adapter.

After the first preamble character has been disassembled and transferred to the line adapter, the EOC counter signals the completion of the character disassembly operation. In FIG. 16, the output of the EOC area 1510 is decoded by D/MUX 1600 and applied to the data inputs of D/MUX's 1630 and 1632. The D/MUX's receive as addressing signals, the OUT SYNC signal as well as the signals R Byte 2 04 and R Byte 2 05 which designate the length of the characters. The output of D/MUX's 1630 and 1632 are applied to D/MUX 1634 which selects either the output or D/MUX 1630 or D/MUX 1632 depending upon whether or not the port is programmed for the vertical redundancy check mode. In any event, when the character is the Assembly/Disassembly area has been completely disassembly, D/MUX 1634 produces the signal EOC MUX.

In FIG. 17, EOC MUX enables one input of AND 1722. At data clock time, the output of OR 1724 enables the second input of AND 1722 and it produces a low level output signal to OR's 1726 and 1730, to thereby generate the signals EOC and EOC 1 and their complements.

In FIG. 12, the signal EOC is applied to AND 1280 which is already conditioned by the output of decoder 1206. AND 1280 produces the signal OUT SYNC·EOC. The signal EOC passes through OR 1278 and enables AND 1276 which may be further enabled at this time, if the second preamble character is to be a pad. The output of AND 1276 passes through AND 1275 to become the signal GENERATE PAD. Also, the output of OR 1278 becomes the signal EOC + EOC 1111. These signals reset the EOC counter to 0001 and cause the second preamble character, either a pad or a syn, to be entered into the Assembly/Disassembly area 210–310.

In FIG. 21, the signal EOC + EOC 1111 enables AND 2160 and if the second preamble character is to be a SYN, the second input of AND 2160 is enabled, thereby applying a high level signal to AND-OR Inverter 2162. The signal $A \cdot B \cdot \overline{C}$ is still at a high level, because the confidence counter still contains a count of 011. AND-OR inverter 2162 therefore produces the signal GENERATE SYN. This signal is applied to FIG. 20, where it passes through OR 2006 to enable the transfer of the SYN character to the Assembly/Disassembly area 210–310 as previously described. On the other hand, if the second preamble character is to be a PAD, the output of AND 1275 will pass through the OR 2006 to cause entry of the PAD character into the Assembly/Disassembly area 210–310.

As the second preamble character is entered into the Assembly/Disassembly area, the confidence counter in FIG. 14, is decremented to a count of 010 and the EOC counter of FIG. 15 returns to the value 0001.

In FIG. 21, the signal OUT SYNC·EOC passes through OR 2102 to enable one input of AND 2104. The second input of AND 2104 is enabled by the signal $A \cdot B \cdot \overline{C}$ so that the AND produces the signal BIT BY BIT SYNC detected. In FIG. 14, this signal passes through OR 1440 and NOT 1442 to the inputs of OR's 1418 and 1425. OR 1418 applies a high level signal to the B1 input of adder 1400, and OR 1425 applies a high level input to the B2 input of the adder. In addition, the output of OR 1425 is passed through NOT 144 and OR 1422 to apply a high level to the BO input of the adder. The adder adds the value 111 and 011 to obtain the value 010 which is stored in the Assembly/Disassembly area 1410 at the same time the second preamble character is entered into Assembly/Disassembly area 210–310.

In FIG. 15, the signal EOC enables one input of AND-OR Inverter 1572. A second input of the AND- OR Inverter is enabled by the signal $\overline{IC}$·OUT. AND-OR Inverter 1572 produces a low level output signal to OR 1534 to thereby enter a 1 into the low order position of the EOC area. During this time, the low level signal EOC on lead 1736 blocks all outputs from the adder 1500.

The CMM disassembles the second preamble character and sends the bits, one each clock pulse, to the line adapter, as previously explained. The first two preamble characters are always followed by two SYN characters. When the EOC counter determines that the second character has been disassembled, it produces the signal EOC, and in FIG. 12 AND 1280 produces the signal OUT SYNC·EOC. In FIG. 21, this signal passes through NOT 2170 to enable one input of AND-OR inverter 2162. Since the confidence counter now contains a count of 010, all inputs to AND 2124 are at a high level and they produce an output signal that passes through OR 2172 to enable the second input of AND-OR inverter 2162. The AND-OR inverter 2162 produces the signal GENERATE SYN, which is applied to OR 2006 in order to generate the high level signal Assembly/Disassembly Control 01. The signal DATA BIT 3, will be at a low level, thus causing the signal Assembly/Disassembly Control 00 to be at a low level. From the preceding description, it is obvious that the signals on leads 2002 and 2004 condition the input multiplexers to Assembly/Disassembly area 210–310 so that the third preamble character (SYN) may be entered therein.

As the third preamble character is entered into the Assembly/Disassembly area, the EOC counter is returned to a count of 0001, in the same manner as was done after the second preamble character was inserted in the Assembly/Disassembly area. Furthermore, the confidence counter in FIG. 14 is advanced from a count of 010 to 111. In FIG. 21, the signal OUT SYNC·EOC passes through OR 2136 to enable one input of AND 2164. The confidence counter is holding the value 010, so all inputs to AND 2124 are enabled and its output is passed through NOT 2126 to enable a second input of AND 2164. Finally, the signal Message End/Look for Syn A is at a low level, so that AND 2166 produces a high level output signal to enable AND 2164. The output of AND 2164 is the signal DECREMENT COUNTER. It is applied to FIG. 14 where it passes through OR 1425 to apply a high level signal to the B2 input of adder 1400. The output of OR 1425 is inverted by NOT 1444 and passes through OR 1420 to apply a high level to the BO input of the adder. Thus, the adder sums the values 101 and 010 without a carry input to obtain the value 111. This value is written into the Assembly/Disassembly area 1410 at the same time the third preamble character is entered into the Assembly/Disassembly area 210–310.

The third preamble character is disassembled and sent to the line adapters and after the character is disassembled, the EOC counter again produces the signal EOC, as for the preceding character. The fourth preamble character must also be a SYN character. In FIG. 21, the signal OUT SYN·EOC passes through NOT 2170 to enable one input of AND-OR Inverter 2162. With a value of 111 in the confidence counter, all inputs to AND 2130 are enabled and it produces an output signal that passes through OR 2172 to further enable AND-OR Inverter 2162. The AND-OR Inverter produces the signal GENERATE SYN which is applied to FIG. 20 to again generate the high level signal Assembly/Disassembly Control 01 and the low level signal Assembly/Disassembly Control 00, to enable entry of the SYN character from the DLE/SYN memory into the Assembly/Disassembly area 210–310.

At the same time the fourth preamble character is entered into the Assembly/Disassembly area 210–310, the EOC counter is returned to the 0001 state. This is accomplished in the same manner is occured when the third preamble character was entered into the Assembly/Disassembly area. Also, the confidence counter has the count therein changed from 111 to 001. In FIG. 21, the signal OUT SYNC·EOC passes through NOT 2170 to enable one input of AND-OR Inverter 2141. With a count of 111 in the confidence counter, all inputs to AND 2130 are enabled and its output is inverted at NOT 2180 to enable the second input of AND-OR Inverter 2141. The AND-OR Inverter produces a low level signal SYNC OUT DATA MODE, that is applied to FIG. 14 where it passes through OR 1422 to become the signal SYNC DATA MODE. The high level output of OR 1422 blocks the AND gates at the A inputs of adder 1400. In addition, the high level output of OR 1422 is applied as a carry input to the adder. There are no B inputs to the adder at this time, hence the value 001 is produced at the output of the adder. This value is entered into the Assembly/Disassembly area 1410 at the same time the fourth preamble character is entered into Assembly/Disassembly area 210–310.

Back at the time the EOC counter went from a value of 0000 to 1111, before the generation of the preamble, the CMM generated an output data request. In FIG. 23, the signal EOC 0000 enables one input of AND 2320. The LINE ON Flag is set at this time so the output of NOT 2322 enables the second input of AND 2320. The signal $\overline{IC}$·OUT is at a high level and enables the third input of AND 2320 so that it produces the low level output signal OUT FIRST REQUEST. The output of AND 2320 also passes through OR 2324 to become the signal OUT DATA REQUEST CODE and passes through OR 2330 to become the signal PERMIT PRIORITY REQUEST.

In FIG. 17, the signal OUT FIRST REQUEST passes through OR 1730 to generate the signal EOC 1 and its complement on leads 1732 and 1740. The signal OUT DATA REQUEST CODE is applied to FIG. 24 where it passes through OR 2412 an OR 2406 to become the signal WRITE DATA REQUEST 00. This signal causes a request bit to be set in the I/O Request and Out control area of the control word at the same time that the EOC area of the control word has the value 1111 stored therein. The signal PERMIT PRIORITY REQUEST, with the signal EOC 1 and timing signal A0 enables AND 2500 and it produces a signal that passes through OR 2502 to become the Write Enable Request signal. The signal passes through MUX 508 at TP 13–14 to generate the Enable 7 signal. The enable signal enables the writing of the Data Request 00 into the control work at TP 13–14.

The signal PERMIT PRIORITY REQUEST on lead 2316 and the signals EOC 1 on leads 1732 and 1740 are applied to the Priority Control Circuit 146 where, in combination with the sequential addresses generated by timing control circuits 120, they store a request indication in the priority control circuits.

When priority is allotted to the port, the timing and sequence controller moves to STEP 1 and enables the transfer of 28 bits from the control word to the SPM/CMM interface. These 28 bits comprise STATUS 1, STATUS 2, STORAGE, and four positions of the I/O CONTROL AND REQUEST area of the control word. The sequencing circuits then move to step 2 where status request is made to the SPM. This initiates a cycle of operations during which the SPM loads the first character of the message into the Storage area 410 of the control word. During this interval, the scan by timing control 120 is stopped and the control word is randomly addressed in order to enter the character into the Storage area.

The first message character entered into the storage area may be held there until the preamble characters have been generated if this generation is not completed. Once the preamble characters have been disassembled and sent to the line adapters the first character is transferred from the storage area to the Assembly/-Disassembly area 210-310 and a request is made for another character.

In FIG. 19 at EOC time after the last preamble character has been disassembled, all inputs to AND 1930 are at a high level and it produces the low level signal STROBE. The Strobe signal is applied to the Decoder 2200 and, if the OUT CONTROL FLAGS 00, 01, and 02 are all at the low level all of the outputs of the Decoder will be at the high level. In FIG. 18, the high level signal Decode X0 blocks AND 1812 which in turn produces an output to block AND 1814, so that a high level signal is applied to one input of OR 1816. The other three high level outputs from the Decoder 2200 are applied directly to OR 1816 and since all of its inputs are at a high level it produces the low level signal Decode Bit 2. In FIG. 19, this signal blocks one input of OR 1936. OR 1936 is also receiving a low level signal from NOT 1938 as a result of a high level signal being produced by AND 1940. Therefore, OR 1936 applies a high level input to OR 1904. The signal GENERATE PAD is at a high level and blocks one input of OR 1908, the other input being blocked by the output of AND 1942 since the signal INSERT PAD is at a low level. Therefore, OR 1908 produces a low level output signal that is inverted by NOT 1910 to apply a high level signal to the second input of OR 1904. The signal GENERATE SYN is at a high level, hence all inputs to OR 1904 are blocked and it produces a low level output signal. In FIG. 20, the output of OR 1904 blocks AND 2008 so that the signal ASSEMBLY/DISASSEMBLY CONTROL 01 is at a low level.

In FIG. 23, the signal ASSEMBLY/DISASSEMBLY CONTROL 01 passes through NOT 2334 and OR 2336 to enable one input of AND 2332. The signal SYNC Data Mode is at a high level and, after inversion by NOT 2331, conditions AND 2332 so that it produces a high level output to AND 2338. Both inputs to AND 2340 are at a high level and its output conditions one input of AND 2342. At the time the character was transferred from the SPM to the control word memory, the DATA REQUEST 01 flag was set by a signal from the SPM. Therefore, the A latch of the 2 bit latch 2800 is set and the signal QN DATA REQUEST 01 is at a low level. This signal enables the second input of AND 2342 and its output in turn conditions AND 2338. Therefore, at EOC time following disassembly of the fourth character of the preamble, AND 2338 produces a low level output signal that passes through OR 2334 to become the signal STORAGE TO DISASSEMBLY. At the same time, the output of AND 2338 passes through OR 2324 and OR 2330 to generate the signals OUT DATA REQUEST CODE and PERMIT PRIORITY REQUEST to thereby request the next character as soon as priority can be allotted to the port.

The STORAGE TO DISASSEMBLY signal on lead 2398 is applied to FIG. 19 where it conditions one input of AND 1950. The other input of this AND is conditioned because the signal GENERATE SYN is at a high level. The output of AND 1950 passes through OR 1912 to become the signal DATA BIT 3. In FIG. 20, the signal DATA BIT 3 is applied to AND 2012 which is further enabled by the output of OR 2006 because of the EOC input thereto, so AND 2012 causes the signal ASSEMBLY/DISASSEMBLY CONTROL 00 to be at a high level. The combination of the low level signal ASSEMBLY/DISASSEMBLY CONTROL 01 and the high level signal ASSEMBLY/DISASSEMBLY CONTROL 00 selects the Al and B1 inputs of the D/MUX's on the input of the Assembly/Disassembly area 210–310 so that the contents of the Storage area 410 are gated therein. In FIG. 19, the signal ASSEMBLY/DISASSEMBLY CONTROL 00 passes through OR 1932 and OR 1900 to become the signal WRITE ENABLE ASSEMBLY/DISASSEMBLY. This latter signal is applied to FIG. 5 where it passes through MUX 500 to become the ENABLE 1 signal which enables the writing into the Assembly/Disassembly area.

PARITY INSERTION ON OUTPUT

Figure 27:
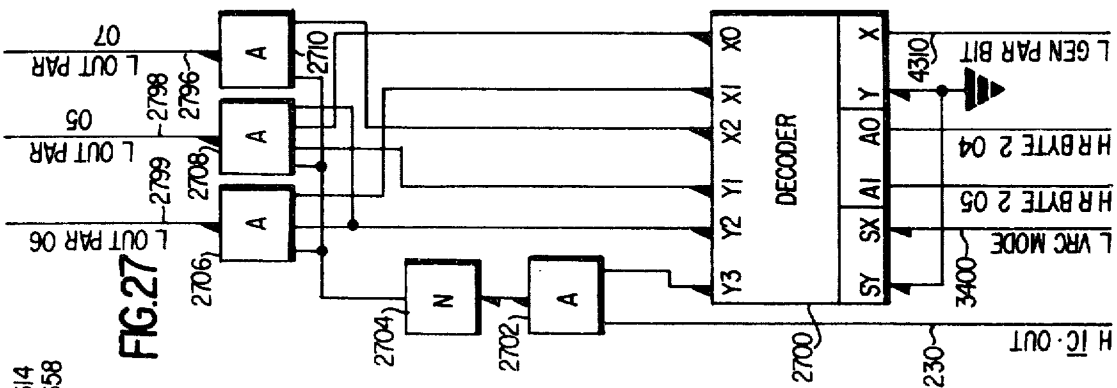
FIG. 27 shows the decoding logic for inserting a parity bit in an output character.
Figure 43:
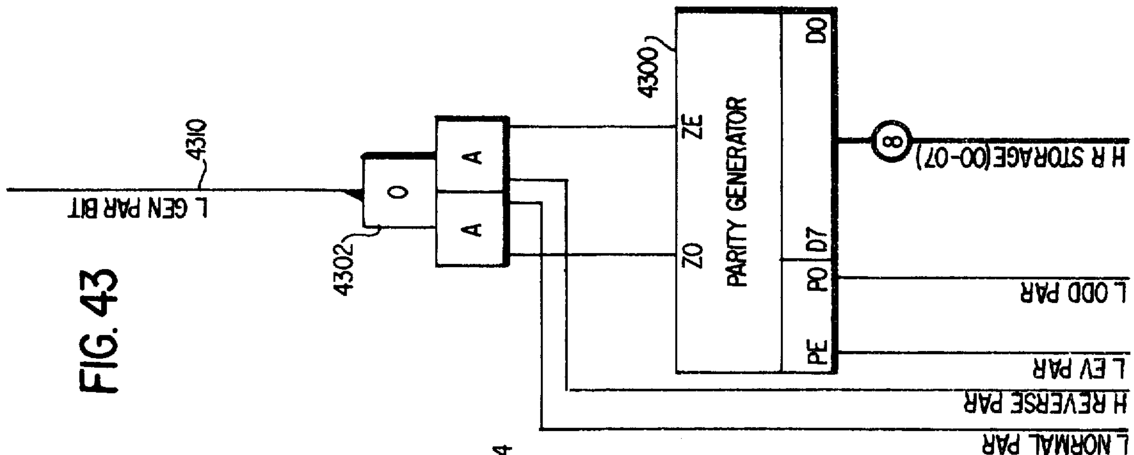
FIG. 43 shows a parity generator.

On synchronous output operations, a parity bit is generated for the output character in the storage area of Main Memory. This parity bit is generated in FIG. 43 and applied to FIG. 27 to enable the X input of Decoder 2700. The Y input as well as the SY enable input of Decoder 2700 are permanently enabled. If a parity bit is to be generated, the signal VRC MODE is at the low level and thus enables the SX input of the Decoder. Depending upon the length of characters being handled, Byte 2 bits 04 and 05 apply a combination of signals to the A1 and A0 inputs of the Decoder. The Decoder has three X outputs, one of which will drop to the low level if the value of the combination of signals applied to the Al and A0 inputs is 0, 1 or 2. The Decoder has three Y outputs, one of which will drop to the low level if the value of the combination of signals applied to the A1 and A0 inputs is 1, 2 or 3.

As an example, assume that the line is handling characters comprising six data bits plus a parity bit. In this case, the signals applied to the A1 and A0 inputs of the Decoder will have the value 01, so that the X1 and Y1 outputs of the Decoder are driven to the low level. These outputs block AND's 2706 and 2708. The X2 output of the Decoder remains at the high level and it enables one input of AND 2710. The Y3 output of the Decoder is at the high level and enables AND 2702 which is further enabled while the port is operating in the output mode. The low level output of AND 2702 is inverted at NOT 2704 to further enable AND 2710 and it produces a low level signal OUT PARITY 07. This signal is applied to FIG. 2 where it passes through OR 252 to the A1 input of D/MUX 208. At the same time the output character is transferred from the storage area to the Assembly/Disassembly area the parity bit is entered into bit position 8 of the Assembly/Disassembly area 210.

EOC MULTIPLEXER

The circuits shown in FIG. 16 provide a means for multiplexing the count in the EOC counter with the signals from Byte 2 representing character lengths so as to produce a signal at the appropriate time indicating that a complete character has been assembled or disassembled. Each time the count in the EOC area of Main Memory 110 is read out to the Holding Register 112, the signals R EOC 00–03 are applied to a D/MUX 1600. The G1 input of the D/MUX is tied to the low level and the G2 input is enabled by the signal LINE ON. Therefore, any time that the line is on D/MUX 1600 produces a low level signal at one of its 16 outputs depending upon the combination of signals applied to its A0–A3 inputs. Certain outputs of D/MUX 1600 are not used at all and other outputs are used only on asynchronous operations and hence are of no interest with respect to the present invention.

The 0 output of MUX 1600 is the signal 0. This output is also passed through a NOT 1620 to become the signal EOC 0000. Output 1 of D/MUX 1600 is passed through a NOT 1610 to become the signal EOC 0001. The 15 output of D/MUX 1600 is the signal 15 and this signal is also applied to OR 1622. The output of OR 1622 is inverted by NOT 1624 to become the low level signal EOC 0000 + 1111.

Outputs 5, 6, 7 and 8 of D/MUX 1600 are applied to two data selector/multiplexers 1630 and 1632. Output 5 is applied to the D1 input of D/MUX 1630. Output 6 is applied to inputs D3 and D0 of D/MUX 1360 and D1 of D/MUX 1632. Output 7 is applied to the D2 and D5 inputs of D/MUX 1630 and the D3 and D0 inputs of D/MUX 1632. The output 8 is applied to the D5 input of D/MUX 1632.

Data selector/multiplexers 1630 and 1632 are addressed in parallel by the signals R Byte 2 05, R Byte 2 04, and OUT SYNC. Both 1630 and 1632 are permanently enabled by having the enabling input tied to a low level source.

Considering D/MUX 1630, one of the data inputs D0–D7 will be connected to the output depending upon the combination of addressing signals applied to the D/MUX. The output of D/MUX 1630 is applied to the D5 input of a further data selector/multiplexer 1634.

D/MUX 1632 is similar to D/MUX 1632 but has its output connected to the D1 input of D/MUX 1634. The addressing inputs A0 and A1 of D/MUX are tied to a high and a low voltage source respectively, hence D/MUX will have either its D1 or its D5 input connected to the output leads 1650 depending upon whether the signal VRC MODE on lead 3400 is at a low level or a high level.

Assume for example, a synchronous output line working with 6 bit characters, excluding parity, and not operating in the vertical redundancy check mode. In order to operate with 6 bit characters without parity, Byte 2 bit 05 must be a zero and Byte 2 bit 04 must be a 1. These signals, in combination with the OUT SYNC signal on lead 1298, apply the binary address 011 to D/MUX's 1630 and 1632. This selects the D3 inputs of D/MUX's 1630 and 1632. The signal VRC mode will be at the high level, hence the D5 input of D/MUX 1634 is connected to the output line 1650.

On the major cycle following that in which the EOC counter reaches a count of 6, the combination of signals applied to the A0-A3 inputs of D/MUX 1600 cause a low level signal to be produced at the number 6 output. This signal passes through the D3 input of D/MUX 1630 and D5 input of D/MUX 1634 to become the signal EOC MUX.

As a second example, assume the same conditions as in the preceding example, except that the port is operating in the VRC mode so that the signal on lead 3400 is at the low level, thereby selecting the D1 input of D/MUX 1634. The B3 inputs of D/MUX's 1630 and 1632 are selected as before. However, when the count in the EOC counter reaches the value 6, the output from D/MUX 1600 passes through the D3 input of D/MUX 1630 and is blocked at the D5 input of D/MUX 1634. During this minor cycle, the count in the EOC counter is incremented to 7 and restored in memory. One major cycle later, when the incremented count is read out of memory into the Holding Register 112, the signals applied to D/MUX 1600 cause a low level output from its number 7 output terminal. This signal passes through the D3 input of D/MUX 1632 and the D1 input of D/MUX 1634 to become the signal EOC MUX.

From the preceding examples, it should be obvious as to the other possible combinations which may be employed to generate the signal EOC MUX at the appropriate time at the end of a character.

CHARACTER DETECTION AND CHARACTER INTERPRETATION

Figure 6:
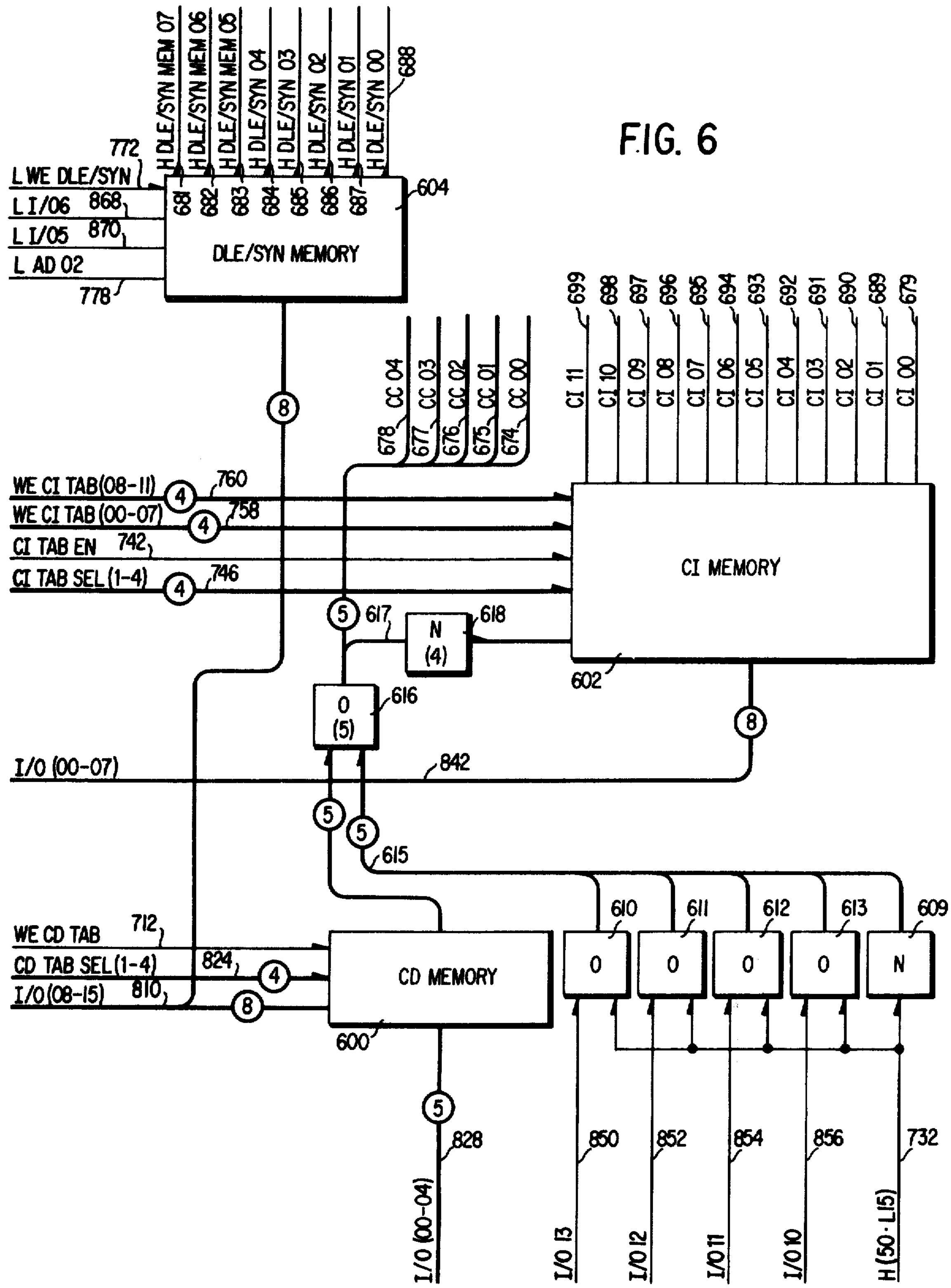
FIG. 6 shows the CI, CD and DLE/SYN memories.

The Character Detection (CD) and Character Interpretation (CI) Memory tables are shown in FIG. 6. The purpose of these tables is to analyze each input or output character and determine what action or operation needs to be performed immediately by the CMM. There are two sequential look-up operations involved in the use of the CD and CI tables. As a first step, either an input character from the assembly area of Main Memory 110 or an output character from the storage area of Main Memory 110 is converted into a CMM 5-bit code. This is accomplished by using the input or output character to address the CD table. The second step consists of interpreting the 5-bit code thus obtained in either fixed hardware or by referencing the CI table to determine which specific function or functions are to be performed for the character obtained during the first step. There are four CD tables, all located in a random access CD Memory 600. Each CD table is capable of storing 256 words of 5-bits each. There are four CI tables located in a CI Memory 602 with each table comprising 16 words of 12-bits each. Bytes 2 and 3 of each word in Main Memory 110 contain a code specifying which CD table and which CI table are to be selected each time the word is read out of Main Memory.

Figure 8:
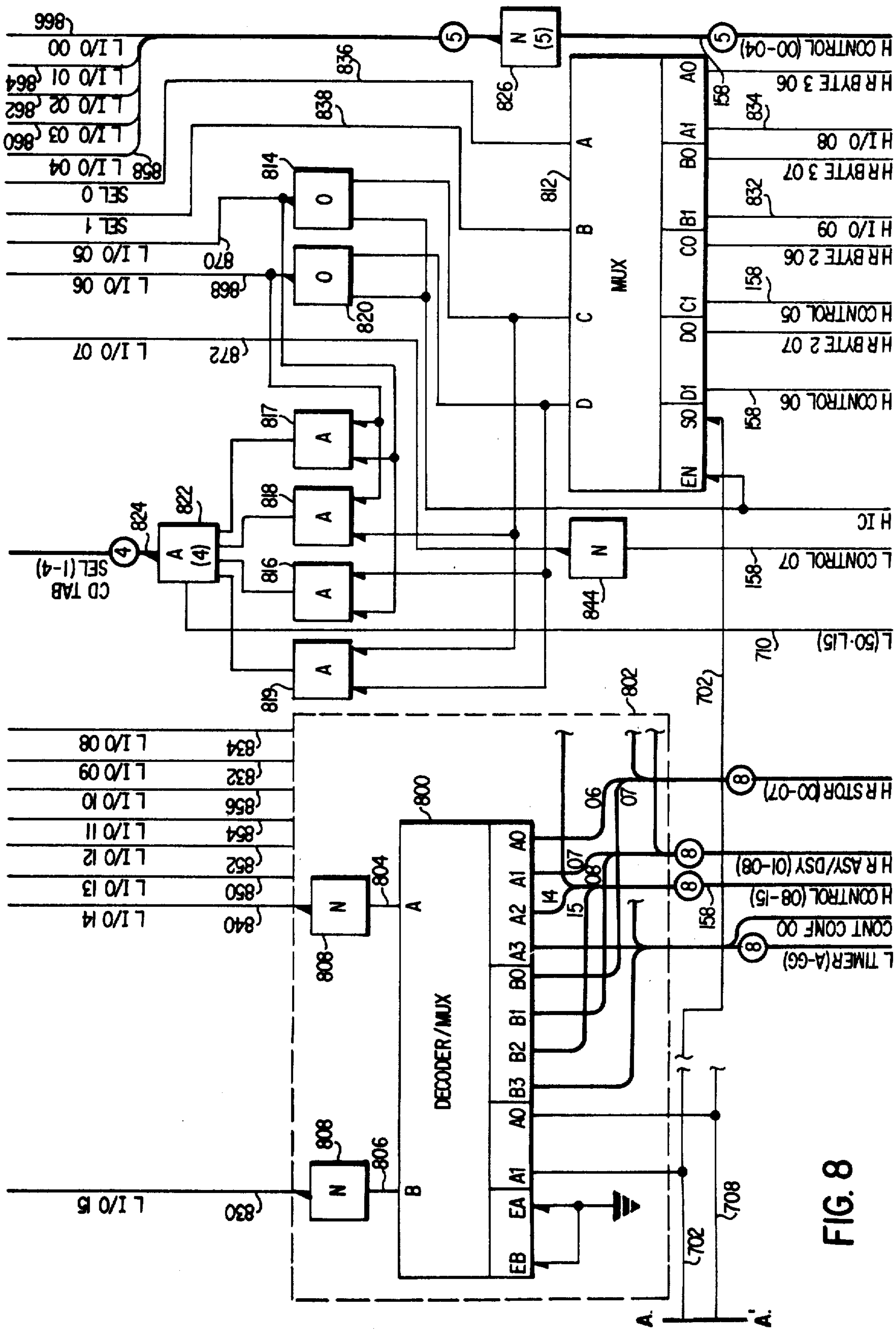
Figure 8A:
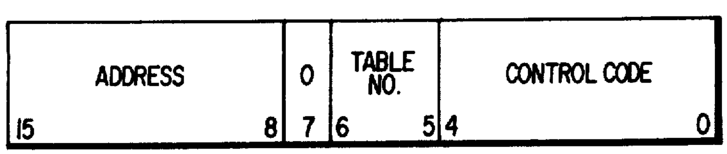
FIGS. 8A and 8B illustrate the format of control words used for initially loading the CI and CD memories.

The data inputs for loading the CD tables and the addressing controls for the CI and CD tables are shown in FIGS. 7 and 8. A particular location in a CD table is loaded by a Write 57 command in conjunction with a control word having the format shown in FIG. 8A. As shown in FIG. 1, the command and control word come from the SPM/CMM Interface circuit with the control word being applied to the CD and CI table control circuits over the bus 158. Bits 8–15 of the control word contain a character code. This code represents the character to be detected. Bits 5 and 6 represent the table to be selected and bits 0–4 represent the 5-bit character to be read out of the specified CD table each time that table is selected and addressed by an input or output character having the code specified by bits 8–15.

In FIG. 7, the Write 57 command is a low level signal and is applied to OR 700 to produce a high level output signal that is applied over a lead 702 to the A1 inputs of four Decoder/ MUX circuits 800. For purposes of simplification, only one Decoder/MUX 800 is shown, the four decoders being represented by the reference numeral 802.

The output of OR 700 is applied to one input of an AND-OR Inverter 704. The signal IC on lead 706 is normally at a low level except when a channel is being cleared so NOT 706 applies a conditioning signal to the second input of AND-OR Inverter 704. AND-OR Inverter 704 produces a low level signal on lead 708 that is applied to the A0 input of the four Decoder/MUX circuits 800. The combination of a high level signal on lead 702 and low level signal on lead 708 conditions the Decoder/MUX's so that the A2 data input is connected to output 804 and the B2 data input is connected to the output lead 806. Bits 08–15 of the control word on bus 158 are applied to the A2 and B2 inputs of each Decoder/MUX 800. Control bits 15 and 14 are applied to the B2 and A2 inputs of the Decoder/MUX shown, and the remaining bits 13–08 are applied to the B2 and A2 inputs of the three Decoder/MUX's not shown.

The eight outputs from the four Decoder/MUX's 800 are passed through eight NOT circuits 808 to become the signals I/O 15 through I/O 08. In FIG. 6, these signals are applied by way of a cable 810 to the CD memory for selecting an address in one of the four tables.

The circuits for selecting which table is addressed are shown in the right portion of FIG. 8. Control word bits 05 and 06 from the control bus 158 are applied to the C1 and D1 inputs of a MUX 812. The signal IC is at a low level, except during a channel clearing operation, hence, the MUX is enabled. The signal on lead 708 is at a low level during a write 57 operation, as explained above so the A1, B1, C1 and D1 inputs of MUX 812 are connected to the A, B, C, and D outputs. The C output of MUX 812 is applied through an OR 814 to one input of two AND's 816 and 817. The D output of MUX 812 is applied through an OR 820 to one input of ANd 817 and to one input of a further AND 818. The C output of MUX 812 is applied directly to an input of AND 818 and is also applied to one input of a further AND 819. The D output of MUX 812 is applied directly to second inputs of AND's 816 and 819. The output of each AND 816-819 is applied to one input of four AND's collectively represented by the reference numeral 822. The AND's 822 are further conditioned by the signal 50·L15 on lead 710 which is at a high level during the Write 57 operation. The output signals from the four AND's 822 are the CD TABLE SELECT signals. These signals are applied over a bus 824 to the CD memory 600 to select which table in the CD memory will be addressed by the address appearing on bus 810.

The CD memory cannot have data written therein unless it receives a Write Enable signal on the lead 712. This signal is derived in FIG. 7. The signal SYNC ACK on lead is generated by the timing and sequence control circuits 120 and is at a high level from TP8 through TP14. This signal is inverted by a NOT 714 and applied to one input of an AND 716. The AND is further conditioned by the low level Write 57 command and produces a high level output on lead 718 that passes through a NOT 720 and an OR 722 to condition one input of an AND 724. The low level timing pulse TP13–14 is applied through a NOT 726 to the second input of AND 724 so that the AND produces the low level signal Write Enable CD Table. This signal is applied over the lead 712 to enable the CD Memory 600 so that the writing into the memory takes place during time TP13–14.

The five data bits written into the CD memory are the bits 0–4 of the control word on bus 158. These bits are applied to five NOT's 826 where they are inverted to become the signals I/O 00 – I/O 04. These signals are applied to the data inputs of the CD Memory 600 over a bus 828.

LOADING THE CI TABLES

The Write 50 command is employed to load the CI memory 602. The CMM/SPM Interface circuits generate the command Write 50 and place on the control bus 158 a control word having the format shown in FIG. 8B. Actually, it takes two control words in order to load a particular address in a CI Table. Loading is accomplished by a first Write 50 operation wherein bit 14 of the control word is a 0 thereby specifying that bits 0–7 of the control word have to be loaded into the eight least significant bits of the selected address. This is followed by a second Write 50 operation with bit 14 of the control word being a 1, thereby indicating that bits 0–3 of the control work are to be loaded into the four most significant bits of the selected address. Bits 8 and 9 of the control word define which of the four tables contains the address to be loaded, and bits 10–13 of the control word define the address to be loaded.

The Write 50 command from the CMM/SPM Interface enters FIG. 7 and is applied to OR 700 in the same manner as the Write 57 command described above. Thus, the output signals from OR 700 and AND-OR inverter 704 appearing on the leads 702 and 708 condition Decoder/MUX's 800 in the same manner as for loading the CD tables. That is, the A1 and B1 inputs are selected so that bits 08–15 of the control word pass through the Decoder/MUX's to generate the signals I/O 08 through I/O 15.

The signal I/O 15 is applied to FIG. 7 and since bit 15 of the control word is a zero, the signal I/O 15 is at the high level. The signal is passed through a NOT 728 and conditions one input of an AND 730. The second input of AND 730 is conditioned by the Write 50 command, hence AND 730 produces the high level output signal 50·L15 on lead 732. In FIG. 6, this signal is applied to the input of a NOT 609 and one input of each of four OR's 610, 611, 612, and 613. The signals I/O 10 through I/O 13 are applied to the second input of OR's 610 through 613, respectively, Therefore, the output of OR's 610–613 is a combination of signals corresponding to the value contained in bits 10 through 13 of the control word. These signals are applied over bus 615 to four of five OR's 616, the fifth OR receiving the output of NOT 609. The outputs of the four OR's pass over a bus 617 and through four NOT's 618 before being applied to the CI Memory 602. The combination of the four signals selects one of 16 addresses of a table in the CI Memory.

The output of NOT 609 passes through one of the OR's 616, but is not applied as an addressing signal to the CI memory. Instead, it becomes the signal CC 04 which is applied to FIG. 9 to enable certain gating functions in that figure. The outputs of the other OR's 616 are the signals CC00–CC03 which are applied to FIG. 9.

To enable the CI tables, the output of AND 730 is passed through a NOT 734 and an OR 736 to one input of an AND 738. The signal TP 10–14 is at a high level during TP 10–14 of each minor cycle to further condition AND 738. The resulting low level output from AND 738 is inverted by a NOT 740 to become the signal CI Table Enable. This signal is applied to FIG. 6 where it passes over the lead 712 to enable readout gates for the tables in the CI Memory. For purposes of the present explanation, this readout is not utilized.

Figure 8B:
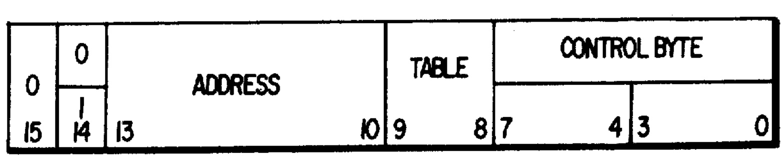

As shown in FIG. 8B, bits 08 and 09 of the control word determine which CI table will be loaded. In FIG. 8, control bits 08 and 09 pass through the Decoder/MUX 800 to become the signals I/O 8 and I/O 9. These signals are applied to the A1 and B1 inputs of MUX 812 by way of leads 832 and 834. Since the signal on lead 708 applied to the SO terminal of MUX 812 is at a low level as previously described, the bits I/O 08 and I/O 09 pass through MUX 812 and appear on output leads 836 and 838 as the signals SEL O and SEL 1. In FIG. 7, these signals are applied to the addressing inputs of a Decoder 744 having four X outputs and four Y outputs. The X data input of the Decoder is tied to a high level voltage source and the SX input is tied to a low level source so that, depending upon the combination of signals applied to AO and A1, one of the four X outputs in bus 746 will be at a low level. The signals on bus 746 are applied to FIG. 6 where they select one of the four tables in the CI memory.

In FIG. 7, when the signal SYNC ACK goes to the high level during the loading operation it is inverted at NOT 714 and applied to the SY input of the decoder 744. This enables the decoder so that a low level signal at the Y input may be directed to one of the four Y output lines in bus 748, depending upon the combination of addressing signals applied to inputs A0 and A1. Since a Write 50 operation is being performed, and bit 15 of the control word is a zero, both inputs of AND 730 are at the low level and the high level output of the AND is passed through NOT 734 to condition the Y input of decoder 744. The four Y outputs of decoder 744 are applied to the four AND's 750 and the second input of each AND 750 is conditioned by the low level timing signal TP 13-14. The outputs of AND's 750 are applied to four AND's 752 and four further AND's 754. The signal I/O 14 derived from FIG. 8 is applied to one input of each of the AND's 752. The signal I/O 14 is passed through a NOT 756 and applied to each of the AND gates 754.

If bit 14 of the control word is a zero, then the signal I/0 14 is at a high level and conditions all of the AND's 752. One of the AND's 752 produces a low level output signal Write Enable CI Table (00-07) and this signal is applied to FIG. 6 where it enables bit positions 00 through 07 of the selected table. On the other hand, if bit 14 of the control word is a one, then the signal I/O 14 is at a low level and the signal passes through NOT 756 to condition the four AND's 754. One of the AND's 754 produces a low level output signal Write Enable CI Table (08–11) and this signal is applied to FIG. 6 where it enables the writing into bit positions 8 through 11 of one of the four tables.

The circuits for gating either bits 0–3 or bits 0–7 from the control bus 158 to the CI memory are shown in the right portion of FIG. 8. Control bits 00–04 pass from the control bus 158 and through five NOT's 826 to become the signals I/O 00 – I/O 04. These signals are applied to FIG. 6 where they pass over a bus 842 to the data inputs for bits 00 through 04 of the memory. If bit 14 of the control word is a 1, so that only bits 08-11 of the memory receive the Write Enable signal, only the signals I/O 00 through I/O 03 are entered into the memory and these bits go into bit positions 08–11 of the addressed table word. On the other hand, if bit position 14 of the control word is a zero, then all of the signals I/O 00 – I/O 04 are entered into the addressed table word, but enter bit positions O through 4 of the word. In addition, bit positions 95, 06 and 07 of the addressed table word, are filled as follows.

Bit position 07 from the control word bus 158 is connected to a NOT 844 and the output of this NOT is the signal I/O 07. This signal is applied to FIG. 6 where it passes over bus 842 to bit position 07 of the addressed table word. Bit positions 05 and 06 from the control word bus 158 are connected to the C1 and D1 inputs of MUX 812, and since the signal applied to the SO input of the MUX is at the low level, these signals appear at the C and D outputs of the MUX. The signals pass through OR's 814 and 820 to become the signals I/0 05 and I/0 06. These latter signals are applied to FIG. 6 where they pass over the bus 842 to bit positions 05 and 06 of the addressed table word.

CD and CI TABLES-NORMAL OPERATION

On a minor cycle when the CD Memory is servicing an input port, it is addressed by bits 01–08, from the Assembly/Disassembly area 210–310 of the Main Memory 110. On the other hand, on a minor cycle that the CD Memory is servicing an output port, it is addressed by bits 00–07 from the Storage area 410 of the Main Memory 110. Byte 1 bit 02 from the control word in Main Memory 100 specifies whether the port controlled by that control word is an input port or an output port. If the control word is associated with an input port, the signal R Byte 1 02 (FIG. 7) is at the low level and blocks one input of AND-OR Inverter 704. The signal IC is at the low level and is inverted by NOT 706 to apply a high level signal to OR 700. This OR also receives high level signals at its other inputs since the commands Write 50 and Write 57 are not active.

OR 700 produces a low level output signal on lead 702 that is applied to the A1 addressing input of Decoder/Mux's 800. In addition, the low level output of Or 700 blocks the second AND input to AND-OR Inverter 704 so that a high level signal appears on the lead 708. This signal is applied to the AO input of Decoder/Mux's 800. The combination of a high level signal on lead 708 and low level signal on lead 702 enables the Decoder/MUX's 800 so that the A1 and B1 inputs are connected to the outputs 804 and 806. Thus, bits 01–08 from the Assembly/Disassembly area are gated through the Decoder/Mux's 800 and, after inversion by NOT's 808 become the addressing signals I/O 08 – 15. These signals are applied to the CD memory in FIG. 6 to address one address in each of the four CD tables.

The particular CD table which is selected is determined by Byte 2, bits 06 and 07, of the control word in the Main Memory 110. In FIG. 8, Byte 2, bits 06 and 07 are applied to the CO and DO inputs of Mux 812. The signal on lead 702 is at the low level as previously explained, so these inputs are directed to the C and D outputs of Mux 812. The C and D outputs of Mux 812 are decoded by OR's 814 and 820 and AND's 816–819 to energize one input lead of one of the four AND's 822. The signal on lead 710 is at a high level at this time so one of the AND's 822 produces an output signal that is applied over the bus 824 to select one of the tables in the CD Memory 600.

The combination of a CD Table Select signal on bus 824 and the address on bus 842 is sufficient to read out a selected address from a selected table in the CD Memory. The memory puts out a five bit word that passes through OR gates 616 to become the signals CC00 through CC04. As explained subsequently, these signals are applied to the gating circuits of FIG. 9–11 to control certain functions. In addition, the four low order output bits of the selected CD Memory word are applied through four NOT's 618 to address one of 16 12-bit words in each of the four tables in the CI Memory 602.

The particular table which is selected is determined by bits 06 and 07 of Byte 3 in the main control word. In FIG. 8, bits 06 and 07 of Byte 3 are applied to the A0 and B0 inputs of Mux 812. Since the signal on lead 702 is at the low level, the Byte 3, bit 06 and 07 signals are passed through Mux 812 to become the signals SELECT 0 and SELECT 1. In FIG. 7, the signals SELECT 0 and SELECT 1 are applied to the addressing inputs of Decoder 744. Since the signal Write 50 is at a high level, AND 730 produces a low level output signal that is inverted by NOT 734 to apply a high level signal to the Y inputs of Decoder 744. Therefore, regardless of the combination of signals applied to the addressing inputs of the Decoder, all of the Y outputs remain at a high level and block AND gates 750 to prevent a WRITE ENABLE of the CI tables. On the other hand, the X input of the Decoder is tied to a high level voltage so that, depending on the combination of the signals SEL 0 and SEL 1, one of four leads in bus 746 will have a low level signal produced thereon. This signal is applied to the CI Memory over the bus 746 and selects which table in the CI Memory will have a word read out in response to the addressing signals from the CD Memory.

The addressing of the CD and CI tables in connection with an output port is essentially the same as for and input port with the following exceptions. For an output port, Byte 1, bit 02 will be at a high level. In FIG. 704, the signal Byte 1 02 enables one input of AND-OR Inverter 704. All inputs to OR 700 are at a high level and the resulting low level out put signal is inverted by NOT 762 to condition the second input of AND-OR Inverter 704. A low level output signal is produced on lead 708 and is applied as the AO addressing input of the Decoder/MUX's 800. The low level output of OR 700 is applied over lead 702 to the A1 addressing input of Decoder/MUX's 800 and the combination of signals on leads 702 and 708 select the AO and BO inputs of the Decoder/MUX's as the outputs thereof. As shown in FIG. 8, bits 00–07 of the Storage area 410 of the Main Memory are applied to the A0 and B0 inputs of Decoder/MUX's 800. The outputs of Decoder/MUX's 800 are applied as addressing inputs to the CD Memory in the same manner as for an input operation as described above. CD table selection and CI table addressing and selection is accomplished in the same manner as for an input operation.

Since output characters in the Storage area 410 do not have the parity bit annexed thereto, but input characters in the Assembly/Disassembly area 210–310 do, it is seen that an output character and an input character having the same significance will address different locations in the CD tables when the parity bit is a one.

CLEARING THE CD TABLES

The CD Tables may be cleared as a group during one major cycle by the Timing and Scan Control circuits 120. The circuits generate the high level signal IC while the scanning counter sequentially steps through all addresses. In FIG. 7, the signal IC block AND-OR Inverter 704 and causes OR 700 to produce a high level output so that the signals on leads 702 and 798 are both high. In FIG. 8, these signals select the A3 and B3 inputs of D/MUX's 800 which have the timing signals A, B, C, D, EE, FF, GG and Control Configuration 00 applied thereto by the Timing and Scan Control circuits. Thus, the signals I/O 08 – I/O 15 sequentially address the locations in the CD tables. In FIG. 8, the high level signal IC disables MUX 812 so that all of its outputs remain at the low level. These outputs, in combination with the signal IC applied to OR's 814 and 820 enable the four AND's 822 to select all four CD tables. The signal (50·L15) is high at this time to enable all AND's 822. In FIG. 7, the signal IC passes through NOT 706 and OR 722 to enable AND 724. At time TP 13–14 of each minor cycle the AND produces the signal WRITE ENABLE CD Table. Since there will be no data on bus 158, the signals I/O OO–I/O 04 (FIG. 8) will be at a high level to write zeros into each CD table word as it is addressed.

CI and CD TABLE INTERPRETATION

Figure 11:
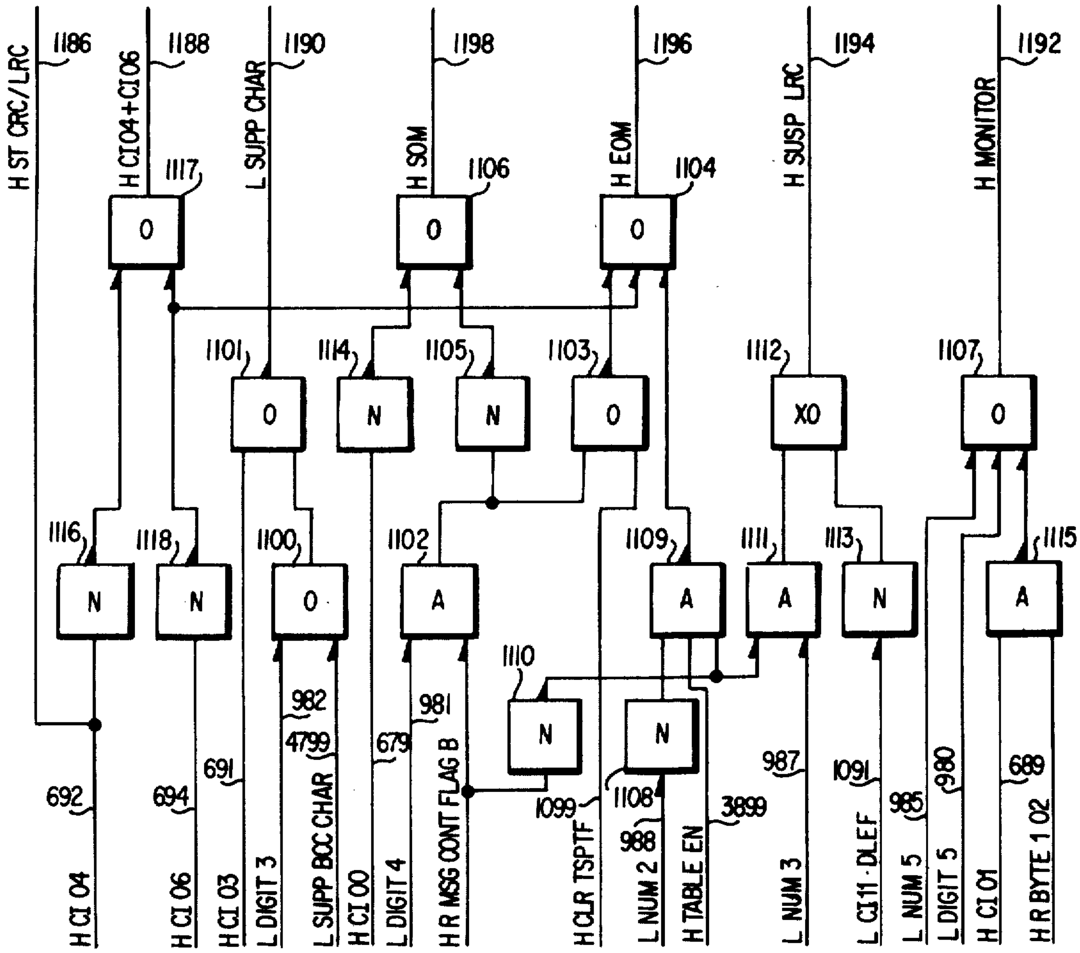
FIGS. 9–11 show the primary gating circuits for decoding the outputs of the CI and CD memories.
Figure 12:
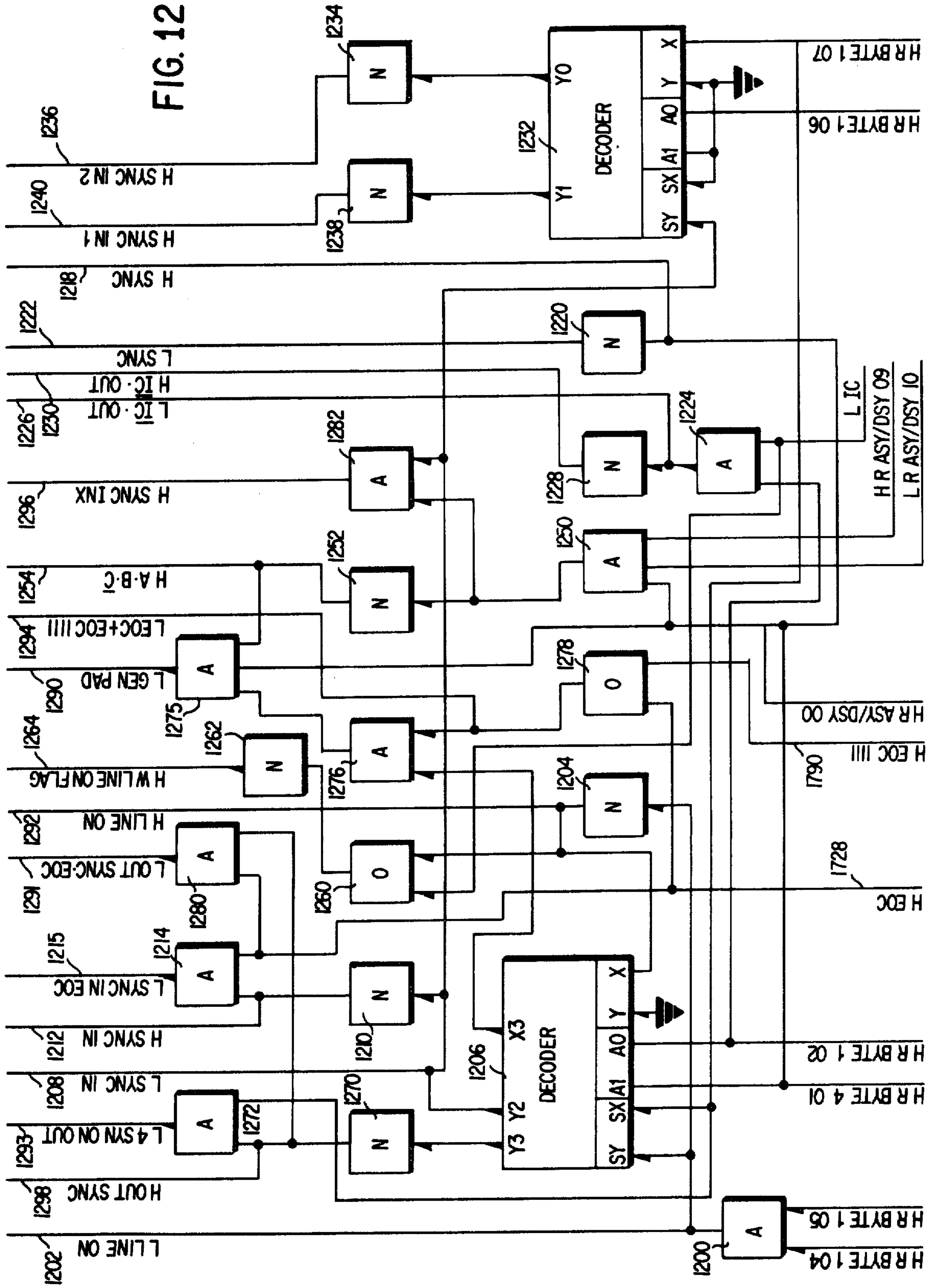
FIG. 12 shows the primary controls for determining whether a port is to operate in the input or output mode, the synchronous or asynchronous mode, or with a specific start of message character or any non-SYN start character.
Figure 22:
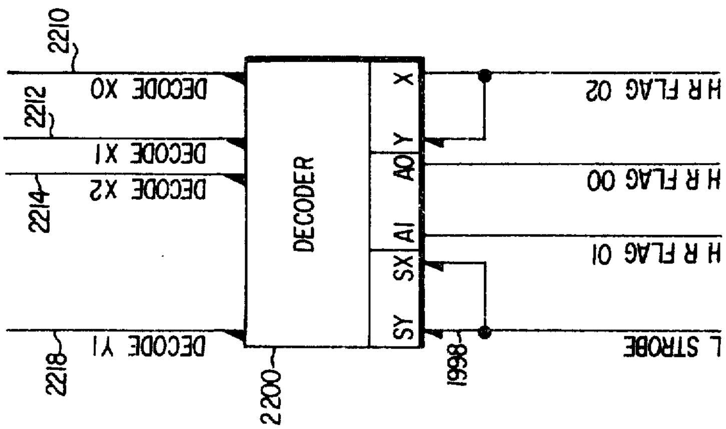
FIG. 22 illustrates the decoding of certain bits of a control word.

FIGS. 9–11 show the gating circuits which decode the output bits CC00–CC04 from the CD Memory and the output bits CI00 – CI11 from the CI Memory to produce the signals for controlling certain gating functions. However, before describing the gating circuits in detail, the following generalizations should be noted.

Bits 00–03 of each word read out of the CD tables control certain hard wired functions if bit 4 of the word is binary zero. The different codes and the functions they control are as follows.

| Bits 3 2 1 0 | FUNCTION | |
|---|---|---|
| 0 0 1 1 | Suppress Input Character | |
| 0 1 0 0 | Start-End | |
| 0 1 0 1 | Monitor | |
| 1 0 1 0 | End | If preceded by a DLE |
| 1 0 1 1 | Suspend LRC | If preceded by a DLE |
| 1 1 0 0 | Resume LRC | If preceded by a DLE |
| 1 1 0 1 | Monitor | If preceded by a DLE |
| OTHER | No Operation | |

If bit 04 of a word read out of the CD Table is a binary one, bits 00–03 cause the following hard wired functions.

| BITS 3 2 1 0 | FUNCTION |
|---|---|
| 0 0 0 0 | SYN |
| 0 0 0 1 | DLE |
| 0 1 1 1 | EOT |

In addition, if bit 4 is a binary one, bits 00–03 address one of sixteen addresses in the CI table designated by bits 06 and 07 of Byte 3 in the main control word.

Each bit of the word read out of the CI tables controls a separate function or operation to be performed. These functions are discussed below. If a given bit in the CI word is a binary one, it causes a corresponding operation. Different combinations of bits may be ones to cause several functions to be performed each time the word is read from the CI table.

Referring now to FIGS. 9–11, the outputs of the CD and CI tables are effectively blocked except at EOC time. It is only at EOC time that the signals EDC and VALID DATA RECEIVED enable AND 900 in FIG. 9. At all other times, the output of AND 906 is at a high level and blocks AND 901. The low level output of AND 901 blocks AND's 902 and 903. The output of AND 903 is the signal DLEF·R Flag 02, and this signal is applied to FIG. 10 where it blocks AND 1000. The low level output of AND 1000 blocks AND's 1001 and 1002. The output of AND 1001 then blocks one input of AND 1003.

The outut of AND 901 is the signal DLEF. When AND 901 is blocked, this signal is applied to FIG. 10 to block AND's 1004, 1005 and 1006. In addition, the signal DLEF blocks one AND of an AND-OR Inverter 1007. In FIG. 9, the high level signal EOC ON passes through an OR 908 and blocks AND 909, so that the signal CC$\overline{03}$·04 is at a high level. This latter signal is applied to FIG. 10, where it blocks AND's 1008 and 1009.

The signal EOC ON is also applied to FIG. 10 and when it is at a level it blocks AND 1000 and passes over a lead 1010 and through an OR 1012 to generate the low level signal FUNCTION DISABLE. The FUNCTION DISABLE signal is applied to FIG. 9 where it passes through a NOT 904 to disable AND 905. The resulting output of AND 905 disables AND's 902 and 906. The FUNCTION DISABLE signal is also applied to AND 907 to block this gate. AND 907 thus produces the high level signal CI ENABLE. This signal is applied to an OR 736, and since the second input of this OR is also at a high level, OR 736 produces a low level output to block AND 738. The output of AND 738 is inverted by NOT 740, thus driving the signal CI TABLE ENABLE to the high level. As previously explained, this signal is applied to output gates of the CI memory, and when it is at a high level it effectively blocks any output from the CI Memory.

Although the gating circuits of FIG. 9–11 are all effectively blocked as just described, there is one exception. When an input operation begins it is necessary to establish synchronization. As the bits of the incoming data are assembled in the Assembly/DIsassembly area 210–310 of the Main memory, this area is checked after each bit is inserted to see if it contains a combination of bits which may represent a SYN character. Bits 01–08 of the Assembly/Disassembly area are applied to the Decoder/MUX's 800 and address the CD tables in the manner described above. If the combination of bits in the Assembly/Disassembly area addresses a CD table word storing a Syn character, it is assumed that a Syn character has been received in the Assembly/Disassembly area. Internally of the CMM, the Syn character is represented by the combination of bits 10000. When this code is read out of the CD Memory it is applied to FIG. 9 as the signals CC04–CC00. The three low order bits CC02–CC00 are applied to the A2, A1 and A0 inputs of Decoder 910. These signals are all at the low level. However, since AND 902 is blocked, it applies a high level signal to the A3 input of Decoder 910, so that the Decoder produces the signal NUM 8. This signal is applied to FIG. 10 where it enables one input of AND 1013. In FIG. 9, the signal CC04 is at a high level and conditions one input of AND 911. The signal CC03 is at a low level and after inversion by NOT 912 conditions a second input of AND 911. AND 911 produces the low level signal CC04·$\overline{03}$ and this signal is applied to FIG. 10 where it conditions the second input of AND 1013. The AND produces the high level output signal SYN CHARACTER BIT BY BIT and this signal is applied to the character framing and sync circuits to inidcate that a Syn character appears to have been found. The manner in which the signal is utilized, and the manner in which synchronization is established, have been described previously. Once synchronization is established, the End of Character counter counts each data clock and enables gate 900 after each character is assembled so that the CD and CI memories may be enabled. On an output operation, synchronization does not need to be established and the gate 900 is enabled on the minor cycle occuring one major cycle after one in which a character is loaded into the Storage area of Main Memory 110.

If the most significant bit of the word read out of the addressed CD table is equal to 1, then the four lower order bits are used as an address of a word in the CI tables. In addition, the following three hard wired functions are initiated. These are the only position dependent entries in the CI tables.

1000 (SYN)

If CC04 is a 1, and CC03–CC00 are all zeroes, word zero of the selected CI table is addressed. In addition, the signal SYN is generated as follows. In FIG. 9, CC04 is at a high level and blocks AND 905, thereby blocking AND's 906 and 902. AND 902 applies a high level signal to the A3 input of Decoder 910. The CC00 through CC02 are all at the low level and these signals are applied to the A2, a1 and A0 inputs of Decoder 910. Decoder 910 produces the low level signal NUM 8 that is applied to FIG. 10 where it enables one input of AND 1009. In FIG. 9, the high level signal CC04 enables one input of AND 909. The low level signal CC03 is inverted by NOT 912 and enables a second input of AND 909. The signal EOC ON from AND 900 is inverted at OR 908 to enable AND 909, so that it produces the low level output signal CC$\overline{03}$·04. This latter signal is applied to FIG. 10 where it enables the second input of AND 1009. AND 1009 then produces the high level signal SYN CHARACTER. The output of AND 1009 is passed through a NOT 1014 to become the low level signal SYN CHARACTER.

10001 (DLE)

When the word read out of the CD Memory has this value, it addresses word one in the selected CI table and in addition, generates the signal DLE CHARACTER. The DLE (data link escape) signal is generated as follows.

In FIG. 9, the signals CC02 and CC01 are both at the low level and are applied to the A2 and A1 inputs of Decoder 910. The high level signal CC00 is applied to the A0 input of Decoder 910. The signal CC04 is at a high level and blocks AND 905 and this in turn blocks AND 902 so that a high level signal is applied to the A3 input of Decoder 910. The Decoder produces the signal NUM 9. The signal NUM 9 is applied to FIG. 10 where it enables one input of AND 1008. In FIG. 9, the high level CC04 enables one input of AND 909. The low level signal CC03 is inverted by NOT 912 and enables a second input of AND 909. The signal EOC ON from AND 900 is inverted at OR 908 and further enables AND 908 to thereby generate the low level signal CC$\overline{03}$·04. This signal is applied to FIG. 10 where it enables the second input of AND 1008 to produce the high level signal DLE CHARACTER.

10111 (EOT).

If the addressed word in the CI tables contans this code, it addresses word 7 of the CI table and, in addition generates the signal DISCONNECT FROM LINE. In FIG. 9, CC04, CC02, CC01 and CC00 are all at a high level and condition four inputs of AND 920. The low level signal CC03 is inverted by NOT 912 and conditions a fifth input of AND 920. The signal R BYTE 1 02 on lead 922 is at a high level if an input operation is being performed so AND 920 produces a low level output signal that passes through OR 924 to become the command DISCONNECT FROM LINE. This command is also generated any time the high level signal IC is applied to OR 926.

A SYN, DLE or EOT code output from the CD tables enables the output gating of the CI tables as follows. In FIG. 9, CC04 is at a high level and conditions one input of AND 907. The signals FUNCTION DISABLE and TABLE ENABLE are both at a high level and condition the other inputs of AND 907. AND 907 produces the low level signal CI ENABLE which is applied to FIG. 7 where it passes through OR 736 to enable AND 738. A timing pulse enables the second input of AND 730 during the interval TP10–14 and the low level output from AND 738 is inverted by NOT 740 to become the signal CI TABLE ENABLE. This signal is applied to FIG. 6 where it enables the output gates internal to the CI Memory 602.

The output of AND 907 is also passed through an OR 928 to become the command CONTROL CHARACTER. This command is applied to FIG. 36 where it controls the parity checking of the control character. Since the signal TABLE ENABLE is at a low level and blocks AND 907 until after the first valid character is found during the character framing and sync operation, the command SYN CHARACTER obtained from NOT 1014 is also applied to OR 928 so that the command CONTROL CHARACTER is applied to the parity checking circuits to control the checking of the parity of the first framed (i.e. second received) SYN character.

The command CONTROL CHARACTER is also applied to FIG. 10 where it enables one input of AND 1020. The output of AND 1020 is the signal CONTROL CHARACTER REQUEST. This signal is loaded into the I/O request area of the Main Memory, and is subsequently utilized to cause the character which addressed the CD tables to be transferred to a unique location in the SPM, by means of an externally specified address. Normally, all characters addressing the CD table, which in turn cause the addressing of the CI table, cause the generation of the signal CONTROL CHARACTER REQUEST. However, if the character is a SYN, DLE, or EOT character, then the signal CONTROL CHARACTER REQUEST is not generated. The output of NOT 1014 blocks AND 1020 when a SYN character addresses the CD tables. If the detected character is a DLE, then the high level output of AND 1008 is inverted by NOT 1022 to block AND 1020. If bit 2 of the addressed word in CI table is set, this indicates that the control character should be transferred to the SPM by means of a normal input data request. The signal CI02 is inverted by NOT 1024 and blocks AND 1020 in this situation.

If the high order bit (CC04) of the word read out of the CD table is a zero, then the following combinations of bits initiate certain hardwired functions as follows.

0011 (Suppress Character).

This code indicates that the received character should not be transferred to the host computer and therefore it is not passed to the SPM from the Main Memory 110. On output operations, this code causes no action. The command SUPPRESS CHARACTER is generated as follows. In FIG. 9, the signal CC04 is at a low level and conditions one input of AND 905. The other input of AND 905 is conditioned because the signal FUNCTION DISABLE is at a high level. The output of AND 905 conditions one input of AND 906. The signal CC03 is at the low level so that the output of NOT 912 enables a second input of AND 906. The signal R DLE Flag is at a low level so that the output of NOT 903 conditions a third input of AND 906. Finally, the signal TABLE ENABLE is at a high level and further conditions AND 906 so that it produces a low level output signal to the A3 input of Decoder 932. The high level signals CC00 and CC01 are applied to the A2 and A1 inputs of Decoder 932, while the low level signals CC02 is applied to the A2 input of the Decoder. The Decoder therefore produces the output signal DIGIT 3. In FIG. 11, this signal passes through OR 1100 and OR 1101 to become the command SUPPRESS CHARACTER. This compound is applied to FIG. 23 where it blocks the gating circuits controlling the transfer of assembled input characters from the Assembly/Disassembly area to the Storage area of the Main Memory 110. Therefore, as the character is read out of the Assembly/Disassembly area of the memory it is lost.

0100 (Start-End).

This code is used to identify characters that may be received or sent as single character transmissions (such as ACK or NAK) so that the appropriate status can be reported to the host computer. This function is not initiated if the character occurs between designated start of message and the end of message characters. The command START-END is generated as follows. In FIG. 9, all inputs to AND 906 are conditioned in the same manner as for the SUPPRESS CHARACTER code. AND 906 applies a low level output to the A3 input of Decoder 932. The signals CC00 and CC01 are both zero and apply low level signals to the A0 and A1 inputs of Decoder 932, while CC03 applies a high level signal to the input A2. Decoder 932 produces the low level signal DIGIT 4 and this signal is applied to FIG. 11, where it conditions one input of AND 1102. The signal MESSAGE CONTROL FLAG B is at a high level to block AND 1102 during the interval between a designated start of message character and end of message character. Otherwise, it will be at a low level, so that when the signal DIGIT 4 occurs, AND 1102 produces a high level output signal. The output of AND 1102 passes through OR's 1103 and 1104 to become the command END OF MESSAGE. The output of AND 1102 also passes through NOT 1105 and OR 1106 to become the command START OF MESSAGE.

0101 (Monitor).

This code identifies a character which, when sent or received, will cause status to be presented. In the case of a received character, the character will be stored before status is reported. For an output character, the status will be stored before the character is sent. The MONITOR command is generated as follows. In FIG. 9, the low level output from AND 906 in combination with the low level signal CC01 and the high level signals CC00 and CC02 cause Decoder 932 to produce the signal DIGIT 5. In FIG. 11, the signal DIGIT 5 passes through OR 1107 to become the command MONITOR.

10101 (End Character)

This code indentifies a character which, when sent or received immediately following a DLE, indicates an ending two character sequence such as, for example, DLEO or DLE1. The function is not initiated if the sequence occurs between designated start of message and end of message characters. The END CHARACTER command is generated as follows. In FIG. 9, the signal R DLE FLAG will be at a high level if the preceding character was a DLE. Therefore, the output of NOT 930 conditions one input of AND 901. AND 901 is further conditioned by the signal EOC ON and produces a high level output signal to enable AND 902. The signal CC03 is at a high level and conditions a second input of AND 902. The signal FUNCTION DISABLE is at a high level, so that the output of NOT 904 conditions AND 905 which is further conditioned by the low level signal CC04. The output of AND 905 conditions the third input of AND 902, so that a low level signal is applied to the A3 input of Decoder 910. CC00 and CC02 apply low level input signals to the A0 and A2 inputs of Decoder 910, while the signal CC01 applies a high level signal to the A1 input. Decoder 910 produces the signal NUM 2 which is applied to FIG. 11 where it passes through NOT 1108 to condition one input of AND 1109. The signal TABLE ENABLE is also high at this time and conditions a second input of AND 1109. If the end character does not occur between start of message and end of message characters, then the SIGNAL MESSAGE CONTROL FLAG B is at high level and after inversion by NOT 1110, conditions the third input of AND 1109. The output of AND 1109 passes through OR 1104 to become the command END OF MESSAGE.

1011 (Suspend LRC).

This character, when immediately preceded by a DLE, causes suspension of the LRC checking or generation until the RESUME LRC sequence is detected. The command SUSPEND LRC is generated as follows. In FIG. 9, AND 902 is enabled in the same manner as for the END CHARACTER code and thus applies a low level signal to the A3 input of Decoder 910. The low level signal CC02 and the high level signals CC00 and CC01 are applied to the A2, A1 and A0 inputs of the Decoder. Decoder 910 produces the low level output signal NUM 3 which is applied to FIG. 11, where it conditions one input of AND 1111. If MESSAGE CONTROL FLAG B is set, the output of NOT 1110 conditions the second input of AND 1111, and it produces a high level output signal to Exclusive OR 1112. If the signal CI 11. DLEF is at a high level, NOT 1113 applies a low level signal to the second input of Exclusive OR 112. Therefore, when AND 1111 produces a high level output signal Exclusive OR 1112 produces the high level command SUSPEND LRC.

1100 (Resume LRC).

This code, when immediately preceded by a DLE character, causes resumption of LRC checking or generation. The command RESUME LRC is generated as follows.

In FIG. 9, AND 902 is enabled in the same manner as for SUSPEND LRC and END CHARACTER and thus applies a low level signal to the A3 input of Decoder 910. The signals CC00 and CC01 applied to the A0 and A1 inputs of the Decoder, are both at a low level, while the signal CC02 applied to the A2 input of the Decoder is at a high level. The Decoder therefore produces the low level command RESUME LRC.

1101 (Monitor).

This code, when immediately preceded by DLE, functions identically to the 0101 code described above. This MONITOR command is generated as follows.

In FIG. 9, AND 902 is enabled as described above for the END CHARACTER code and applies a low level signal to the A3 input of Decoder 910. The A0 and A2 input receive the high level signals CC00 and CC02 while the A1 input receives the low level signal CC01. Decoder 910 produces the low level signal NUM 5 and this signal is applied to FIG. 11 where it passes through OR 1107 to become the command MONITOR.

As previous explained, each of the bits in a CI table word operates autonomously to initiate a CMM logic function, rather than being considered collectively as code words, as is the case with the CD table outputs. The CMM logic functions controlled by the bits in the CI table word are as follows.

Bit Zero (Start of Message — SOM).

This bit enables the received character to perform the Start of Header (SOH) or Start of Text (STX) functions. This condition is ignored if an SOM has already been detected for the message being received. The bit has meaning when used with synchronous systems and a start character is specified by Byte 1. The command SOM is generated by applying bit CI 00 to FIG. 11 where it passes through NOT 1114 and OR 1106 to become the command SOM.

Bit One (Monitor).

This bit indicates that a specific character is being sent in an output message. The monitor logic is activated only between SOM and message end. In FIG. 11, CI 01 is applied to one input of AND 1115. The second input of AND 1115 is conditioned by the signal R Byte 1 02, which is at a high level during an output operation. The output of AND 1115 passes through OR 1107 to become the command MONITOR.

Bit Two (Suppress Control Character).

This bit is utilized in the receive mode only, and suppresses the control character command so that the character is transferred using a normal input data request, rather than a control character request. In FIG. 10, bit CI 02 passes through NOT 1024 to block AND 1020 prevent the generation of the command CONTROL CHARACTER REQUEST.

Bit Three (Suppress).

This bit prevents the received character from being stored. The suppressed character is included in the Block Character Check (either LRC or CRC) unless bit 8 also equals 1. In FIG. 11, the signal CI 03 passes through OR 1101 to become the command SUPPRESS CHARACTER.

Bit Four (Start LRC/CRC Accumulation.

This bit is ignored if the accumulation has already been started. The start character may or may not be included in the accumulation as determined by control parameters in the line control word. The command is used for either the input or output mode if byte 3, bits 00–03 are set for a code that uses a BCC. As seen in FIG. 11, bit CI 04 becomes the signal START CRC/LRC without passing through any gating. In addition, bit CI 04 is inverted at NOT 1116 and passes through OR 1117 to become the signal CI 04 + CI 06.

Bit Five (Abort).

If this character is preceded by an SOM character, abort status will be set when the character is received. The input operation is also terminated. The ABORT command is generated in FIG. 10 by AND 1022. Bit CI 05 conditions one input of AND 1022. The signal TABLE ENABLE is at a high level and conditions a second input of AND 1022. During an input operation, the signal R Byte 1 02 is at a low level and after being inverted by NOT 1023 conditions a third input of AND 1022. The fourth input of AND 1022 is connected to the output of OR 1024. OR 1024 produces a high level ouput to enable AND 1022 under either of two conditions. First, if not operating in the transparent mode the signal R Flag 02 is set at a low level, thus driving the output of OR 1024 to the high level. Secondly, if the character immediately preceding the present character was a DLE, AND 901 produces the high level signal DLEF to enable one input of the AND 1006. The second input of AND 1006 is enabled by the output of NOT 1023 so that AND 1006 produces a low level output signal that passes through OR 1024 to enable AND 1022 on an input operation where the preceding character was a DLE.

Bit Six (End Character).

When this character is sent or received, end status is presented. In addition, on input operations, a new SYNC search is initiated. In FIG. 11, bit CI 06 passes through a NOT 1118 and OR 1104 to become the command EOM. In addition, the output of NOT 1118 passes through OR 1117 to become the signal CI 04 + CI 06.

Bit Seven (Intermediate End Character).

When this character is sent or received, ITB status is present. On input, no SYNC search is initiated. On output, a character request is made after ITB status is presented. A new BCC accumulation is started that includes the next non-Syn character seen. On output, the detection of the ITB character causes transmission of the BCC and a new BCc accumulation is started on the next character received from the host computer. In FIG. 10, CI 07 enables one input of AND 1030. The second input of AND 1030 is enabled by the output of OR 1024 under the conditions described above for Bit Six. AND 1030 produces a low level output signal that passes through OR 1032 to become the command CLEAR TRANSPARENT FLAG (TSPTF). This command is applied to FIG. 11, where it passes through OR 1103 and OR 1104 to become the command EOM.

Bit Eight (Suppress BCC).

This bit causes the character being sent or received to be excluded from the BCC accumulation. This function cannot be activated in the transparent mode. The character is transferred to the host computer, unless Bit Three also equals one. This bit must be set for SYN characters to exclude them from the BCC. Bit CI 08 is applied to FIG. 10, where it enables one input of AND 1034. The second input of AND 1034 is enabled by the output of OR 1024 if the transparent mode flag is not set, or if the port is operating in the input mode and the preceding character was a DLE. The output of AND 1034 passes through OR 1036 to become the command EXCLUDE FROM BCC.

Bit Nine (Set Transparent Mode).

The character accessing the CI table to obtain this bit must be preceded by a DLE. The bit sets the transparent mode flag if the character is received or sent immediately after a DLE. Bit CI 09 is applied directly to FIG. 18 where it passes through gating to set Flag 02 of the control word. In addition, bit CI 09 is applied to FIG. 10 where it passes through NOT 1036 to enable one input of AND 1038. The second input of AND 1038 is the signal R DLE FLAG which will be at a low level if the preceding character was a DLE. AND 1038 produces an output to enable one input of AND-OR Inverter 1007. AND-OR Inverter 1007 is further enabled by the output of OR 1040, if the ITB Flag or the Transparent mode Flag is set. AND-OR Inverter 1007 produces a low level output signal that passes through OR 1036 to become the signal EXCLUDE FROM BCC.

Bit Ten (Clear Transparent Mode).

When this bit of a CI word is set and the character reading out the word is received immediately after a DLE, the transparent mode flag is cleared. In FIG. 10, bit CI 10 is applied to one input of AND 1004. The second input of AND 1004 is enabled by the signal DLEF derived from AND 901, if the preceding character was a DLE. On an input operation, the output of NOT 1023 will be at a high level, so that AND 1004 produces a low level output signal that passes through to OR 1032 to become the command CLEAR TRANSPARENT FLAG. In FIG. 18, this command blocks AND 1832 and prevents the FLAG 02 bit from being restored in the control word.

Bit Eleven (Suspend LRC).

If the character initiating this function is immediately preceded by a DLE, both are excluded from LRC accumulation. This bit can be active only after detection of an SOM character and before detection of EOM. In FIG. 10, bit CI 11 is applied to one input of AND 1005. The second input of AND 1005 is enabled by the signal DLEF if the preceding character was a DLE. AND 1005 produces the signal CI 11·DLEF that is applied to FIG. 11 where it passes through NOT 1113 and Exclusive OR 1112 to become the command SUSPEND LRC.

PROCEDURE/UTILITY TIMER

As shown in FIG. 1*b*, each control word in the Main Memory 110 has an area reserved for use as a procedure or utility timer. This area includes four bits designated Timer 00–03. The timer area of each control word merely acts as a storage area. Each time a port is addressed the value in the timer area is read out, at TPO. It may or may not be incremented and restored in the Main Memory at time TP-13–14 when the rest of the control word is returned to the memory. The timer may act as a Gross Timer, a Response Timer, a Receive Timer or a Utility Timer.

The timer is controlled by Byte 4 of the control word and reference is made to the format for Byte 4 given above. Bits 07–04 of Byte 4 are loaded with a binary indication representing a time value. Bit 0 of Byte 4 determines the range of time values which may be represented by bits 07–04. Bit 02 is a 0 for the timer functions considered herein. In addition, OUT CONTROL FLAG bit 09 determines whether the timer is to act as a line procedure timer (i.e., Gross, Receiver, or Response) or a utility timer.

Figure 29:
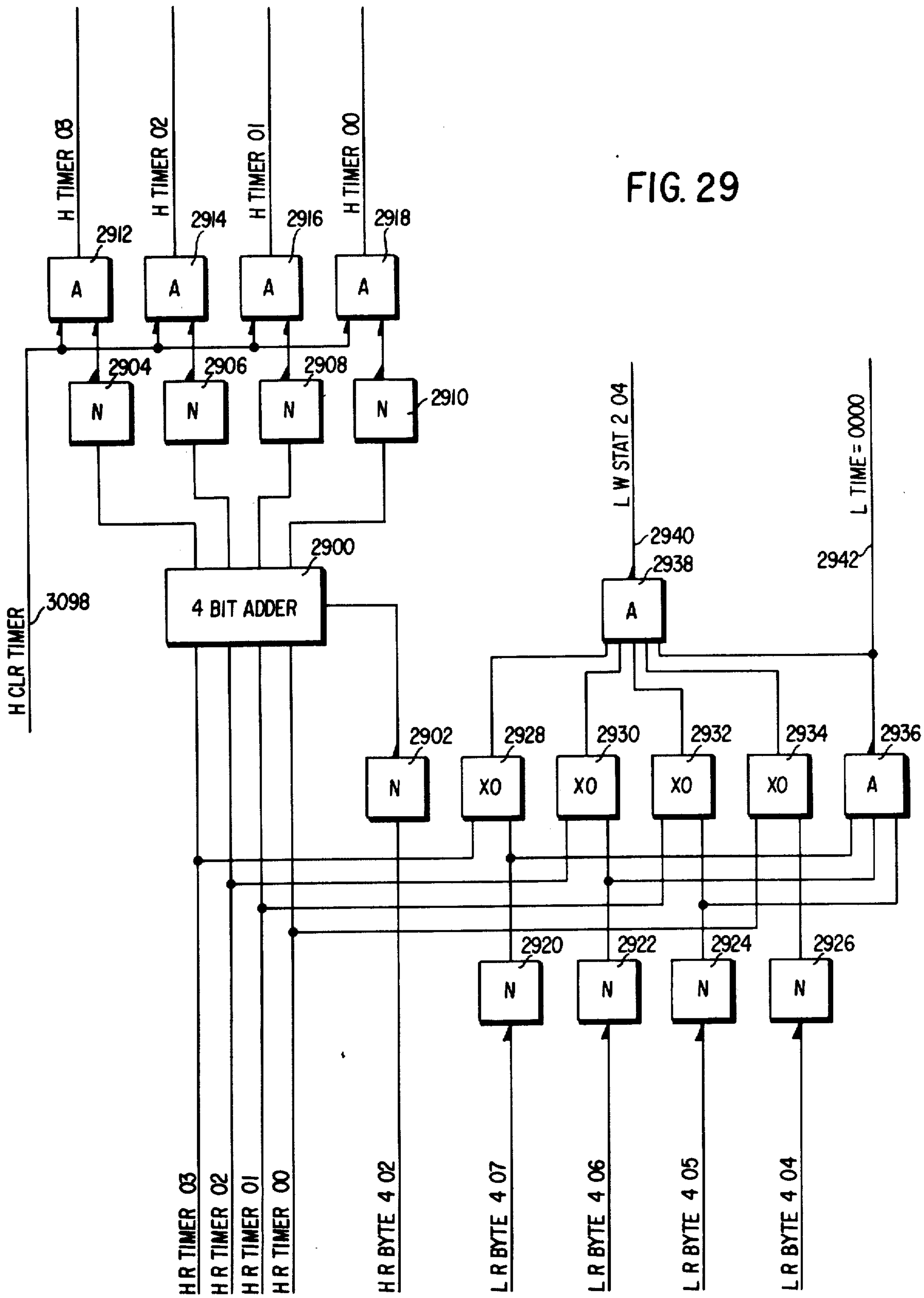
FIGS. 29 and 30 show a programmable multipurpose timer and the control logic therefor.

Referring now to FIG. 29, the timer value which has been program loaded into Byte 4 bits 07–04 of the control word is read out to an Adder 2900 each time the control word is addressed. The signals R TIMER 00 through R Timer 03 are read out from the HOLDING REGISTER 112 beginning at TP 0 of the minor cycle and these signals are available at the input of Adder 2900 until TP 0 of the next minor cycle. Assuming the value read out of the register 112 has not reached the limiting value set by Byte 4 bits 07–04, it may, under conditions subsequently described, be incremented by one in the adder 2900 and restored in the memory at time TP 13–14. The output of the adder passes through for NOT's 2904, 2906, 2908 and 2910 and for AND's 2912, 2914, 2916 and 2918 to the Main Memory 110. The signal CLEAR TIMER on lead 3098 will be at a low level to enable the AND's 2912, 2914, 2916, and 2918 unless the value read out of the memory through the register 112 has reached the limiting value as represented by Byte 4 bits 07–04, or unless the condition being timed has terminated by sensing the required control character.

The Adder 2900 is incremented by a high level output from NOT 2902 which will be present if Byte 4 bit 02 is at the low level.

Each time the timer area of Main Memory is read out the value, before being incremented, is compared with the value stored in Byte 4 bits 07–04. The signals R TIMER 00 through R TIMER 03 are applied to for Exclusive OR circuits 2928, 2930, 2932, and 2934. The signals BYTE 4 07 through BYTE 4 04 are passed through NOT's 2920, 2922, 2924 and 2926 to the second inputs of the Exclusive OR's. Therefore, if the value read out of the timer area of memory is equal to the value read out of Byte 4 bits 07–04, all of the Exclusive OR's 2928, 2930, 2932, and 2934 will apply a high level signal to AND 2938. AND 2938 also receives a high level signal from AND 2936 as long as the value in Byte 4 bits 07–04 is greater than 0001. Therefore, AND 2938 produces the low level signal WRITE STATUS 2 04 to indicate that the control character for terminating the timed interval did not occur within the time designated by Byte 4, bits 07–04.

Figure 30:
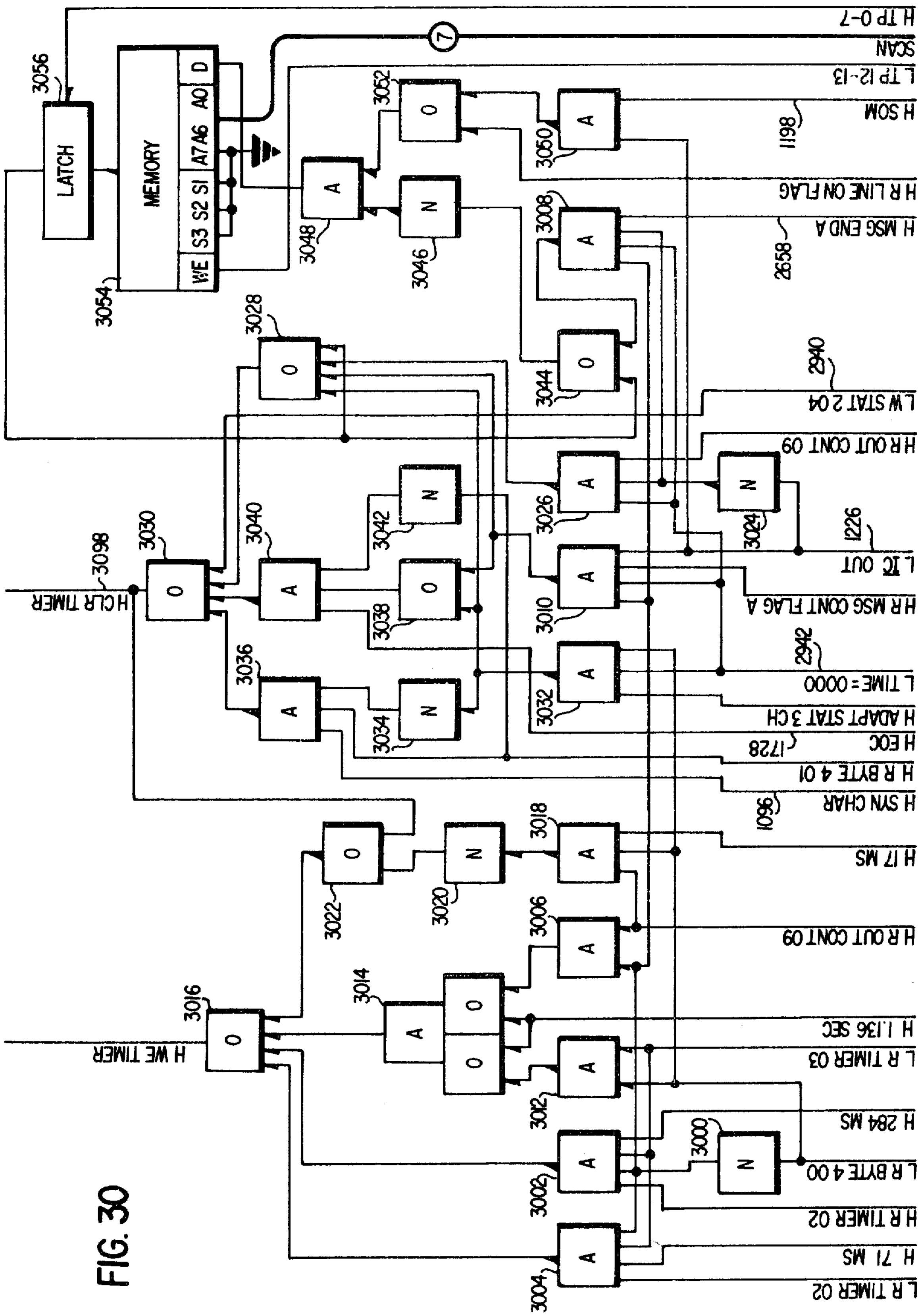

The signal WRITE STATUS 2 04 is applied to FIG. 30 where it passes through OR 3030 to become the signal CLEAR TIMER. It is this latter signal that is applied to the AND Gates 2912, 2914, 2916, and 2918 to block these gates and thereby prevent read out of the Adder 2900 to the timer area of the control word. Thus, at time TP 13–14 of the minor cycle, when the rest of the control word is written back into the main memory, the timer area is set to 0000 because the outputs of AND's 2912, 2914, 2916 and 2918 are all at the low level.

The signal WRITE STATUS 2 04 on lead 2940 is applied to FIG. 19 where it passes through OR 1958 to generate the signal WRITE ENABLE STATUS 2. This signal is applied to a multiplexer, like the Multiplexer 500, to generate an enabling signal which enables the writing into the STATUS 2 area of the control word. This permits the signal WRITE STATUS 2 04 to be written into the STATUS 2 area of the control word.

In FIG. 24, the signal WRITE ENABLE STATUS 2 passes through AND 2440 to become the signal WRITE STATUS 2 REQUEST on lead 2494, and is inverted by OR 2448 to become the signal WRITE STATUS 2 REQUEST on lead 2492. The signal on lead 2494 is applied to FIG. 23 where it passes through OR 2314 to generate the signal PERMIT PRIORITY REQUEST. This initiates a priority request as previously described. The signal on lead 2492 is applied to the I/O Request and Out Control area of the Main Memory where it is stored.

At the time OR 3030 produces the signal CLEAR TIMER, this signal is passed through OR 3022 and OR 3016 to become the signal WRITE ENABLE TIMER. This signal is applied to a multiplexer like MUX 500 to generate an enable signal for enabling the writing into the timer area. Since the signal CLEAR TIMER is blocking AND's 2912, 2914, 2916 and 2918, this causes the value 0000 to be written into the timer area.

As indicated above, the incremented timer value derived at the output of Adder 2900, may not be returned to the memory, but may be discarded and the old value in the memory retained therein. The signal WRITE ENABLE TIMER in FIG. 30 must be at the high level in order to enable the writing of an incremented value into the timer area of the memory.

Assume for the moment that the R Out Control bit 09 is a zero to select a line procedure timer function. Assume further that Byte 4, bit 02 is a zero and Byte 4 bit 00 is a 1. Under these conditions, the signal R BYTE 4 00 (FIG. 30) is at a low level and after inversion by NOT 3000 enables one input of AND's 3002 and 3004. AND 3004 is further enabled by the signal 71 MS which is generated by the timing circuits 120 once each 71 milliseconds. AND 3004 also receives the signal R TIMER 02 and R TIMER 03 which are at a low level when bits 02 and 03 of the timer area contain ones.

Assume that the timer contains the value 0000. Each time the port is scanned, this value is read out to the four bit Adder 2900 and incremented, but may not be written back into the memory unless OR 3016 produces the WRITE ENABLE signal. Thus, the value 0000 may remain in the timer area for several major cycles. After 71 milliseconds the signal 71 MS will be at a high level when the timer area is read out of memory so AND 3004 produces a low level output signal that passes through OR 3016 to enable the writing of the incremented value back into the timer area of the memory. The timer area now contains a count of 0001. This value may be read out to the Adder 2900 and incremented before the next signal 71 MS occurs. These incremented values are not written back into the memory because AND 3004 is blocked, so the value 0001 is retained in the memory timer area. 71 milliseconds after the first signal 71 MS, a second signal 71 MS occurs and when the timer area is read out of memory it is again incremented by Adder 2900 and the incremented value 0010 is stored in the memory area because AND 3004 produces an output signal that passes through OR 3016 to becomes the WRITE ENABLE TIMER signal.

Again, the value 0010 may be read out of the timer area several times and incremented but the incremented value not entered back into the timer area. After another lapse of 71 milliseconds, the signal 71 MS again enables AND 3004 and, through OR 3016, produces the WRITE ENABLE TIMER signal to thereby enable the incremented value to be written into the timer area. At this time, the timer area contains the value 0011.

After another 71 milliseconds, the signal 71 MS again enables AND 3004 and the output from the timer area is incremented by Adder 2900 to enter the value 0100 into the timer area.

The next time the signal 71 MS occurs, it will find the AND 3004 blocked, because the signal R TIMER 02 is at the low level. However, the signal 284 MS is generated by the same counter which generates the 71 MS signal, the signal 284 MS being produced at one fourth the frequency of the 71 MS signal. Therefore, at the same time the 71 MS signal is blocked at AND 3004, the first signal 284 MS is applied to AND 3002 which is enabled at this time by the high level signals R TIMER 02 and R TIMER 03. The output of AND 3002 passes through OR 3016 to generate the WRITE ENABLE TIMER command, thereby enabling the incremented output from adder 2900 to be entered into the timer area of memory. This places the value 0101 in the memory timer area.

284 milliseconds later, the signal 284 MS again passes through AND 3002 and enables the gating of the value 0110 into the timer area. After two more 284 millisecond intervals, the count in the timer area stands at 1000.

After the count in the timer area has reached the value 1000, no further 284 MS signals may be passed through AND 3002 because the signal R TIMER 03 applied to 3002 will be at a low level each time the timer area is read out. However, the signal 1.136 SEC is generated by the same counter that generates the 71 MS and 284 MS signals, the 1.136 SEC signal being generated at a frequency one fourth that of the 284 MS signal.

At the time the 284 MS signal is blocked by AND 3002, the signal 1.136 SEC passes through OR-AND Inverter 3014 and OR 3016 to become the signal WRITE ENABLE TIMER. This enables the incremented value 1001 from the output of Adder 2900 to be entered into the timer area of memory. Every 1.136 seconds thereafter, an output is produced from OR-AND Inverter 3014 through OR 3016 to enable the writing of an incremented value into the timer area. This can continue until a maximum value of 1111 is written into the timer area.

The immediately preceding paragraphs describe the timer incrementing operation up to a full count. However, if Byte 4 bits 07–04 contain a value less than 1111, the above described counting operation will be terminated and the status 2 04 bit will be set by the signal on lead 2490 as previously described. Also, the timer may be reset if the proper control character occurs in a message to signal that the interval being timed in terminated.

The timer may function as a GROSS TIMER if Byte 4 bits 02 and 00 are both zero, and control bit 9 is also a zero. In this case, all of the AND's 3002, 3004, 3006, 3012 and 2018 are blocked by the signal R BYTE 4 00 which is at the high level, or the signal R OUT CONTROL 09 which is at the low level. On some minor cycle, when the value is read out of the timer area to the Adder 2900, the signal 1.136 SEC passes through both sides of OR-AND Inverter 3014, causing it to produce a low level output signal which passes through OR 3016 to become the signal WRITE ENABLE TIMER. Therefore, every 1.136 seconds the counter in the timer area is incremented and returned to the timer area. This continues until the value in the timer area is equal to the value as set into Byte 4 bits 07–04.

In the output mode, the timer area may be utilized as a UTILITY TIMER by setting OUT CONTROL BIT 09 to 1. Byte 4 bit 02 is set at zero to increment the adder, and Byte 4 bit 00 is set to zero to select the timer range.

In FIG. 30, the high level signal R Byte 4 00 enables one input of AND 3018. The high level signal R OUT CONTROL 09 enables the second input of AND 3018. The AND receives at its third input the high level signal 17 MS. This signal is generated by the timing control circuits 120 and occurs once every 17 milliseconds. When the signal 17 MS occurs, AND 3018 produces a low level output signal that passes through NOT 3029, OR 3022, and OR 3016 to become the signal WRITE ENABLE TIMER. From the preceding explanation, it should be obvious that this enables the value read out of the timer area and incremented by the Adder 2900 to be entered back into the timer area once every 17 milliseconds. This continues until the count in the timer area equals the value set into Byte 4 bits 07–04, or until the condition occurs which clears the timer.

The UTILITY TIMER may also operate in an upper range by setting Byte 4 bit 00 to zero value. In this case, the counter counts exactly the same as when it is used as a line procedure timer.

As previously stated, when the count in the timer area equals the value set into Byte 4 bits 07–02, the signal WRITE STATUS 2 04 is generated in FIG. 29. This represents an undesirable condition, since it means that some situation which should have occurred did not occur within the time programmed into Byte 4 bits 07–04. Normally, a condition should occur before the timer "times out", this condition causing the circuits of FIG. 30 to produce the signal CLEAR TIMER thereby resetting the timer to the value 0000.

The circuits for starting the timer and clearing or resetting it are shown in the right portion of FIG. 30. It might be noted that normally all inputs to OR 3028 are at a high level and the low level output from the OR is passed through OR 3030 to generate the signal CLEAR TIMER. This holds the timer at the value 0000. The timer may operate as a GROSS TIMER, a RESPONSE TIMER, a RECEIVER TIMER, or a UTILITY TIMER, and each use involves a different set of conditions for starting the timer and clearing or resetting it. These conditions will now be discussed for each of the possible uses of the timer.

The timer may be used as a GROSS TIMER on either input or output and is useful in detecting long periods of inactivity on a communication channel. The GROSS TIMER is necessary for operation on switched networks. It facilitates disconnection in the event of a wrong number or other connection which does not result in a data transfer. It will also disconnect when data transmission stops because the sequence DLE EOT is not recognized, or because of a remote terminal or communication network problem. By virtue of its ability to restart on detection of synchronizing sequences, it is also useful in BSC to time the three second interval required for these sequences. The GROSS TIMER start conditions are as follows:

Control Byte 4, bits ≥ 0010.
Control Byte 4, bit 2 = 0.
Control Byte 4, bit 0 = 0.
Data Set Ready In FIG. 30, the signal R BYTE 4 00 is at a high level and conditions one input of AND 3032. If Byte 4 bits 07–04 contain a count greater than 0010 the signal TIME = 0000 is at a high level and enables a second input of AND 3032. If the data set is ready, the signal ADAPT STAT 3 CK is at a high level, so AND 3032 is enabled and it produces a low level output signal that passes through OR 3028 to OR 3030. The other inputs to OR 3030 are at a high level at this time, so OR 3030 terminates the high level signal CLEAR TIMER on lead 3098. This enables the timer to begin counting.

The timer is reset, that is cleared to zero and not stopped, upon detection of a SYN character when operating in the synchronous mode. The low level output of AND 3032 is inverted at NOT 3034 to enable one input of AND 3036. The AND is further enabled by the signal R BYTE 4 01 if the port is operating in the synchronous mode. Upon detection of a SYN character, the signal SYN CHARACTER on lead 1096 rises to the high level, thereby causing AND 3036 to produce a low level output signal which drives the output of OR 3030 to the high level, thus generating the signal CLEAR TIMER.

The timer is stopped and cleared to zero conditions if the data set ready signal drops to the low level, or the value in Byte 4 bits 08–04 are set to less than 0010. Either of these conditions blocks AND 3032, thus applying a high level output from the AND to OR 3028. If the GROSS TIMER should count up to the value set into Byte 4 bits 07–04, a status request is generated and Byte 2 bit 4 is set to 1, as previously explained. The timer is cleared by the signal WRITE STATUS 2 04 on lead 2940 which passes through OR 3030 to generate the signal CLEAR TIMER. The timer resumes the counting operation if the start conditions still prevail.

The timer may operate as a RESPONSE TIMER on input only, but is started when in the output mode. The RESPONSE TIMER is used when a reply is expected after a transmission. The timer will be started while in the output mode, at the time the output message end status is presented. This will occur after sending any character defined as an ending character, and the associated LRC or CRC, if it is used. Time out will occur if one of the specified set of input start characters is not found. The RESPONSE TIMER is used to protect against an invalid response or no response from a terminal. The RESPONSE TIMER start conditions are as follows:

Control Byte 4, bits 07–04 ≥ 0010.

Control Byte 4, bit 02 = 0.

Control Byte bit 0 = 1.

Output message end status set.

In FIG. 30, the signal $\overline{\text{IC}}$·OUT is at the low level and blocks AND 3050 so that a high level signal is applied to one input of OR 3052. The signal R LINE ON FLAG is at a high level at this time, so OR 3052 applied a low level input to AND 3048.

The low level signal $\overline{\text{IC}}$·OUT is inverted by NOT 3024 and conditions one input of AND 3008. The low level signal R BYTE 4 00 is inverted by NOT 3000 and conditions a second input of AND 3008. The value set into BYTE 4 bits 07–04 is greater than 0010, hence the signal TIME = 0000 is at a high level to further condition AND 3008. Finally, when the signal MESSAGE END A occurs, it passes through AND 3008, OR 3044, NOT 3046 and AND 3048 to write a single bit into one position of the 128 bit memory 3054. This memory is addressed by the scan addressing signals which address the main memory and select the input and output ports. The memory is enabled to write a bit therein at time TP 12–13 of a minor cycle. One major cycle later, at time TP 0–7, the bit read into the memory is stored in latch 3056 where it remains until the end of the minor cycle. The low level output from the latch passes through OR 3028 to apply a high level input to OR 3030. All other inputs of OR 3030 are at the high level at this time, hence the high level signal CLEAR TIMER is terminated and the REPSONSE TIMER begins the counting operation.

On each major cycle, the output of latch 3056 is fed back through OR 3044, NOT 3046, and AND 2048 to restore a bit in the memory 3054.

The RESPONSE TIMER is stopped when AND 3048 is blocked to prevent recirculation of the bit stored in memory 3054. This occurs upon detection of an input start character. The signal $\overline{\text{IC}}$·OUT rises to the high level when the output mode is ended. This signal enables one input of AND 3050. When the START OF MESSAGE character is received, AND 3050 produces a low level output signal which passes through OR 3050 to block AND 3048. This prevents the bit which has been recirculating from being entered back into the memory. Therefore, one major cycle later, when the memory is read out, the latch 3056 will produce a high level output signal to OR 3028. With all other inputs being at the high level, OR 3028 produces a low level output signal that passes through OR 3030 to become the command CLEAR TIMER. The timer may now be used as a RECEIVE TIMER as subsequently described.

The RESPONSE TIMER is also stopped and cleared to zero conditions if it should count up to the limiting value set in Byte 4 bits 07–04. In addition, when the counter reaches the limiting value, a status request is generated and Byte 2 bit 4 is set, all as previously described.

The timer operates as a RECEIVE TIMER in the input mode only. It is used when receiving to protect against non-recognition of an end character (e.g. ETB or ETX). The RECEIVE TIMER start conditions are as follows:

Control Byte 4, bits 07–04 ≥ 0010.

Control Byte 4, bit 02 = 0.

Control Byte 4, bit 00 = 1.

Detection of an input start character.

The receive timer is started as described above by the START OF MESSAGE signal which passes through AND 3050, OR 3052, and AND 3048 to store a low level signal in memory 3054. One major cycle later latch 3056 produces a high level output signal to block OR 3028 and the resulting low level output from this OR passes through OR 3030 to become the signal CLEAR TIMER. The next major cycle will find the signal R MESSAGE CONTROL FLAG A at a high level and, since all other inputs to AND 3010 will be at the high level, AND 3010 produces a low level output signal that passes through OR 3028 to apply a high level input to OR 3030. All other inputs to OR 3030 being at the high level, it drives the CLEAR TIMER signal on lead 3098 to the low level and the RECEIVE TIMER begins counting. At the end of a message, the signal R MESSAGE CONTROL FLAG A drops to the low level, and, with all inputs to OR 3028 blocked, it produces a low level output signal that passes through OR 3030 to become the signal CLEAR TIMER.

The RECEIVE TIMER is also stopped and cleared to the zero condition after a time out, that is, when it counts to a value equal to the value set into Byte 4 bits 07–04. When a time out occurs, a status request is generated with Byte 2 bit 4 being set to 1, as described above, and the timer is stopped and cleared to 0000.

It should be noted that the time value set in Byte 4, bits 07–04 may be changed at any time prior to time out detection. This permits changing from a response time period to a receive time period without interrupting the timer after a START OF MESSAGE has been received.

The timer may be utilized as a UTILITY TIMER to time output sequences such as intra-block NULL fill. The UTILITY TIMER is provided as a convenience for insertion of character sequences in output. Any character with Control Bit 9 set to 1 with start the timer and keep it going until it times out. In this regard it should be noted that when a data character is transferred to the storage area of Main Memory from the SPM, an eight bit control word is loaded into the I/O Out and Request area of the memory. At time out, the character sequence is terminated and subsequent characters should appear with Control Bit 9 set to 0. The utility timer is started under the following conditions:

Control Byte 4, bits 07–04 ≥ 0010.

Out Control Flag bit 09=1.

The Port is set for the output mode.

Under these conditions all inputs to AND 3026 are at the high level and it produces a low level output signal that passes through OR 3028 to block OR 3030. This drops the signal CLEAR TIMER to the low level, so that the timer may be started.

The UTILITY TIMER is stopped by setting Control Bit 09 to 0, or by the timer counting to the value stored in Byte 4, bits 07–04. In the latter case, a status request is generated, and Byte 2, bit 04 is set to 1.

If the UTILITY TIMER is operating with Byte 4, bit 00 = 0, then, when Control Bit 9 is set to 0, the GROSS TIMER will start operation if its start conditions are still met.

DLE/SYN MEMORY

The DLE/SYN Memory is shown in FIG. 6, and comprises two 32 bit random access memories. Each memory stores 8 words of 4 bits each. Of the 8 words in each memory, 4 words are utilized for DLE characters and 4 words are utilized for SYN characters. The two random access memories are addressed in parallel so that each time the DLE/SYN Memory is addressed, it produces an 8 bit output.

The DLE/SYN Memory is addressed by the signals I/O 6, I/O 5 and AD 02. For reading out of the memory, the signal AD 02 is produced by AND-OR inverter 776 when the high level signal SELECT SYN is applied to one AND input, provided the signal SUSPEND LRC on lead 1194 is at the low level.

In FIG. 8, the signals I/O 6 and I/O 5 for normally addressing the DLE/SYN Memory are produced at the output of MUX 812 and are determined by the combination of bits set into Byte 2, bits 06 and 07.

When loading the DLE/SYN Memory, the signals I/O 6 and I/O 5 are determined by bits 05 and 06 of a control word on bus 158. The control word is placed on the bus and a WRITE 57 command is generated. In FIG. 7, this command enables AND 716 and upon occurence of the signal SYNC ACK, AND 716 produces a high level output signal to enable one input of AND-OR Inverter 776. If bit 00 of the control word is a 0, then the signal I/O 00 on lead 866 enables AND-OR Inverter 776 to produce the addressing signal AD 02.

The DLE/SYN Memory requires the signal WRITE ENABLE DLE/SYN on lead 772 in order to have information written therein. This signal is generated in FIG. 7 where the output of AND 716 enables one input of AND 770. If bits 01, 02 and 03 of the control word on bus 158 are all ones, and bits 04 is a 0, AND's 776 and 768 are enabled and the output of AND 768 enables one input of AND 770. This AND is further enabled by the high level output of AND 716 and, at time TP 13–14, the high level output of NOT 726 enables the third input of AND 770. The output of AND 770, in combination with the addressing signals I/O 6, I/O 5 and AD 02 enables the loading of data into the DLE/SYN Memory.

The data is applied to the DLE/SYN Memory over the bus 810, which carries I/O bits 08–15. In FIG. 8, the signal I/O 08–15 are derived from Decoder/MUX's 800 which receives bits 08–15 of the control word on bus 158. The manner in which the Decoder/MUX's 800 are addressed has previously been explained in connection with the loading and operation of the CI and CD memories.

Figure 46:
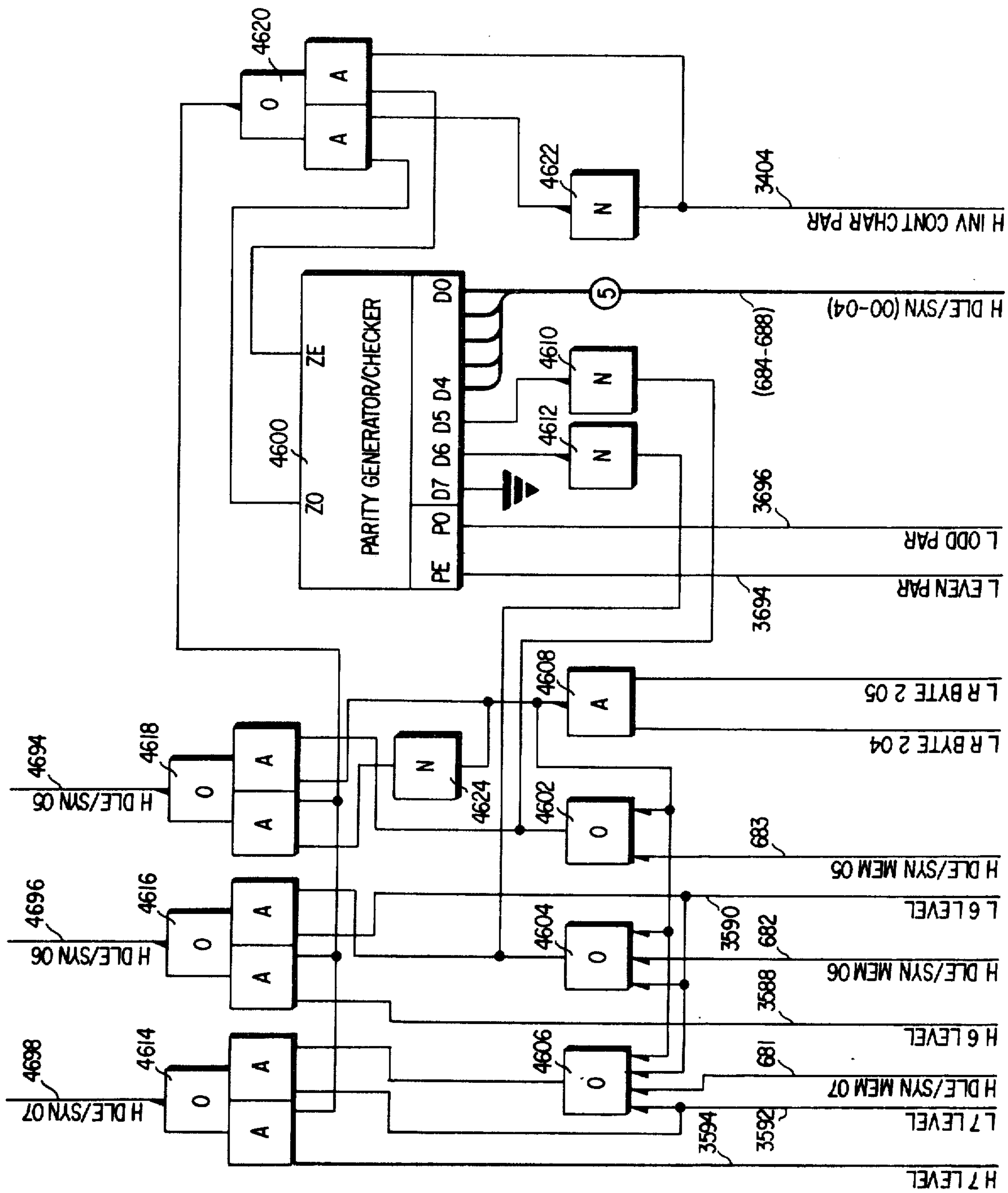

FIG. 46, shows the Parity Generator/Checker 4600 which is utilized to generate and check the parity of the DLE/SYN Memory 604. Bit positions 00–05 of the memory output are connected to the D0–D4 inputs of the parity checker. DLE Memory positions 5, 6 and 7 are applied to three OR's 4602, 4604, 4606. The signals R BYTE 2 04 and R BYTE 2 05 are applied to an AND 4608. If a line is programmed to handle five bit characters, both inputs to AND 4608 will be at the high level and it will produce a low level output signal which passes through OR's 4602, 4604 and 4606. The outputs of OR's 4602 and 4604 are passed through two NOT's 4610 and 4612 to the D5 and D6 inputs of the Parity Generator/Checker. In addition, the output of OR's 4606, 4604 and 4602 are applied as inputs to AND/OR Inverters 4614, 4616 and 4618. The low level signal 7 LEVEL is applied to OR 4606 and one input of AND-OR Inverter 4614. The high signal 7 LEVEL is applied to a further input of AND-OR Inverter 4614. The low signal 6 LEVEL is applied to OR's 4604 and 4606 as well as one input of AND-OR 4616. The high signal 6 LEVEL is applied to a further input of AND-OR Inverter 4616. The 6 and 7 LEVEL signals are all produced in FIG. 35 and provide indications of the length of the characters being handled by a port.

Assume, for example, that the port is programmed to handle 5 bit characters, excluding parity. The low order five bits of the DLE/SYN Memory output word are applied directly to the Parity Generator/Checker 4600. The output of AND 4608 passes through OR's 4602, 4604 and 4606 to enable the right hand inputs to AND-OR Inverters 4614, 4616 and 4618. In addition, the outputs of OR's 4602 and 4604 are passed through NOT's 4610 and 4612 to apply zeros to the D5 and D6 inputs of the Parity Generator/Checker.

The Parity Generator/Checker generates either an odd or an even parity of the 8 bits applied to its inputs D0–D7, this being determined by whether it receives the low level signal ODD PARITY or the low level signal EVEN PARITY. The parity output bits from the Parity Generator/Checker are applied to inputs of AND-OR Inverter 4620. One side of the AND-OR Inverter receives the high level signal INVERT CONTROL CHARACTER PARITY while the other side receives this same signal after it has been passed through a NOT 4622. The resulting parity bit is applied to AND-OR Inverters 4614, 4616 and 4618.

The output of AND 4608 is inverted at NOT 4624 to enable one input of AND-OR Inverter 4618. If the parity bit output of AND-OR Inverter 4620 is a high level signal, then AND-OR Inverter 4618 produces a low level signal designated DLE/SYN 05. It is this signal that is written into the Assembly/Disassembly area 210 at bit position 05.

If, instead of being programmed to handle 5 bit characters, the port is programmed to handle 6 bit characters, then bits 05–00 from the output of the DLE/SYN Memory are applied to the Parity Generator/Checker, bit 05 passing through OR 4602 and NOT 4610 to be applied to the D5 input. The low 6 level signal blocks the right input to AND-OR Inverter 4616 while the high 6 level signal enables one input on the left side of AND-OR Inverter 4616. Therefore, when the partiy bit is produced by AND-OR Inverter 4620 is passes through the left side of AND-OR Inverter 4616 to become the DLE/SYN 06 signal which is entered into the Assembly/Disassembly area as the parity bit for the DLE or SYN character.

The operation of the circuits when the 7 level is selected is believed obvious in view of the foregoing illustrations.

MESSAGE CONTROL FLAGS

Four bits of each control word in the Main Memory 110 are provided to keep track of where the CMM is in regard to a message. These four bits, designated MESSAGE CONTROL FLAGS A, B, D, and D, are set by the various control characters that occur in a message. One purpose of these flags is to control the operation of the longitudinal redundancy check circuits and the cyclic redundancy check circuits. At the end of a message, five different situations can occur, depending upon whether it is an input or an output message and what type of error checking, such as CRC or LRC is being carried out. The states of the flags for various operating conditions are given below.

signal is generated if the LINE ON flag is reset. The signal R LINE ONE FLAG will be at a high level and passes through OR 4202 and OR 4200 to become the signal WRITE ENABLE MESSAGE CONTROL FLAGS.

The signal WRITE ENABLE MESSAGE CONTROL FLAGS is also generated if the output of AND 4204 is at the high level. This can occur under many conditions as determined by Message Control Flags B, C and D, whether a line is programmed to check LRC or CRC, and whether the line is programmed for input or output. The signal $\overline{IC}$·OUT is applied to the X and Y data inputs of Decoder 4206. The signals R MESSAGE CONTROL FLAG B and R MESSAGE CONTROL FLAG C are applied to the A0 and A1 inputs of the Decoder. The Decoder is enabled so that it may produce a low level signal at one of its X or Y outputs only if Message Control Flag D is set. If Message Control Flag D is set, Decoder 4206 produces a low level output signal at one of its X outputs if the port is operating in the output mode. On the other hand, if message control flag D is set and the port is operating in the input mode then Decoder 4206 may produce a low level signal at one of its Y outputs. The particular X or Y output that is enabled is determined by the combination of Message Control Flags B and C.

| FLAGS | ACTIVITY |
|---|---|
| D C B A | |
| 0 0 0 0 | Idle (no activity) |
| 0 0 0 1 | Message Started-No BCC |
| 0 0 1 0 | Message Started-Compute BCC-Exclude This Character from BCC |
| 0 0 1 1 | Computing BCC |
| 0 1 0 0 | BCC Suspended |
| 0 1 0 1 | EOM Detected-Include In BCC |
| 0 1 1 0 | EOM Detected-Exclude from BCC |

| | AT END OF MESSAGE WITH | | | | |
|---|---|---|---|---|---|
| | BCC OUTPUT | LRC OUTPUT | LRC INPUT | CRC OUTPUT | CRC INPUT |
| 1 0 0 1 | Send Pad | Send LRC | Message End Check LRC Clear | Send CRC 1 | Message End |
| 1 0 1 1 | Message End Clear | Send Pad | | Send CRC 2 | |
| 1 1 0 1 | | Message End Clear | | Send Pad | Message End Check CRC Clear |
| 1 1 1 1 | | | | Message End Clear | |

Figure 34:
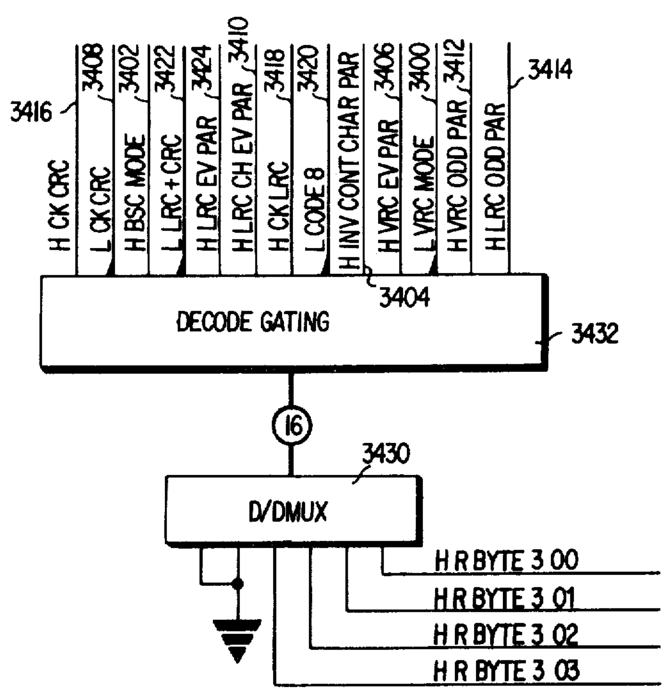
FIG. 34 shows the checking control decoder.
Figure 44:
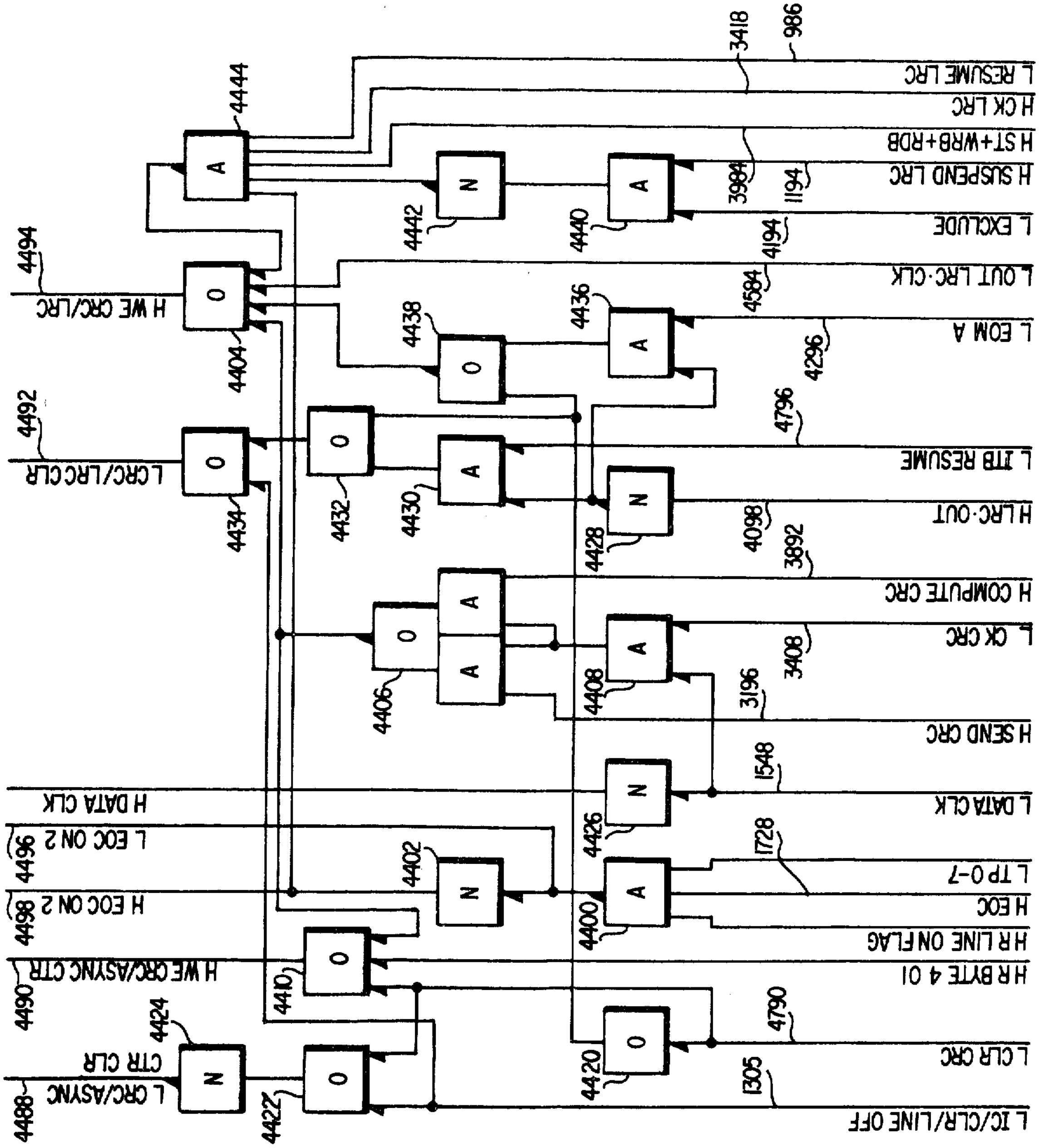

A message control flag A, B, C, or D or any combination of them, may be written into a control word in Main Memory only upon occurrence of the signal WRITE ENABLE MESSAGE CONTROL FLAGS. This signal is generated in FIG. 42 at the output of OR 4200 and is mixed with a TP 13–14 pulse in a multiplexer like MUX 500 to generate an enabling signal for writing into the message control flag area of Main Memory 110. The signal WRITE ENABLE MESSAGE CONTROL FLAGS is generated under several conditions. On each EOC cycle that the LINE ON flag is set, the signal WRITE ENABLE MESSAGE CONTROL FLAGS is generated during the interval TP 8–15. In FIG. 44, all inputs to AND 4400 are enabled and it produces a low level output that is applied over lead 4496 to OR 4200 to generate the signal WRITE ENABLE MESSAGE CONTROL FLAGS. The signal is also generated if the line is turned off. That is, the The X1, X2, X3, Y0, and Y2 outputs of Decoder 4206 are connected to the A0, A1, A2, B1 and B2 inputs of a Decoder/Multiplexer 4208. D/MUX 4208 is enabled by low level output from NOT 4210 as long as an ABORT character is not detected so that the CI and CD memory gating circuits produce the low level signal ABORT. D/MUX 4208 is addressed by the signals CK LRC and CK CRC which are generated by the Decode gating circuit 3432. In FIG. 34, a Decoder/Demultiplexer 3430 is permanently enabled and receives the signals from the Byte 3 area of the control word. D/MUX 3400 decodes the Byte 3 signals and produces output signals to Decoder gating circuit 3432, and this circuit in turn produces the signals for controlling the various checking modes of the CMM.

Returning to FIG. 42, the A and B outputs of D/MUX 4208 are applied to the two inputs of AND 4204, and if either of the outputs of the D/MUX 4208 is at the low level, then AND 4204 produces a high level signal that passes through OR 4202 and OR 4200 to become the signal WRITE ENABLE MESSAGE CONTROL FLAGS.

The EOC ON 2 signal is mixed with an EOM signal at AND 4212 to generate the low level signal EOM A. This signal is passed through NOT 4214 to enable AND 4216. AND 4216 is further enabled by the signal $\overline{IC}$· OUT to produce the signal EOM·IN. The output of AND 4216 is also applied to the B0 input of D/MUX 4208.

The X0 and X1 outputs of Decoder 4206 are passed through an OR 4218 to become the high level signal (RD 11 + RD 13) OUT. The Y1 output of Decoder 4206 is the low level signal RD 13IN.

Figure 42:
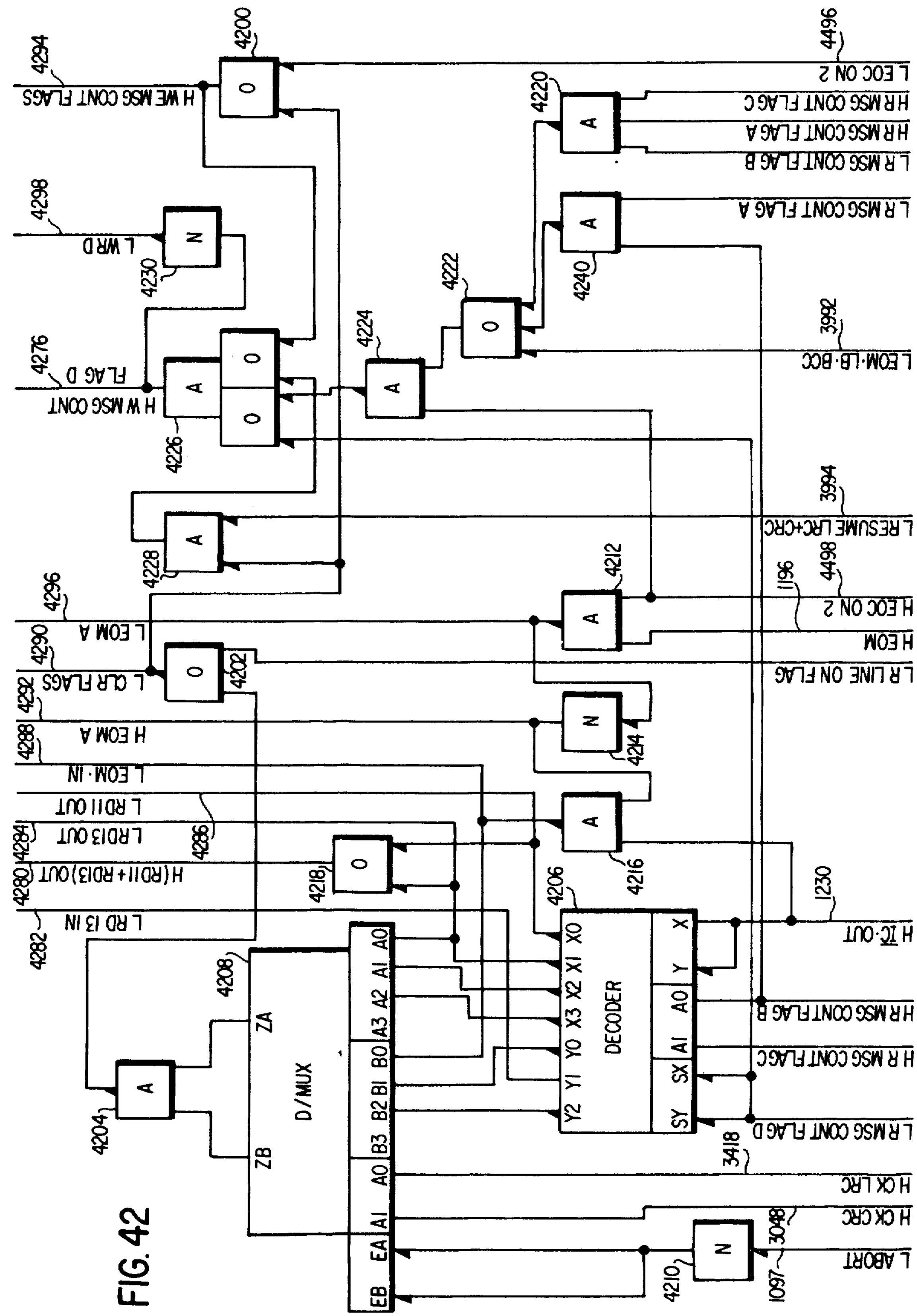

The circuits for setting Message Control Flag D in a control word are also shown in FIG. 42. If Message Control Flags A and C are set, but flag B is not set in a control word, all inputs to AND 4220 are at the high level and it produces an output signal that passes through OR 4222 to one input of AND 4224. Upon occurrence of the EOC ON 2 signal AND 4224 is further enabled and it produces a low level output to one input of an OR-AND inverter 4226. The other side of the OR-AND inverter may be enabled by either the WRITE ENABLE MESSAGE CONTROL FLAGS signal, or the output of an AND 4228 if the AND is blocked. Finally, one input OR-AND inverter 4226 is enabled if Message Control Flag D is set in a control word. The output of AND 4226 is the signal WRITE MESSAGE CONTROL FLAG D and this signal is applied to the message control flag area of Main Memory 110 where it is written into the memory at time TP 13–14 if the signal WRITE ENABLE MESSAGE CONTROL FLAGS is also present.

The output of OR-AND inverter 4226 passes through a NOT 4230 to become the signal WR D. This signal is used in the message control circuits as subsequently explained.

There are further conditions under which the Message Control Flag D may be set. One of these is if the signal EOM·LB·BCC is at a low level so as to pass through OR 4222 to AND 4224. This input of AND 4224 is also enabled by AND 4240 and OR 4222 if Message Control Flag A is not set but Message Control Flag B is set. However, as previously explained, any signal passing through OR 4222 cannot pass through AND 4224 unless the signal EOC ON 2 is at a high level.

Figure 41:
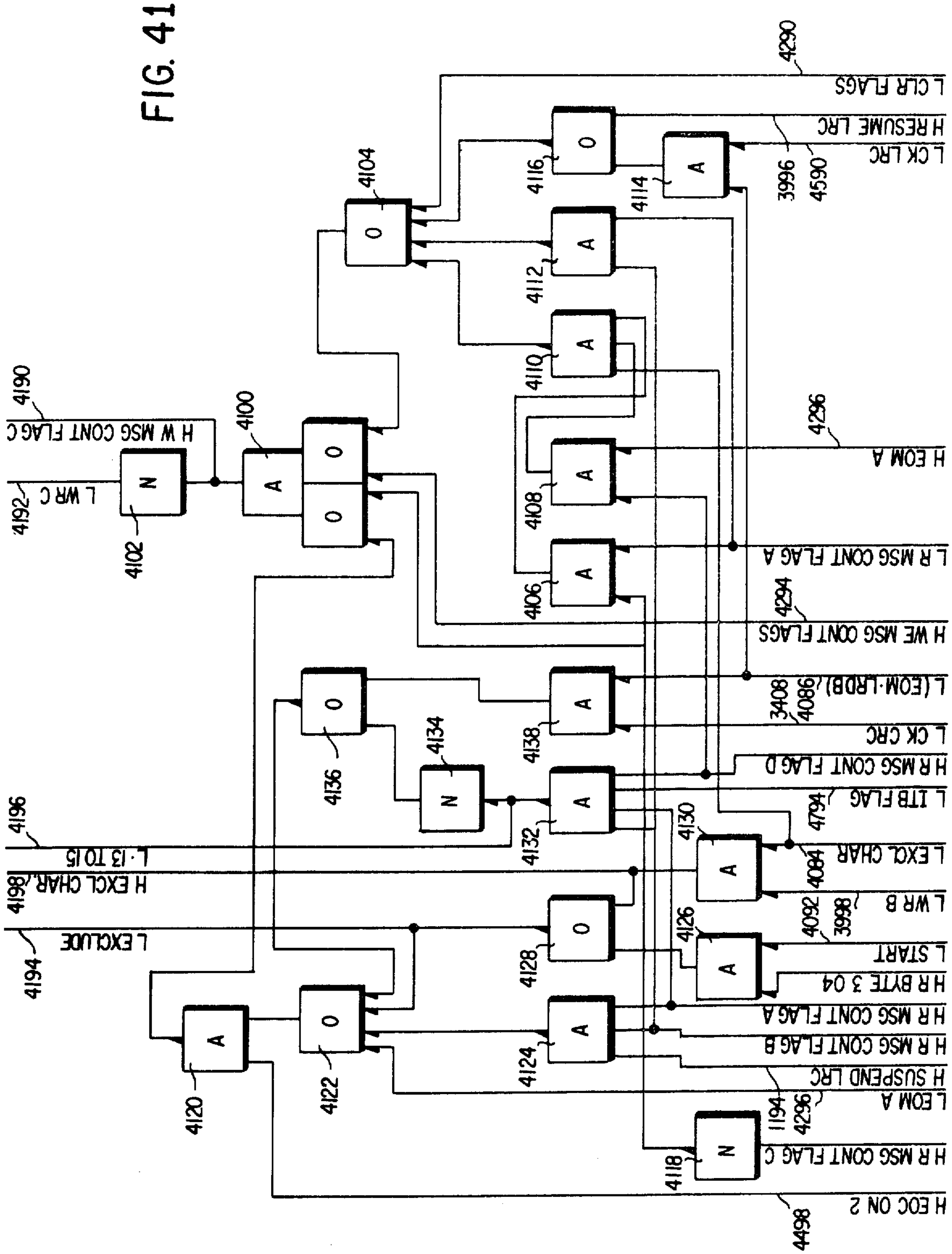

The circuits for setting Message Control Flag C are shown in FIG. 41. OR-AND Inverter 4100 produces the high level signal WRITE MESSAGE CONTROL FLAG C, if both of its input OR's receive at least one low level input. The output of OR-AND Inverter 4100 is passed through NOT 4102 to produce the low level signal WR C.

It should be noted that the high level signal WRITE ENABLE MESSAGE CONTROL FLAGS, which is necessary in order to enable the writing of Flag C into the memory, is applied to the right OR input of OR-AND Inverter 4100. Therefore, in order for the OR-AND Inverter to produce the signal WRITE MESSAGE CONTROL FLAG C it is necessary that OR 4104 have all of its inputs at the high level so that it can apply a low level signal to OR-AND Inverter 4100. Thus, the gating circuits providing inputs to OR 4140 define the conditions under which Message Control Flag C may not be set. For example, the low level signal CLEAR FLAGS drives the output of OR 4104 to the high level and this signal, in combination with the high level signal WRITE ENABLE MESSAGE CONTROL FLAGS, blocks OR-AND Inverter 4104 so that its output remains at a low level and Message Control Flag C is set to zero when the flags are written into the Main Memory. AND's 4106, 4108, 4110, 4112, and 4114 and OR 4116 define the further conditions under which the setting of Message Control Flag C may be inhibited.

The signal R MESSAGE CONTROL FLAG C is passed through a NOT 4118 and applied to OR-AND Inverter 4110 so the Flag C read out of a control word may be restored therein provided this is not inhibited by a high level output from OR 4104. If Control Flag C is not read out of Main Memory to OR-AND Inverter 4100, the only way that OR-AND Inverter 4100 can set Flag C is if AND 4120 produces a low level output. This can occur only if the signal EOC ON is at a high level and OR 4122 receives at least one low level input. AND 4124 applies a low level signal to OR 4122 if Message Control Flags A and B are set and the signal SUSPEND LRC is at a high level. AND 4126 produces an output that passes through OR 4128 to apply a low level input to OR 4122 if Byte 3 bit 04 is not set and the signal START is at the low level. Byte 3 bit 04 is set to zero if the START character of the message is to be excluded from the BCC.

AND 4130 produces an output signal that passes through OR 4128 to apply a low level input to OR 4122 if the signals WR B and EXCLUDE CHARACTER are both at the low level. The output of AND 4130 is the high level signal EXCLUDE CHARACTER and the output of Or 4128 is the low level signal EXCLUDE.

If Message Control Flags A, B and D are set and the signal ITB FLAG is at the high level, AND 4132 produces an output signal that passes through NOT 4134 and OR 4136 to apply a low level signal to OR 4122. If the signals CHECK CRC and (EOM·LRDB) are both at the low level, AND 4138 produces an output signal that passes through OR 4136 to apply a low level input to OR 4122.

Figure 39:
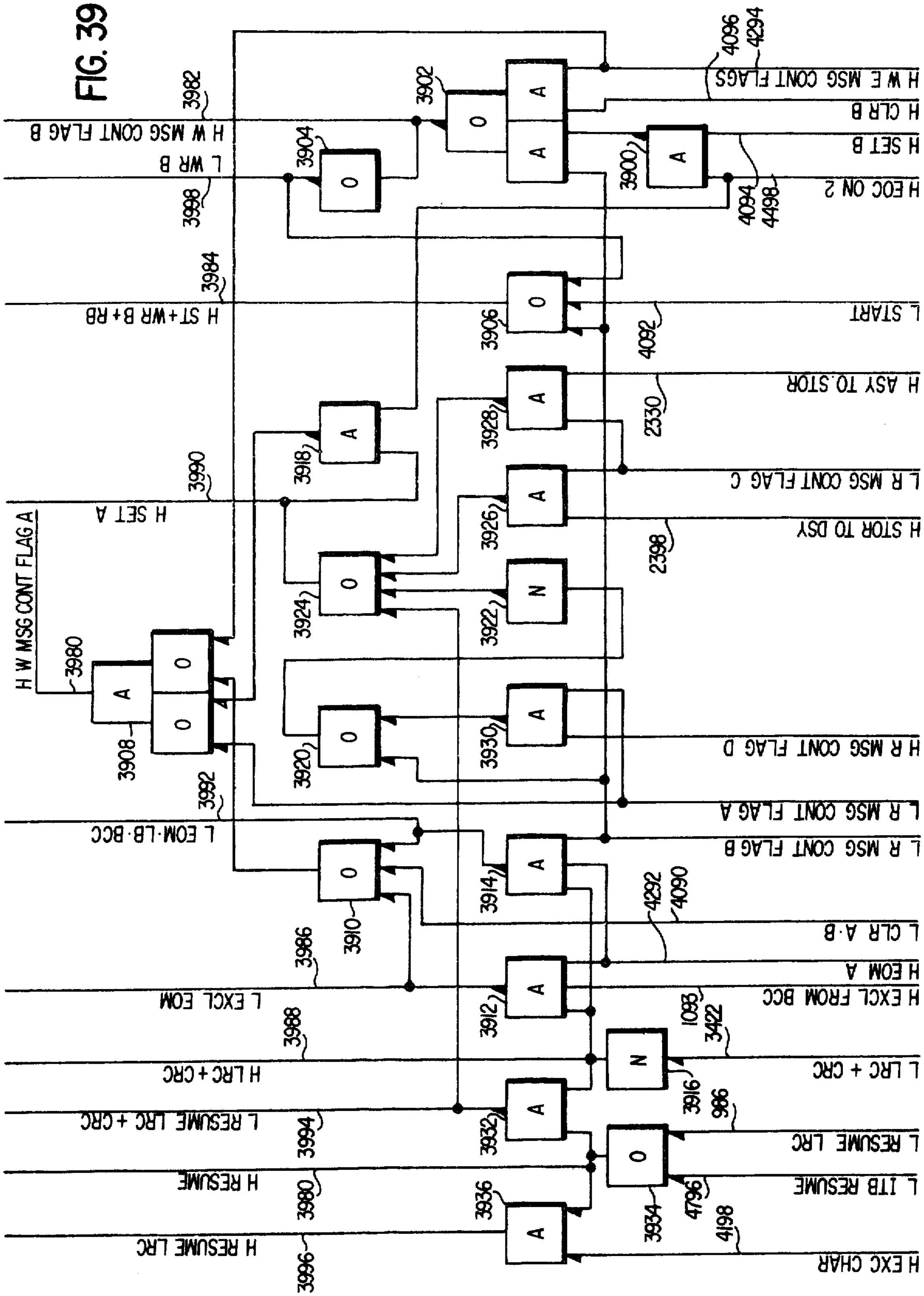

The circuits for setting Message Control Flags A and B are shown in FIG. 39. The circuits for setting Message Control Flag B comprise AND 3900 and AND-OR Inverter 3902. Message Control Flag B is set upon occurrence of the signal WRITE ENABLE MESSAGE CONTROL FLAGS provided AND-OR Inverter 3902 does not produce a low level output signal. When the signals WRITE ENABLE MESSAGE CONTROL FLAG and CLEAR B are both at the high level simultaneously, one side of AND-OR Inverter 3902 is enabled and it produces a low level output signal to clear Message Control Flag B. In the absence of the high level signal CLEAR B the input of AND-OR Inverter 3902 is disabled. The left input of AND-OR Inverter 3902 is disabled to permit the setting of Message Control Flag B if Message Control Flag B is already set or if the signal SET B occurs simultaneously with the signal EOC ON.

The output of AND-OR Inverter 3902 is passed through OR 3904 to become the signal WR B. This latter signal is passed through OR 3906 to generate the signal ST + WR B + RB on lead 3984. This signal is also generated on lead 3984 upon occurrence of the low level signal START, or if Message Control Flag B is set.

Message Control Flag A is set when OR-AND Inverter 3908 produces a high level output signal, provided of course the WRITE ENABLE MESSAGE CONTROL FLAGS signal is being generated. The high level signal WRITE ENABLE MESSAGE CONTROL FLAGS is applied to the right OR input of OR-AND Inverter 3908, hence the OR-AND Inverter 3908 can produce a high level output signal only if all inputs to OR 3910 are at the high level.

OR 3910 applies a high level output signal to OR-AND Inverter 3908 to prevent the setting of Message Control Flag A under the following conditions. First, if the signal CLEAR A·B on lead 4090 is at the low level. Secondly, if either AND 3912 or AND 3914 produces a low level output signal. The low level signal LRC + CRC is passed through a NOT 3916 to enable one input of each of the AND's 3912 and 3914. Both AND's are further enabled by the high level signal EOM A. AND 3912 is further enabled by the high level signal EXCLUDE FROM BCC, while AND 3914 is further enabled by the signal R MESSAGE CONTROL FLAG B when Flag B is not set.

If the output of OR 3910 is at the low level, then the signal WRITE MESSAGE CONTROL FLAG A may be generated if the flag is already set so that the signal R MESSAGE CONTROL FLAG A is at a low level, or if the conditions exist which cause AND 3918 to produce a low level output signal. This can occur only when the signal EOC ON 2 is at a high level to enable one input of AND 3918. The other input of AND 3918 is enabled under one of several conditions as follows.

If Message Control Flag B is set, a low level signal passes through OR 3920, NOT 3922 and OR 3924 to enable one input of AND 3918. The output of OR 3924 is the signal SET A.

If Message Control Flag C is not set, and the signal STORAGE TO DISASSEMBLY occurs, AND 3926 produces a low level output signal that passes through OR 3924 to enable AND 3918. If Message Control Flag C is not set and the signal ASSEMBLY TO STORAGE occurs then AND 3928 produces a low level output signal that passes through OR 3924 to enable AND 3918. If Message Control Flag D is set and Message Control Flag A is not set, both inputs to AND 3930 are enabled and it produces an output signal that passes through OR 3920, NOT 3922, and AND 3924 to enable AND 3918. Finally, if the signal LRC + CRC is at a low level so that the output of NOT 3916 enables one input of AND 3932, and one of the signals ITB RESUME, or RESUME LRC is at a low level so that OR 3934 enables the second input of AND 3932, the AND produces a low level output signal that passes through OR 3924 to enable AND 3918.

The output of OR 3934 is the high level signal RESUME. If this signal is at the low level, it enables one input of AND 3936 and if the signal EXCLUDE CHARACTER is also at the low level AND 3936 produces the high level signal RESUME LRC.

FLAGS 00–02 and DLE

The DLE character is used in the communications art to indicate that the character following the DLE character is to have something other than its normal significance, and should be treated as a control character. For example, a DLE character followed by a zero character may signify the end of a transmission.

The circuits for setting the DLE Flag are shown in FIG. 20. If the line is on one input of AND 2020 is enabled and the DLE Flag is set upon any of the three conditions which apply a low level input to OR 2018. The signal DECODE X1 is at a low level on each minor cycle that a port is programmed for synchronous output operation and, when the control word is read out of Main Memory 110 Flags 00 and 02 are set. The signal DECODE X1 is generated by the decoder 2200.

If the DLE Flag is already set, it is restored in the Main Memory with the control word each time the control word is read out and restored, except on an EOC cycle. On all minor cycles, except an EOC cycle, AND 2022 is enabled and the signal R DLE FLAG further enables the AND so that it produces a low level output signal to OR 2018.

On any minor cycle for a port, the DLE Flag may be set if it is not already set, a DLE character is detected by the CD tables, and the output of AND 2008 is at a high level.

Flags 00, 01 and 02 are set by the circuits shown in FIG. 18. If all of the inputs of AND 1852 are at the high level it produces an output signal that passes through NOT 1854 and OR 1856 to enable one input of AND 1812. The second input of AND 1812 is enabled by the signal DECODE X0 which will be at the low level when a line is operating in the synchronous output mode, Flag 02 is set, and Flags 00 and 01 are both reset. The output of AND 1812 enables one input of two AND's 1814 and 1860. If the DLE Flag is not set, the output of NOT 1858 further enables AND 1860 and it produces an output signal that passes through OR 1848 and NOT 1850 to set Flag 00. If the DLE Flag is set, it enables a second input of AND 1814. The third input of AND 1814 is enabled only when the signal DUP DLE + DL is at a high level. The output of AND 1814 passes through OR 1844 and NOT 1846 to set Flag 01.

When operating in the synchronous mode, and Flag 02 is already set, it is read out each time the control word is read out and is restored in memory with the rest of the control word provided the signal CLR TSPTF is at the low level. Under these conditions, all inputs of AND 1832 are enabled and an output signal is produced through OR 1834 and NOT 1836 to set Flag 02.

Flag 02 can be initially set by a character only if the previous character was a DLE. In this case, when a character is sensed which causes the CI tables to produce the signal CI 09, the DLE Flag will still be set in the control word, so all inputs to AND 1838 will be enabled and it will produce an output through OR 1834 and 1836 to set Flag 02. Flag 02 is the transparent mode flag. If Flag 02 is already set at the time AND 1838 produces a signal to again cause setting of the flag, Status 2 07 is also set. The output of AND 1838 enables one input of AND 1840 and if Flag 02 is already set, AND 1840 produces an output signal that is passed through NOT 1842 to become the signal WRITE STATUS 2 07.

Output control Flags 08 and 11 are utilized for purposes that do not relate to the present invention. Output control Flag 09 is utilized to control the Procedure/Utility Timer as previously described. Output control flag 10 is utilized in FIG. 10 and when this flag is set it prevents generation of the DUP DLE signal.

LONGITUDINAL REDUNDANCY CHECK

A longitudinal redundancy check may be made on a message by adding, modulo 2, corresponding bit positions of each succeeding character. That is, all bits zero for all of the characters are summed modulo 2 to obtain bit zero of the longitudinal redundancy check character. The same is done for bits 1, 2, 3, 3tc., so that a longitudinal redundancy check character is developed which has the same number of bits as all of the characters in a message. This check character, when transmitted or received at the end of a message and added in with the other character should produce a result of zeros in all positions. Thus, it guards against errors being made by dropping one bit or by noise changing zero bits to one bits.

Figure 32:
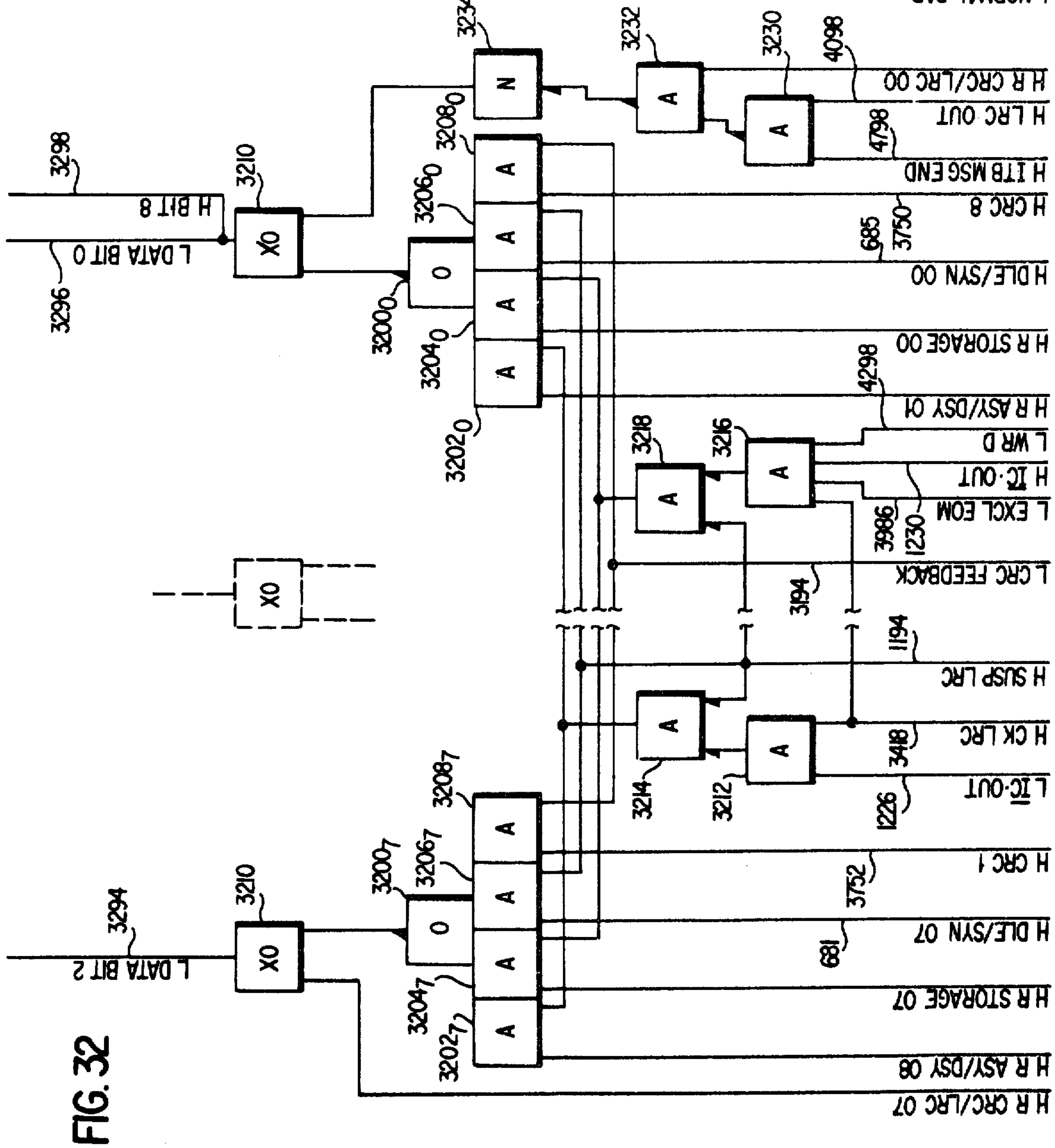
Figure 33:
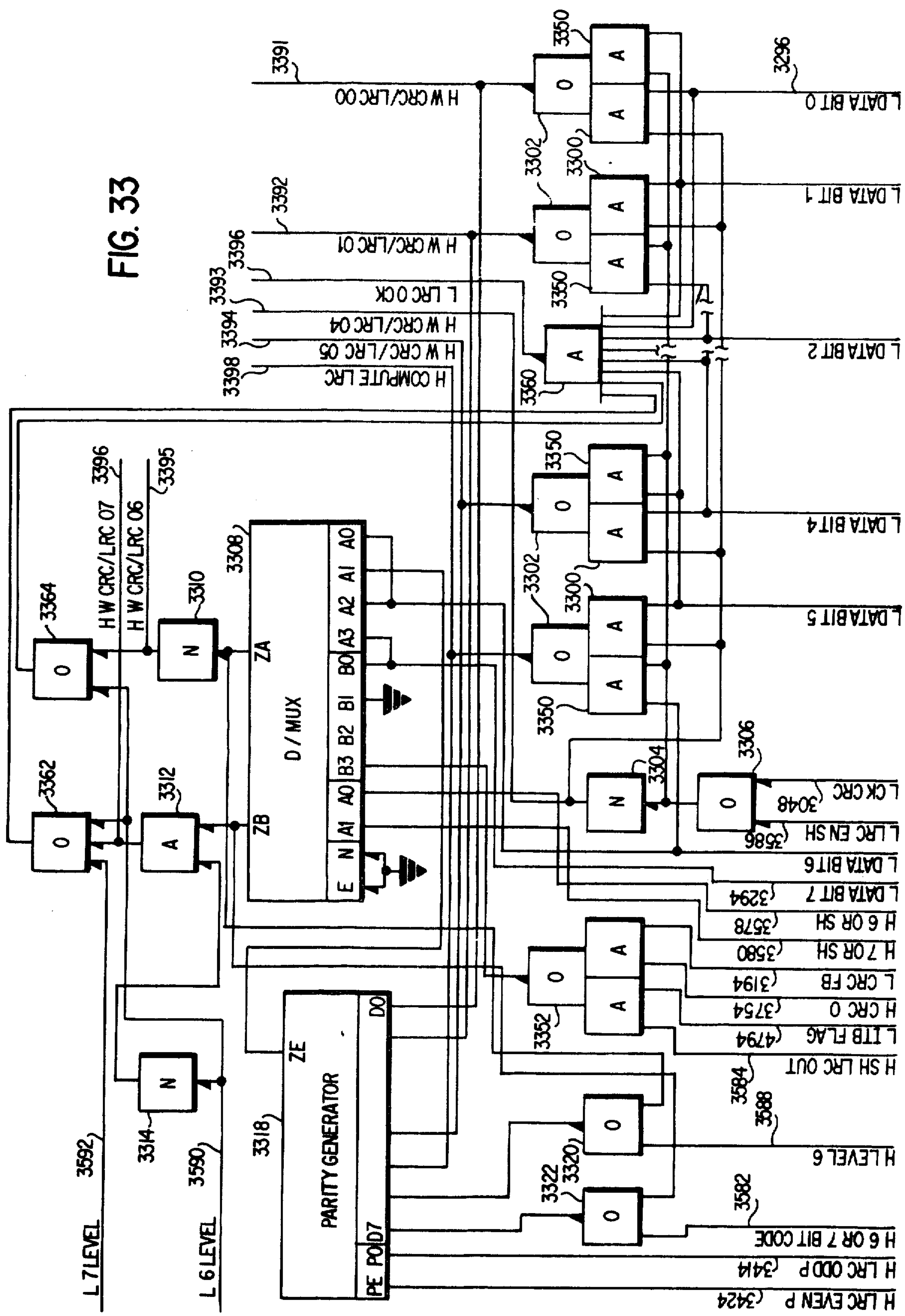

FIGS. 32 and 33 show the primary circuits for generating the LRC character. In FIG. 32, eight AND-OR inverters 3200 are provided, only two of which are shown in FIG. 32. The AND-OR inverters 3200 are provided with four sets of AND inputs 3202, 3204, 3206 and 3208. AND's 3202 are connected to holding register 112 and receive signals representing a character read out of the assembly/disassembly area bits 01–08. The second set of AND gates is connected to the holding register 112 and receives the signals representing a character read out of the storage area of the memory. A third set of AND gates receives the signals DLE/SYN 00 – 07 which are read out of the DLE/SYN Memory 604. The fourth set of AND gates receives the signals CRC 1 – 8 which are utilized in the cyclic redundancy check mode subsequently described.

Only one of the sets of AND gates for the AND-OR inverters 3200 is enabled at any one time. In the input mode, AND's 3202 are enabled so that the contents of the Assembly/Disassembly area may be gated through the AND-OR inverters 3200 to a set of eight exclusive OR or modulo 2 circuits 3210. If a port is programmed for the input mode and the LRC check mode, both inputs to AND 3212 are enabled and it produces an output signal to enable AND 3214. AND 3214 is further enabled by the signal suspend LRC which is at a low level unless a character is to be excluded from the longitudinal redundancy check. The output of AND 3214 enables all of the AND's 3202.

In the output mode AND's 3204 are enabled so that the contents of the Storage area of main memory may be gated through AND-OR Inverters 3200 to the Exclusive OR's 3210. The signals CK LRC and $\overline{\text{IC}}$·OUT are both at the high level to enable two inputs of AND 3216. If an end message character is not in storage or even if an end of message character is in the storage area but is not to be excluded from the longitudinal redundancy check, the signal on lead 3986 is at the high level to further enable AND 3216. If the message control flag D is not being set, the signal on lead 4298 will be at a high level so AND 3216 produces an enabling output signal to AND 3218. AND 3218 is further enabled if the signal on lead 1194 is at a low level indicating that the longitudinal redundancy check has not been suspended. The output of AND 3218 enables all of the AND's 3204.

AND's 3206 receive the outputs from the DLE/SYN Memory and pass these signals through the AND-OR Inverters 3200 to Exclusive OR's 3210 provided that the signal on lead 1194 is at a high level indicating that the longitudinal redundancy check is suspended.

AND's 3208 are utilized for the cyclic redundancy check and are enabled whenever the signal on lead 3194 is at a high level to pass the signals CRC 1 – CRC 8 through AND-OR Inverters 3200 to the Exclusive OR's 3210.

The outputs from AND-OR Inverters 3200 are compared with the signals R CRC/LRC 07 through R CRC/LC 00 in the Exclusive OR circuits 3210. If an Exclusive OR compares its two input signals and finds that they are unequal, it produces a high level output signal. These output signals are applied to FIG. 33 and are designated DATA BIT 0 through DATA BIT 7. Data bits 0–5 are applied to a first set of AND's 3300 of a set of 6 AND/OR Inverters 3302. These AND's are further enabled by the output of a NOT 3304 since both of the inputs to OR 3306 will be at a high level during computation of the longitudinal redundancy check character. The outputs of AND-OR Inverters 3302 are the signals WRITE CRC/LCR 00–05 which are applied to the LRC area of Main Memory 110 where a one is written for any position where the output of the AND-OR Inverter 3302 is at a high level. Furthermore, the outputs of AND-OR Inverters 3302 can be written into the LRC area of Main Memory 110 only if the LRC area of the memory is enabled for writing. The high level signal WRITE ENABLE CRC/LRC is generated in FIG. 44 and it is applied to a multiplexer like Mux 500 so as to enable the LRC area for writing into the memory at time TP 13–14. Furthermore, the outputs of AND-OR Inverters 3302 are applied to the memory through a D/Mux like D/Mux 208 which is enabled only when the signal CRC/LRC CLEAR, generated in FIG. 44 is at the high level. This D/Mux has its addressing inputs tied to fixed voltage levels to that no further addressing signals are required to pass the outputs of the AND-OR Inverters into the LRC area of the Main Memory.

Because the characters may be programmed to have different lengths, the entry of data bits 6 and 7 into CRC/LRC bits 06 and 07 is somewhat more complex than it is for bits 00 through 05. The signals DATA BIT 6 and DATA BIT 7 produced in FIG. 32 are applied to a Decoder/Multiplexer 3308. Data bit 6 is applied to the A0 and A2 inputs of the D/MUX while data bit 7 is applied to the A3 and B0 inputs. The D/MUX is permanently enabled, and is addressed by two signals 6 OR SH and 7 OR SH. These latter signals are derived in FIG. 35 and represent a decoding of Byte 2 bits 04 and 05 which specify the character length.

Figure 35:
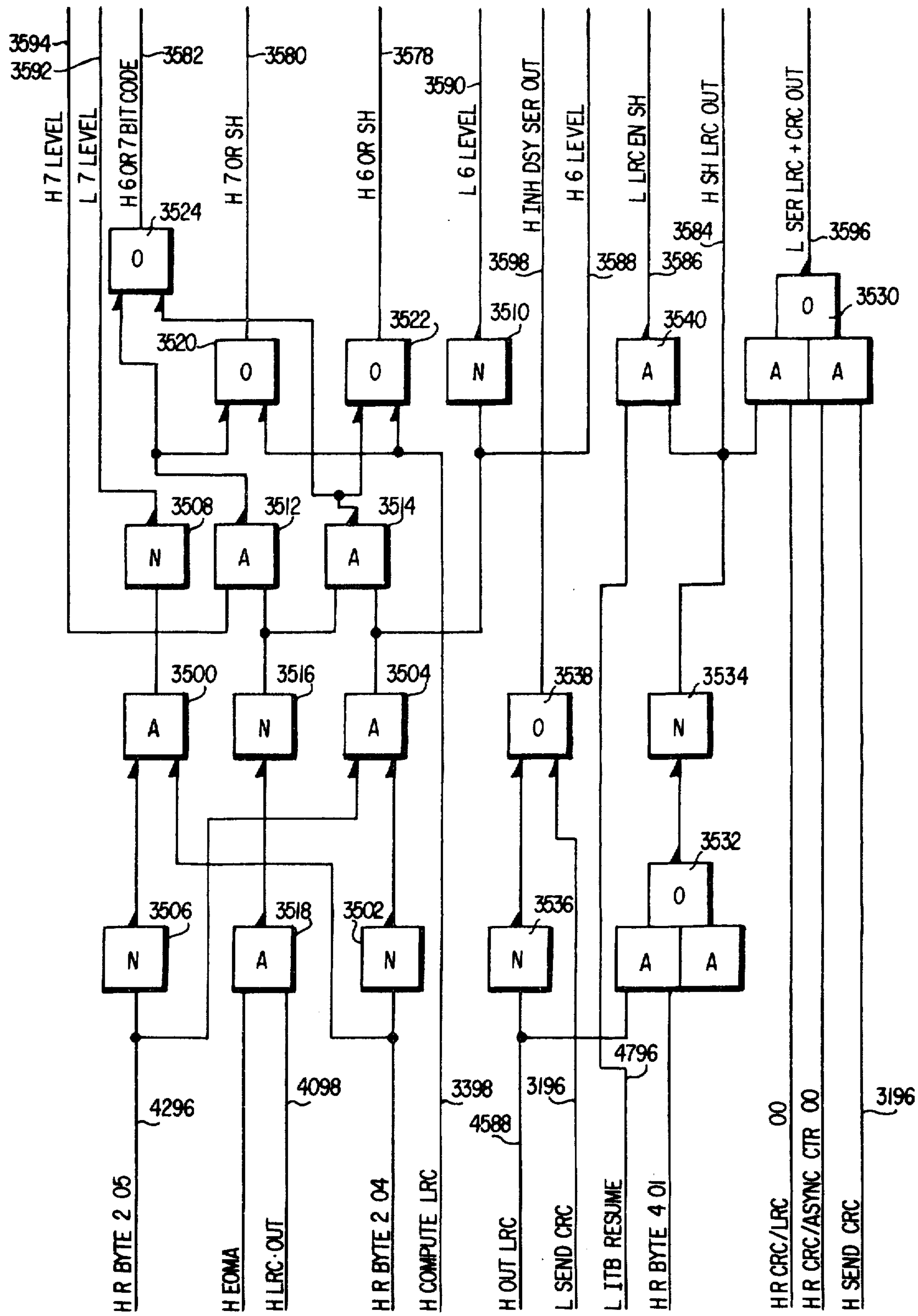
FIGS. 35, 38–42 and 44–47 show logic circuits for message control.

Referring for the moment to FIG. 35, the signal R Byte 2 04 is applied to one input of AND 3500 and is inverted by NOT 3502 and applied to one input of AND 3504. The signal R Byte 2 05 is applied to a second input of AND 3504 and is inverted by NOT 3506 and applied to a second input of AND 3500. The output of AND 3500 is the high level signal 7 LEVEL. It is inverted by NOT 3508 to become the low level signal 7 LEVEL. The output of AND 3504 is the high level signal 6 LEVEL. It is passed through NOT 3510 to become the low level signal 6 LEVEL.

The output of AND 3500 enables one input of AND 3512 while the output of AND 3504 enables one input of AND 3514. Both of these ANDS are further enabled by the output of NOT 3516 only when AND 3518 produces a low level output signal. This can occur only when the signals EOM A and LRC·OUT are both at the high level. Thus, during computation of the LRC character the outputs of AND's 3512 and 3514 are both at the high level and block inputs to OR's 3520 and 3522. The signal COMPUTE LRC is derived from FIG. 33 and is at a high level during computation of the LRC character thus blocking the other inputs to OR's 3520 and 3522. Thus, the signals 6 OR SH and 7 OR SH are both at the low level during computation of the LRC character.

In FIG. 33, with both of the signals 6 OR SH and 7 OR SH at the low level the A0 and B0 data inputs of D/MUX 3308 are selected. Thus, DATA BIT 6 and DATA BIT 7 pass through the D/MUX 3308 to the A and B outputs. The A output of D/MUX 3308 is connected through a NOT 3310 to become the signal WRITE CRC/LRC 06. This signal will be at a high level if the signal DATA BIT 6 is at the low level. The B output of D/MUX 3308 enables one input of an AND 3312 if the signal DATA BIT 7 is at the low level. If level 6 is selected the output of NOT 3314 blocks AND 3312 and the output of AND 3312 writes a one into CRC/LRC 07. On the other hand, if level 6 is not selected the output of NOT 3314 enables AND 3312 and the value written into CRC/LRC 07 is dependent upon the level of the DATA BIT 7 signal.

A parity generator/checker 3318 has eight data inputs D0–D7. The outputs of AND-OR Inverters 3302 are applied to the D0–D5 inputs of the parity generator. The A and B outputs of D/MUX 3308 are applied through OR's 3320 and 3322 to the D6 and D7 inputs. The parity generator/checker is enabled by one of the signals LRC ODD PARITY or LRC EVEN PARITY to generate the parity of the LRC character. The signals LRC EVEN PARITY and LRC ODD PARITY are selected by program control and are determined by Byte 3 bits 3–0 which are applied to the decoding circuits of FIG. 34. The parity generated by parity generator 3338 is applied to the A1 and B2 inputs of D/MUX 3308. At the end of an output message when the signals EOM A and LRC.OUT enable AND 3518, the parity bit may pass through D/MUX 3308 to the A output if Byte 2 bits 04 and 05 are 1 and 0, respectively. If Byte 2 bits 04 and 05 are 0 and 1, respectively, the signal 7 OR SHIFT will enable D/MUX 3308 so that the output of the parity generator is passed through to the B output.

The computed LRC character is shifted out to the line adapter through the output multiplexer one bit at a time. Once each major cycle the LRC character is read out, if there is a data clock, and as it passes through AND-OR Inverters 3302 it is shifted one position to the right as it is returned to the CRC/LRC area of Main Memory. The low order bit CRC/LRC 00 read out of the memory through the Holding Register 112 is applied to AND-OR Inverter 3530. The bit is gated through the inverter as follows. If the port is programmed for synchronous operation the signal R Byte 4 01 is at a high level to enable one input of AND-OR Inverter 3532. The signal OUT LRC will be at a high level and the resulting low level output of AND-OR Inverter 3532 is inverted by NOT 3534 to enable the second input of AND-OR Inverter 3530. The output data bit of AND-OR Inverter 3530 is the low level signal serial LRC + CRC OUT. This signal is applied to FIG. 3 where it passes through OR 324 and MUX 326 to the output multiplexer and line adapter.

In FIG. 35 the signal OUT LRC passes through NOT 3536 and OR 3538 to become the signal INHIBIT DISASSEMBLY SERIAL OUT. This signal is also applied to FIG. 3 where it blocks AND 322 to in turn block AND-OR Inverter 320 so that serial output data from the Assembly/Disassembly area of the memory is inhibited.

In FIG. 35 the output of NOT 3534 is the signal SHIFT LRC OUT. This signal is applied to AND 3540 which is further enabled if the signal ITB RESUME is at the high level. The output of AND 3540 is the signal LRC ENABLE SHIFT. It is applied to FIG. 33 where it passes through OR 3306 to enable the gates 3350 of AND-OR Inverters 3302. Furthermore, DATA BIT 6 may pass through the AND-OR Inverter 3302 for position 5 so as to be re-stored in CRC/LRC 05. If both of the signals 6 OR SHIFT and 7 OR SHIFT are at the high level DATA BIT 7 passes through the A3 input of D/MUX 3308 from whence it passes through NOT 3310 to become the signal WRITE CRC/LRC 06.

Figure 45:
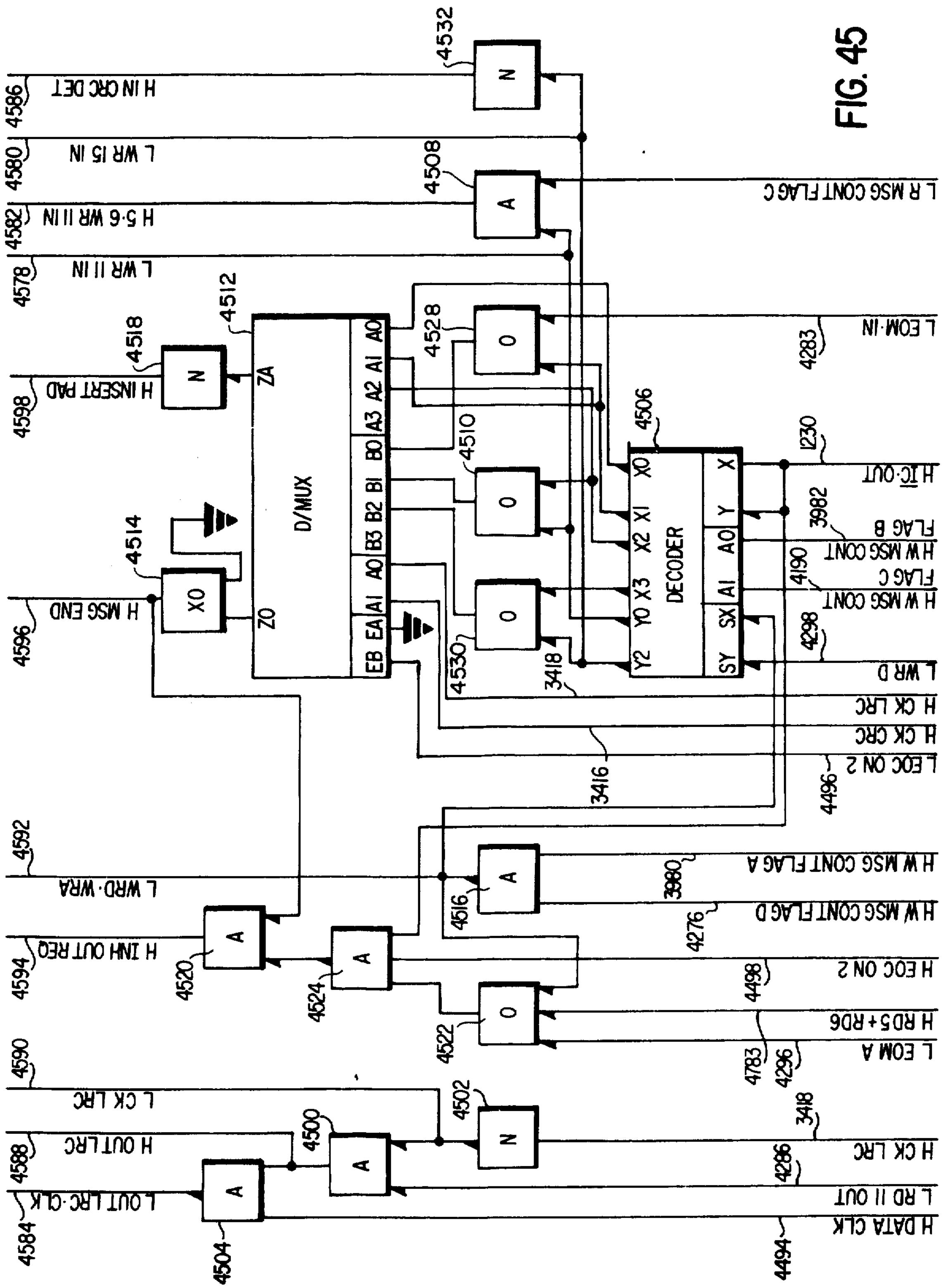

It will be understood that the sending of the LRC character as described above can occur at the end of a message only if message control flags A–D have the value 1001. Under these conditions the decoder 4206 produces the low level signal RD 11 OUT at its X0 output. In FIG. 45 this signal is applied to one input of AND 4500 which is further enabled by the high level signal CHECK LRC which passed through NOT 4502 to a second input of AND 4500. The output of AND 4500 is the high level signal OUT LRC which is utilized in FIG. 35 to generate the signals described above that are necessary for shifting out the LRC character. The output of AND 4500 also enables AND 4504 which is further enabled by the high level signal DATA CLOCK so as to produce the low level output signal OUT LRC·CLOCK. This signal is applied to FIG. 44 where it passes through OR 4400 to become the signal WRITE ENABLE CRC/LRC which is utilized as described above to enable the writing of the outputs from AND-OR Inverters 3302 into the LRC area of the memory.

On an input operation the different bit positions of the characters in the message are summed modulo-2 and when the LRC character is included in the sum the overall sum should be all zeros. AND 3360 checks to ensure that this is true. Data bits 0–5 are applied as inputs to AND 3360. In addition, DATA BITS 6 and 7, if they exist, are derived from the outputs of ORs 3362 and 3364 and are also applied to AND 3360. If the message was transmitted without error then AND 3360 produces the low level output signal LRC 0 CHECK.

Figure 36:
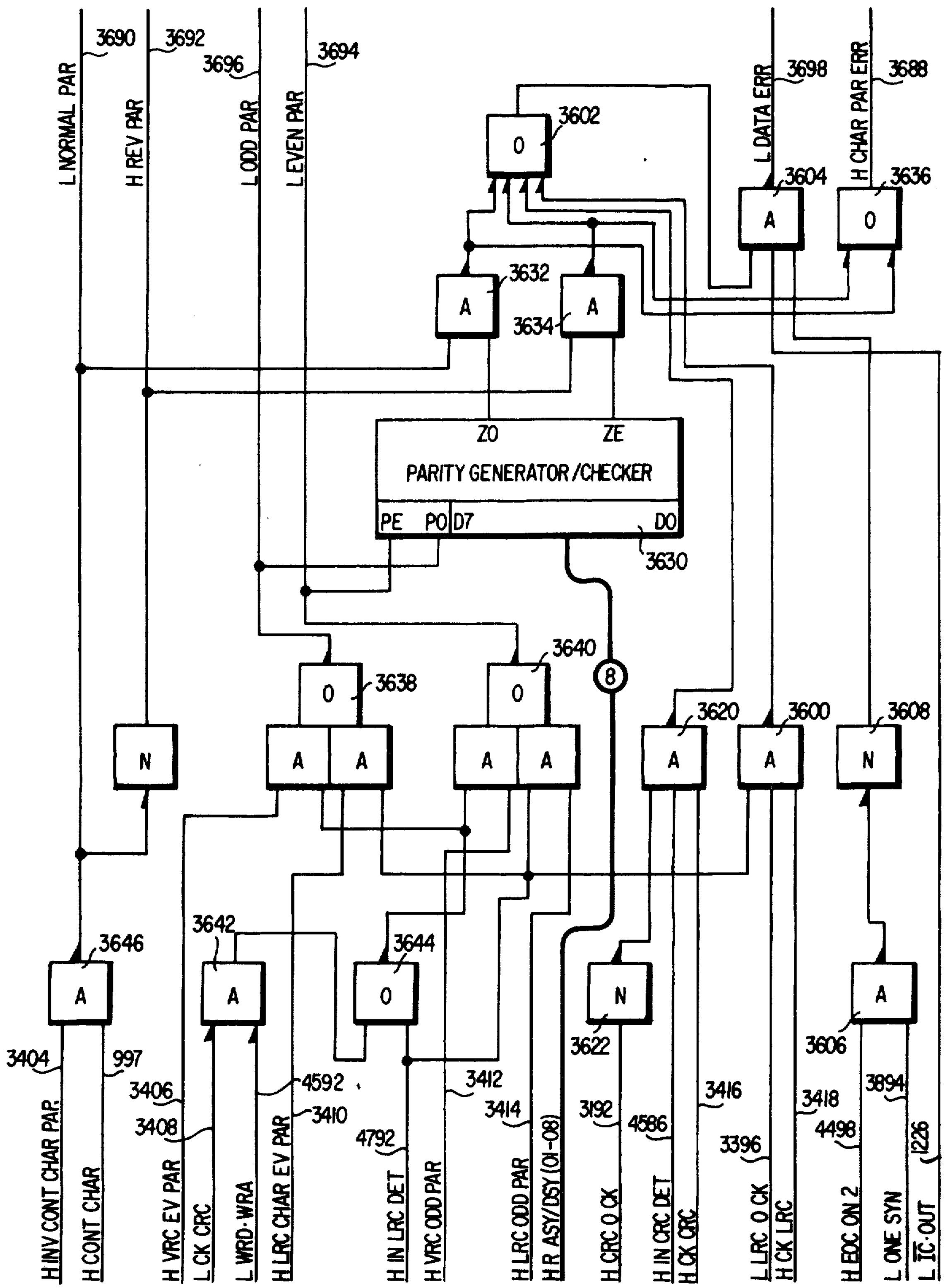
FIG. 36 shows a parity generator and checking logic.

In FIG. 36, the signal LRC 0 CHECK is applied to one input of AND 3600. A second input of AND 3600 receives the signal CHECK LRC from the Byte 3 decoding circuits of FIG. 34. Finally, AND 3600 receives the signal LRC DETECTED which is generated as follows.

In FIG. 45 the signal WR D will be at a low level to enable the SY input of decoder 4506. The signal $\overline{IC}$·OUT will be at a low level to enable the Y input of the decoder. The signals WRITE MESSAGE CONTROL FLAG B and WRITE MESSAGE CONTROL FLAG C will both be at the low level so that decoder produces a low level output signal at its Y0 output. This signal is applied to AND 4508 which will be further enabled at this time because Message Control Flag C will be set. The output of AND 4508 is the signal 5 + 6 WR 11 IN. This signal is applied to FIG. 47 where it passes through OR 4708 to AND 4710. This AND is further enabled by the signal CHECK LRC which produced by the Byte 3 decoder of FIG. 34. The output of AND 4710 is the signal IN LRC DETECTED. When it is applied to AND 3600 it samples the signal LRC O CHECK. If the check is correct so that signal LRC O CHECK is at a low level, there is no significant output from AND 3600. On the other hand, if an error has occurred the signal LRC O CHECK will be a high level and AND 3600 produces a low level output signal that passes through OR 3602 to AND 3604. This AND is further conditioned by the signal $\overline{IC}$·OUT which is at a high level during input operations. If the signal one SYN is at a high level the EOC ON 2 signal passes through AND 3606 and NOT 3608 to enable the third input of AND 3604. The AND is thus enabled to produce the low level signal DATA ERROR.

Returning for the moment to FIG. 45, the Y0 output of decoder 4506 is passed through an OR 4510 to the B1 input of Decoder/Multiplexer 4512. The signal CHECK LRC applied to the A0 input of the D/MUX will be at a high level to select the A1 and B1 inputs. Furthermore, the EB input of D/MUX 4512 drops to the low level at EOC ON 2 time hence the signal applied to the B1 input passes through the D/MUX to the Z0 output where it is applied to an Exclusive OR 4514. The other input of the Exclusive OR is tied to the low level voltage source hence when the high level output signal occurs from D/MUX 4512 Exclusive OR 4514 produces the high level signal MESSAGE END. This signal is applied to FIG. 26 where it generates a signal to WRITE STATUS 1 Bit 04 and also generates the signal MESSAGE END A.

When a line is operating in the LRC output mode and flags D–A have the value 1011 at the end of a message, a pad is inserted in place of the LRC character. In FIG. 45, both inputs to AND 4516 will be at the high level because flags A and D are being set hence AND 4516 produces a low level output signal to enable the SX input of decoder 4506. The signal $\overline{IC}$·OUT will be at a high level to enable the X input of the decoder. Finally, the signal WRITE MESSAGE CONTROL FLAG B will be at a high level and the signal WRITE MESSAGE CONTROL FLAG C will be at the low level thereby causing decoder 4506 to produce a low level output signal at X0 while producing a high level output signal at X1 and X2. The X1 output is connected to the A1 input of D/MUX 4512 which is enabled at EOC ON 2 time by the signal on lead 4496. The signal CHECK LRC will be at the high level while the signal CHECK CRC will be at the low level hence the A1 input of D/MUX 4512 is gated through to the ZA output and from there through a NOT 4518 to become the signal INSERT PAD. This signal is applied to FIG. 19 where it functions in the same manner as the generate pad signal previously described in connection with an output operation.

The circuits of FIG. 45 generate the signal MESSAGE END but do not transfer either an LRC or pad character if, at the end of the message the message control flags D–A are set to the value 1101. The SX and X inputs of decoder 4506 are enabled as previously described. However, in the present instance the signal WRITE MESSAGE CONTROL FLAG B will be at low level while the signal WRITE MESSAGE CONTROL FLAG C is at the high level. A low level signal is produced at the X2 output of the decoder and this signal passes through OR 4510 to the B1 input of D/MUX 4512. The A1 and B1 inputs are selected as before, hence the high level input at B1 is passed through to the Z0 output and from there through Exclusive OR 4514 to become the signal MESSAGE END.

Figure 47:
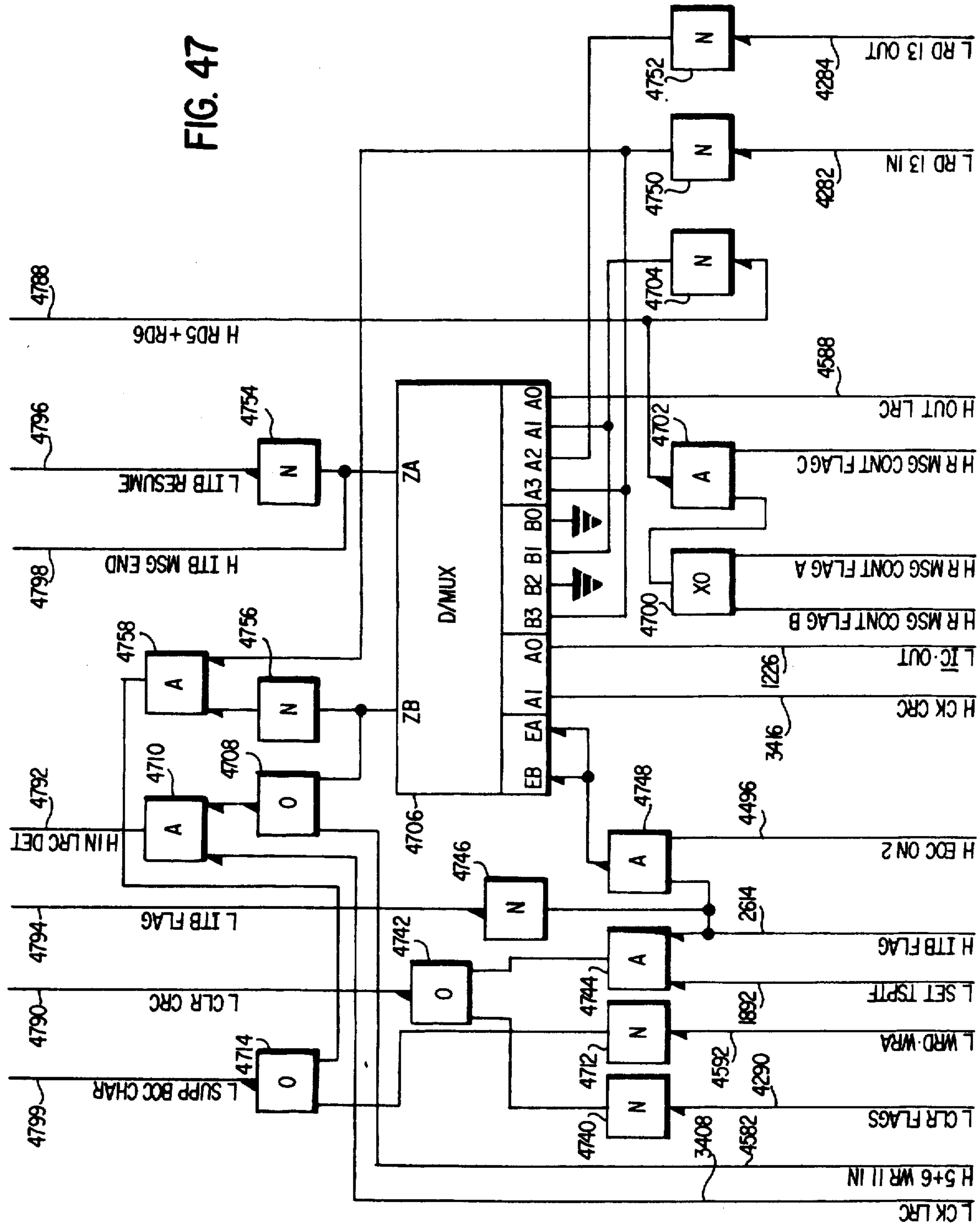

In those instances where a block check character, whether LRC or CRC, is to be suppressed, both inputs to AND 4516 will be at a high level and it will produce the low level output signal WRD.WRA. In FIG. 47, this signal is passed through NOT 4712 and OR 4714 to become the signal SUPPRESS BCC character. In FIG. 9, this signal blocks AND 909. In FIG. 11, the signal passes through OR's 1100 and 1101 to become the signal SUPPRESS CHARACTER.

In FIG. 45, AND 4520 produces a high level output signal to inhibit an output request under certain conditions. If AND 4516 produces a low level output signal it enables OR 4522 to produce a high level input to AND 4524. OR 4522 is also enabled by either of the signals EOM A or RD 5 + RD 6. AND 4524 is further enabled at EOC ON 2 time when a line is operating in the output mode. The output of AND 4524 enables one input of AND 4520 and, if the Z0 output of D/MUX 4512 is at the low level and 4520 produces the signal INHIBIT OUTPUT REQUEST. This signal is applied to FIG. 24 where it controls the writing of the DATA REQUEST 01 bit into the Main Memory.

CRC CHECKING

The CMM includes means for performing any one of several cyclic redundancy checks on a given line. Common circuitry is used for performing the checks for all lines but it is not necessary that each line be programmed to perform the same check. The cyclic redundancy check involves the use of the same storage area of memory as the longitudinal redundancy check hence the two checks cannot be programmed to take place at the same time for a given line.

Referring first to FIGS. 1*a* and 1*b*, sixteen bits of each word in Main Memory 110 are utilized to store intermediate values as the cyclic redundancy check progresses on a message. Of the 16 bit positions, eight positions are alternatively utilized in the computation of an LRC and another eight bits are alternatively utilized as an asynchronous clock pulse generator, this latter features not being a part of the present invention. For purposes of performing the cyclic redundancy check, the LRC area serves as a storage area for the 8 high order bits of the CRC character being computed and the asynchronous clock pulse generator area serves as the storage area for the 8 low order bits.

Briefly, the generation of the cyclic redundancy check character comprises a sequence of steps wherein the contents of the LRC/CRC area of Main Memory are read out, shifted to the right one position, and restored in memory. In addition, if bit 01 of the Assembly/Disassembly area is not equal to the low order bit of the LRC/CRC area a polynomial value is added modulo 2 to the output of the LRC/CRC area and the result is returned to the memory. The computation as it relates to the data character is carried out as the data character is shifted right in the Assembly/Disassembly area, thereby bringing each bit of a data character into the 01 bit position.

Figure 37:
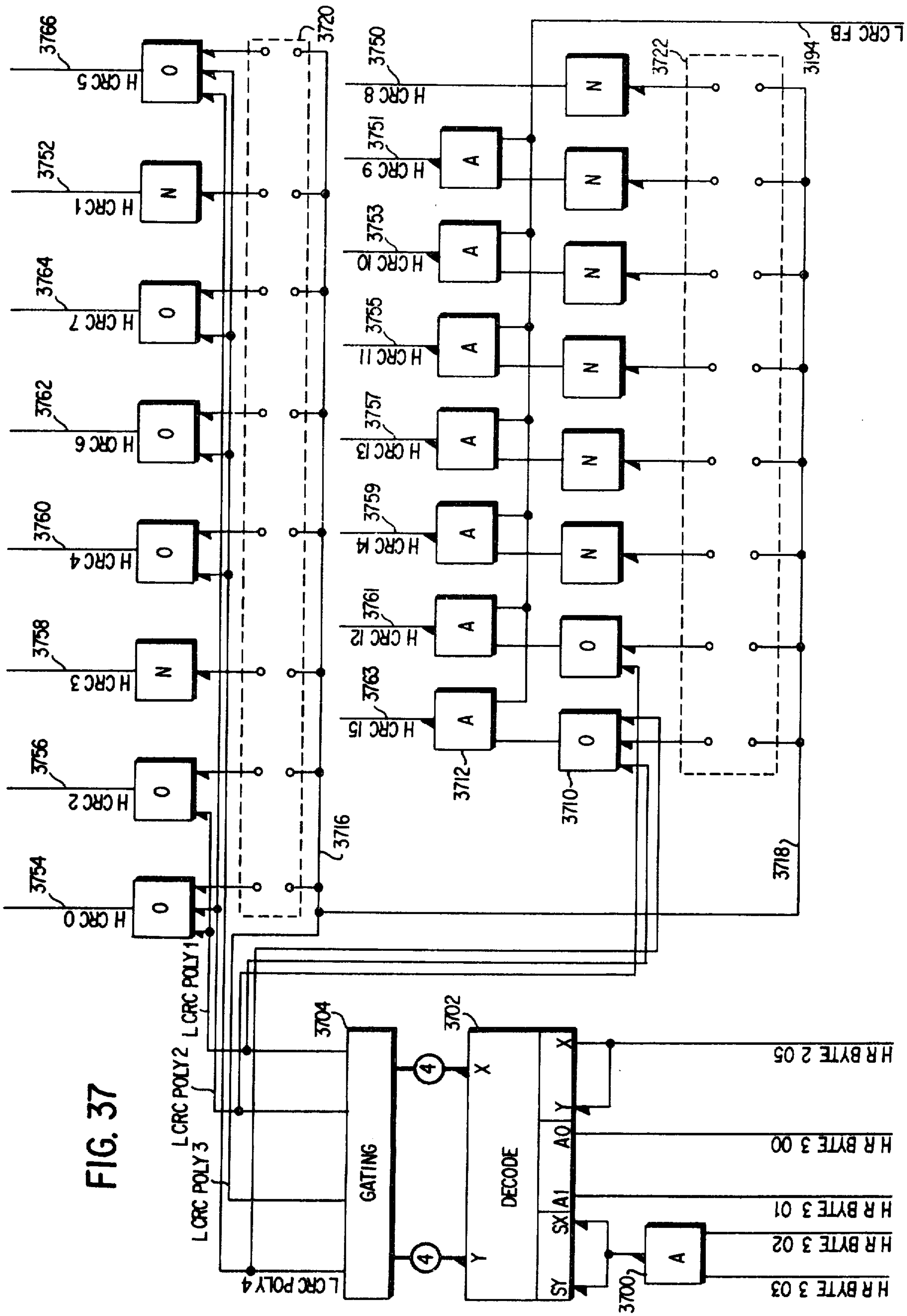
FIG. 37 shows the CRC polynomial generator.

As previously shown in connection with the format of Byte 3, one of four polynomial values may be selected depending upon the value set into Byte 3 and into Byte 2 bit 05. In FIG. 37, Byte 3 bits 02 and 03 must both be at the high level and condition AND 3700 to enable the SX and SY inputs of a decoder 3702. The signal R Byte 2 05 is applied to the X and the Y inputs of the decoder and, depending upon the addressing input signals to the decoder one of four X outputs and one of four Y outputs from the decoder will be enabled. The addressing inputs to the decoder are bits 00 and 01 of Byte 3. The outputs from the decoder 3702 are applied to a gating circuit 3704 which produces one of the four signals CRC POLYNOMIAL 1 through CRC POLYNOMIAL 4. The signal POLYNOMIAL 1 is applied to an OR 3706 to produce the signal CRC 2, to an OR 3708 to produce the signal CRC 0 and to an OR 3710 having an output connected to an AND 3712. This AND is further enabled when the signal CRC FEEDBACK is at a high level and produces the signal CRC 15.

The signals POLYNOMIAL 2 and 4 are generated in a similar manner and a detailed description is believed unnecessary. When CRC POLYNOMINAL 3 is selected, the signal on leads 3716 and 3718 drops to the low level and a programmer may select any polynomial he wishes merely by connecting leads 3716 and 3718 to the inputs of selected OR gates or NOT's. This is done by means of plug wires or jumper connections in the plug boards 3720 and 3722.

The cyclic redundancy check is started when a character is sensed that causes the CI Tables to produce the signal CI 04. In FIG. 11 this becomes the high level signal START CRC/LRC. It is applied to FIG. 40 where it passes through OR 4000 and NOT 4002 to enable one input of AND 4004. In FIG. 34 the checking mode decoder produces the low level signal LRC + CRC that is applied to FIG. 39 where it is inverted by NOT 3916 to become the high level signal LRC + CRC. This latter signal is applied to a second input of AND 4004. If the signal ITB FLAG is high, and if Message Control Flag B is not set, AND 4004 produces the low level signal START. The START signal is applied to FIG. 41 where it enables one input of AND 4126. If the START character is to be excluded from the check, the signal R Byte 3 04 is at the low level so AND 4126 produces a high level output signal that passes through OR 4128 to become the signal EXCLUDE.

The START signal produced at the output of AND 4004 is passed through OR 4006 to become the signal SET B. In FIG. 39, this signal is applied to AND 3900 and with the signal EOC ON 2 time blocks one input of OR-AND Inverter 3902. The AND-OR Inverter 3902 produces a high level output signal to set Message Control Flag B thereby indicating that the message is started, a BCC is being computed, and this character is to be excluded from the BCC. See the table given above for the message control flags.

Assuming that the start of message character is not to be excluded from the CRC computation, the output of OR 3910 will be at the low level thus enabling one input of OR-AND Inverter 3908. The right side of the OR-AND Inverter is enabled at EOC ON 2 time by the output of AND 3918. Message Control Flag C will be off at this time to enable ANDS 3926 and 3928. If the port is programmed for output operation then the signal STORAGE TO DISASSEMBLY would enable AND 3926. On the other hand, if the port is programmed for an input operation the signal ASSEMBLY TO STORAGE enables AND 3928. The output from one of the ANDs passes through OR 3924 and AND 3918 to the OR-AND Inverter 3908 to become the signal WRITE MESSAGE CONTROL FLAG A. As shown for the table of flag values given above, the circuits are set up for computing a BCC when the flags D–A have the values 0011.

Figure 38:
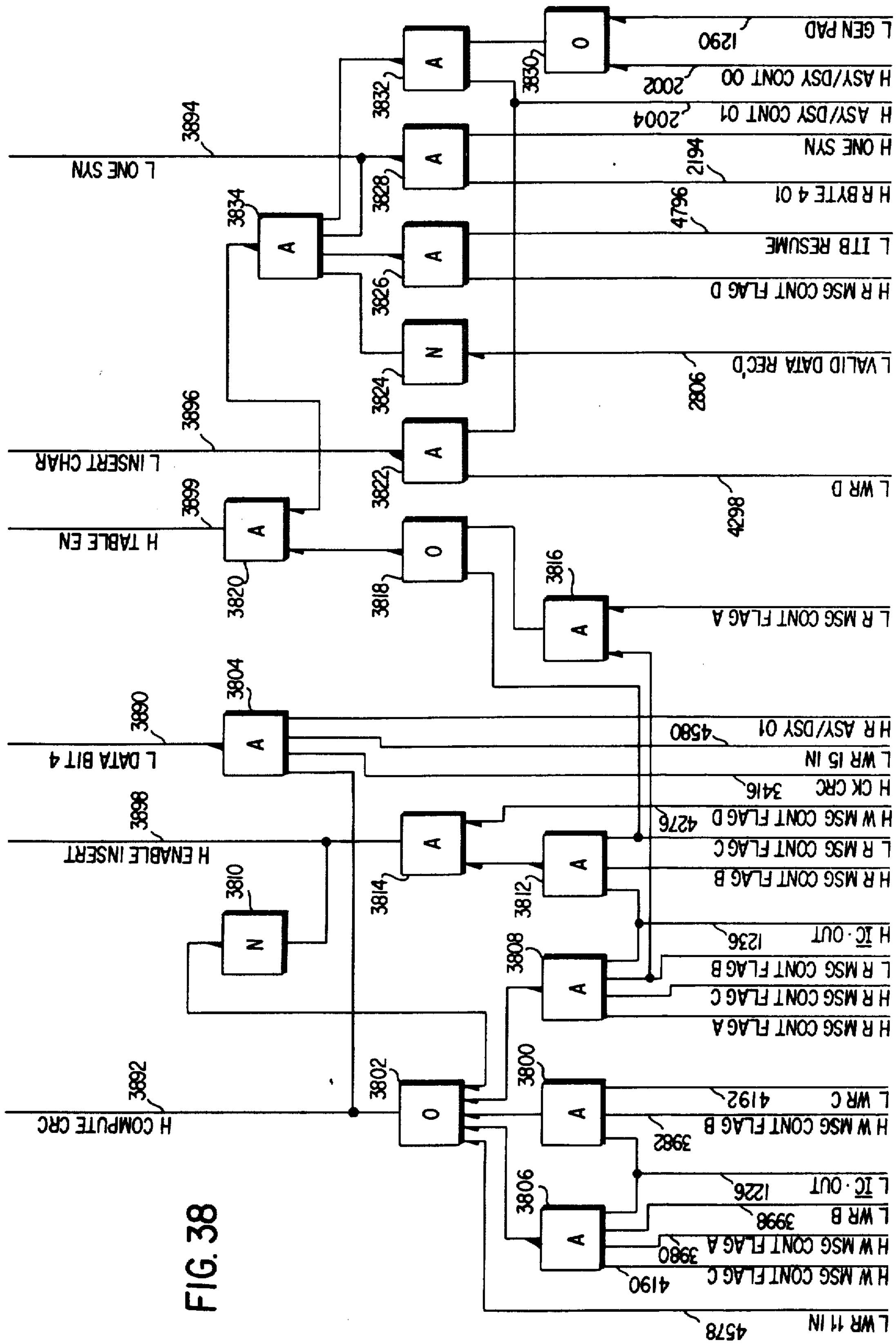

In FIG. 38, and assuming an input operation, the signal WRITE MESSAGE CONTROL FLAG B will be at a high level every data clock while the signal WR C will also be at a high level. AND 3800 will therefore produce an output signal that passes through OR 3802 to become the signal COMPUTE CRC. The output of OR 3802 is applied to one input of AND 3804. This AND has two further inputs which are enabled by the signals CHECK CRC and WR 15 IN which are at a high level while the CRC is being computed. The fourth input to AND 3804 is the signal R ASSEMBLY/DISASSEMBLY 01 which is at a high level each time a 1 bit appears in bit position 01 of the Assembly/Disassembly area of the Main Memory.

The circuits for controlling the writing into the CRC/LRC area and the CRC/ASYNCHRONOUS COUNTER area of the memory during a CRC computation are shown in FIG. 44. The COMPUTE CRC signal on lead 3892 is applied to one input of AND-OR Inverter 4406. During a CRC operation the decoding circuits of FIG. 34 produce the signal CHECK CRC which enables one input of an AND 4408. At each data clock time AND 4408 produces an output signal that passes through AND-OR inverter 4406 to ORs 4404 and 4410. The output of OR 4404 is the signal WRITE ENABLE CRC/LRC while the output of OR 4410 is the signal WRITE ENABLE CRC/ASYNCHRONOUS COUNTER. These signals ae applied to D/MUX's like D/MUX 500 and at time TP 13–14 they generate an enabling signal to enable the writing into the CRC/LRC and CRC/ASYNCHRONOUS COUNTER areas of the Main Memory.

It should be noted that the signals COMPUTE CRC, BIT 4, WRITE ENABLE CRC/LRC, and WRITE ENABLE CRC/ASYNCHRONOUS COUNTER are produced only on minor cycles when a data clock occurs.

Figure 31:
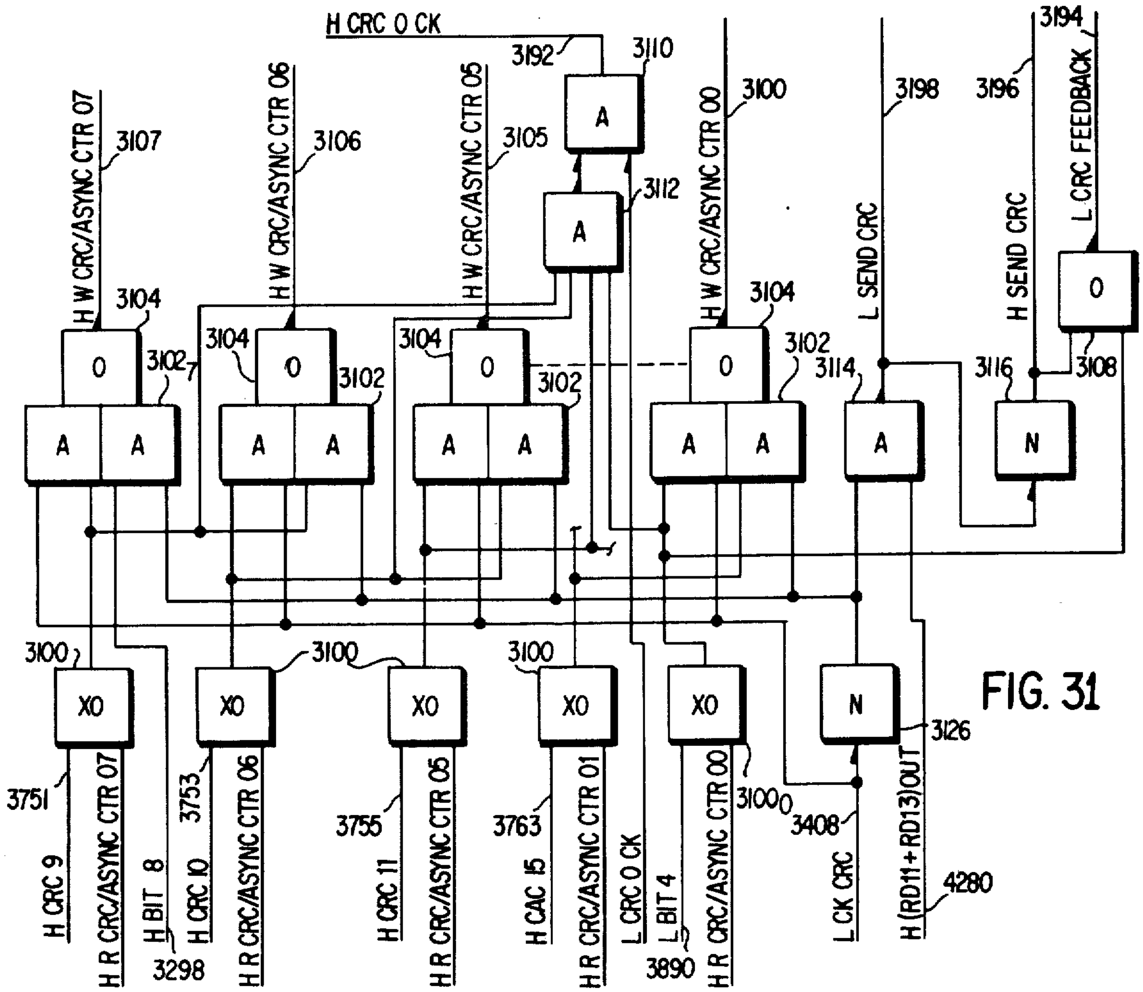
FIGS. 31, 32 and 33 show the CRC and LRC checking circuitry.

Referring now to FIGS. 31–33, the CRC/LRC and CRC/ASYNCHRONOUS COUNTER areas of the Main Memory are initially clear. The output from the CRC/LRC area, as derived from the Holding Register 112, is applied to the Exclusive ORs 3210 while the value in the CRC/ASYNCHRONOUS COUNTER area, again derived from the holding register 112, is applied to a set of Exclusive ORs 3100. There are 8 Exclusive ORs 3100, only five of which are shown in FIG. 31. The polynomial value generated in FIG. 37 is applied to FIGS. 31–33 as follows. CRC 0 is applied to AND-OR inverter 3352. CRC 1–8 are applied to ANDs 3208 of the AND-OR Inverter 3200. Bits CRC 9–15 are applied to the Exclusive ORs 3100.

At each data clock time the bit in Assembly/Disassembly area position 01 is compared with but 00 of the CRC/ASYNCHRONOUS COUNTER area and if the two bits are unequal the CRC polynomial is added, modulo 2, to the contents of the CRC/LRC and CRC/ASYNCHRONOUS COUNTER areas and the result returned to those areas with a shift of one position to the right. In FIG. 32, the signal CRC FEEDBACK will be at a high level to gate the bits CRC 1 through CRC 8 through the ANDs 3208 of AND-OR Inverters 3200 and the outputs of the AND-OR Inverters are compared with CRC/LRC 07 through 00 at Exclusive ORs 3210. The outputs of these Exclusive ORs are the signals DATA BIT 0 through DATA BIT 7 and these signals are applied to ANDs 3350 at the input of AND-OR Inverters 3302. The signal CHECK CRC will be at the low level so the output of OR 3306 enables ANDs 3350 so that data bits 5 through 0 are passed through the AND-OR Inverters with an effective shift of one position to the right. The output of the AND-OR Inverters is then written into the CRC/LRC area, bit positions 05–00.

Data bit 6 is gated through the position 5 AND-OR Inverter 3302 so as to enter CRC/LRC 05. Data bit 7 passes through the A3 input of D/MUX 3308 to the output ZA and from there it passes through NOT 3310 to become the signal WRITE CRC/LRC 06. This shifts bit 7 into bit position 6 of CRC/LRC area.

The signal CRC FEEDBACK is applied to FIG. 37 and gates out the other half of the CRC polynomial to FIG. 31 where it is added modulo 2 to the output of the CRC/ASYNCHRONOUS COUNTER area, the addition taking place at Exclusive ORs 3100. The outputs of Exclusive ORs 3100 are applied to ANDs 3102 of AND-OR Inverters 3104, the connections being such that an effective shift of one position to the right is obtained as the outputs of the Exclusive ORs are passed through the AND-OR Inverters. AND-OR Inverter 3104 receives the signal BIT 8 which is derived from the right-most Exclusive OR 3210 in FIG. 32. This provides for right shifting between the CRC/LRC and CRC/Asynchronous counter areas.

The AND inputs 3102 of AND-OR Inverters 3104 are further enabled by the output of NOT 3106 since the signal CHECK CRC on lead 3408 will be at the low level. The outputs of AND-OR Inverters 3104 are the signals WRITE CRC/ASYNCHRONOUS COUNTER 07–00 which are applied to the CRC/ASYNCHRONOUS COUNTER area of the Main Memory.

If at any data clock Assembly/Disassembly bit 01 is equal tO CRC/ASYNCHRONOUS COUNTER bit 00, then the value in the CRC/LRC and CRC/ASYNCHRONOUS COUNTER areas is shifted to the right without a CRC polynomial value being added thereto. In this case Exclusive OR 3100 produces a high level output signal that passes through OR 3108 to become the low level signal CRC FEEDBACK. In FIG. 32 this signal blocks AND's 3208. In FIG. 33 it blocks the CRC 0 bit applied to AND-OR Inverter 3352. Finally, in FIG. 37 the low level signal CRC FEEDBACK blocks the AND's which generate the CRC polynomial bits 9–15.

At the end of a message the operation of the CMM varies depending upon the conditions which are setting message control flags A–B. Assume first the condition of an input with calculation of CRC. At the end of a message if the conditions are such as to set message control flags C and D, then the CCM checks the CRC, and issues a message end signal. In FIG. 45, the signal $\overline{IC}$·OUT is at the low level and enables the Y input of decoder 4506. The signal WRITE MESSAGE CONTROL FLAG B is at the low level while the signal WRITE MESSAGE CONTROL FLAG C is at the high level. The signal WR D is at the low level to enable the SY input of the decoder. A low level output signal is produced at the Y2 output of the decoder and this signal passes through OR 4530 to the B2 input of D/MUX 4512. The high level signal CHECK CRC addresses the D/MUX so that the B2 input is passed through to the ZB output and from there through Exclusive OR 4514 to become the signal MESSAGE END.

The Y2 output of decoder 4506 becomes the signal WR 15 IN on lead 4580 and is passed through a NOT 4532 to become the signal INPUT CRC DETECTED.

The signal INPUT CRC DETECTED is applied to FIG. 36 where it enables one input of AND 3620. The signal WR 15 IN is applied to FIG. 38 where it blocks AND 3804.

At this time the CRC/LRC area and the CRC/ASYNCHRONOUS COUNTER area of the memory should contain all zeros if the incoming message contains no errors. In FIG. 33, AND 3360 senses the 8 data bits from the LRC area and, if they are all zeros, it produces a low level output signal that is applied to AND 3110. If all bits of the CRC/ASYNCHRONOUS COUNTER area are zero then all inputs to AND 3112 are enabled and it produces and output signal to further enable AND 3110. The AND produces the high level output signal CRC O CHECK indicating that no error has occurred in the preceding message. This signal is applied through NOT 3622 to AND 3620 and blocks the AND. If an error had occurred in the message then the signal CRC 0 CHECK would be at a low level and would pass through AND 3620 to generate a DATA ERROR signal.

At the end of a message in the CRC output mode the CMM may send CRC 1, CRC 2, a pad, or merely generate a message end and clear. As used here, CRC1 and CRC2 refer to the two 8-bit bytes of the 16 bit calculated CRC character.

Consider first the case where CRC 1 is sent. In FIG. 42, the signal $\overline{IC}$·OUT enables the X input of decoder 4206. Flag D is set at this time to enable the SY input while flags B and C are set. The low level output from X0 passes through OR 4208 to become the signal (RD 11 + RD 13) OUT. In FIG. 31 this signal enables AND 3114 which is further enabled by the output of NOT 3106 because the signal CHECK CRC is at the low level. AND 3114 produces the low level signal SEND CRC which is inverted at NOT 3116 to become the high level signal SEND CRC. The output of NOT 3116 is passed through OR 3118 to inhibit the generation of the CRC polynomial during the sending of the CRC character.

In FIG. 35, the signal SEND CRC enables one input of AND-OR Inverter 3530 and the second input receives the CRC/ASYNCHRONOUS COUNTER 00. In FIG. 44, the signal CRC enables one input of AND-OR Inverter 4406. At each data clock time the AND-OR Inverter is further enabled by the output of AND 4408 and produces a low level output signal that passes through OR's 4410 and 4404 to generate the signals WRITE ENABLE CRC/ASYNCHRONOUS COUNTER and WRITE ENABLE CRC/LRC. This enables the reading out of the CRC character once each major cycle with the character being returned to the CRC area of Main Memory with a shift of one position to the right. The low order bit of the CRC/ASYNCHRONOUS COUNTER area passes through AND-OR inverter 3530 and is transferred to the output data line through the circuits shown in FIG. 3.

As the first half of the CRC character is transferred out to the line adapter, the second half of the CRC character has been shifted into the CRC/ASYNCHRONOUS counter area of the memory.

Figure 40:
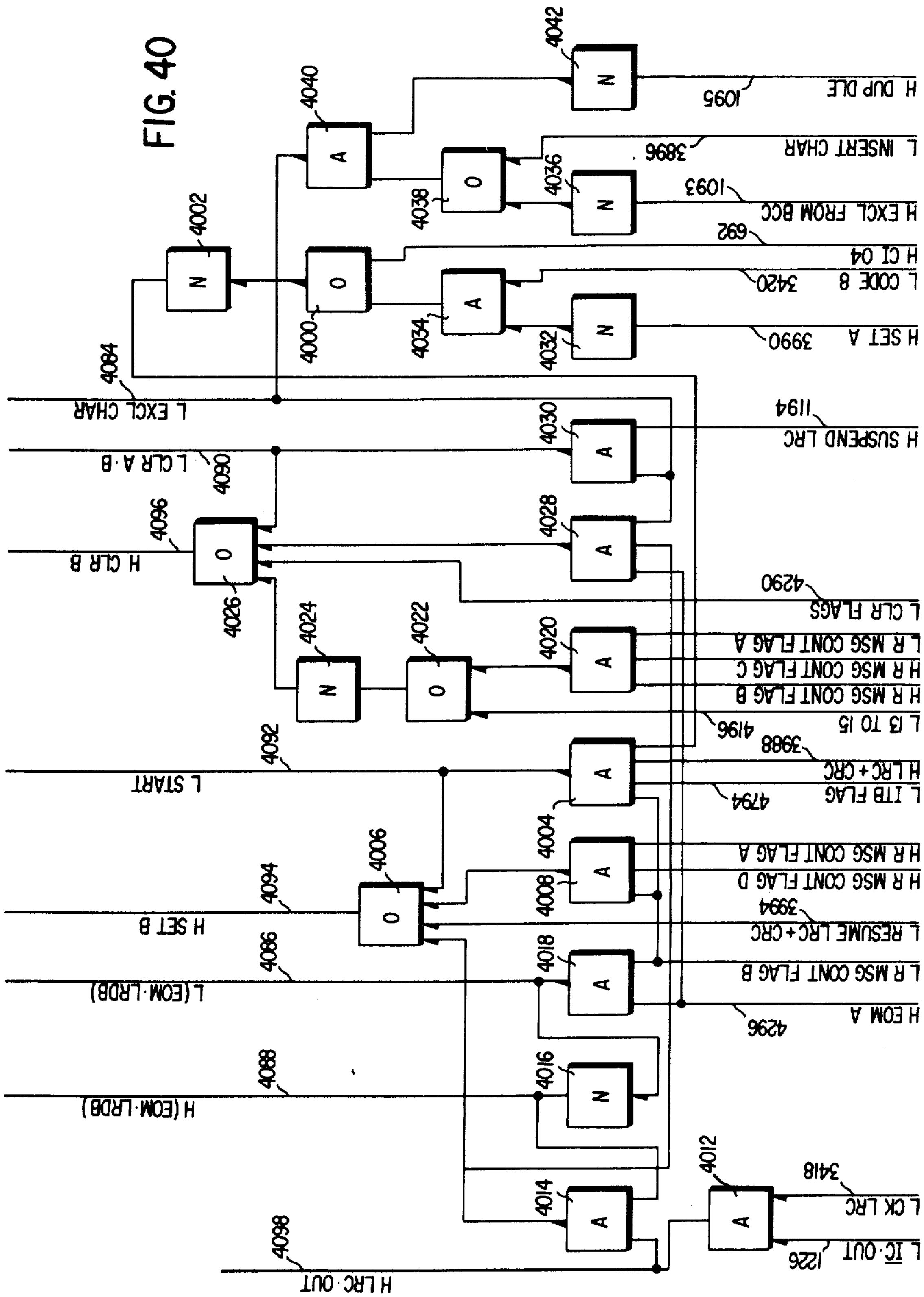

As soon as the first half of the CRC character has been transferred out, the second half may be transferred if the Message Control Flags D–A are properly set. In FIG. 40, AND 4008 is enabled since message control flags A and D are set and message control flag B is not set. The output of AND 4008 passes through OR 4006 to become the set B signal that is applied to AND 3900. At EOC ON 2 time AND 3900 blocks one input of AND-OR inverter 3902. The signal CLEAR B will be at the low level so AND-OR Inverter 3902 produces the high level signal WRITE MESSAGE CONTROL FLAG B. The signal is passed through OR 3904 to become the low level signal WR B. One major cycle later the decoder 4206 again causes OR 4218 to produce the signal (RD 11 + RD 13) OUT. This time, because Message Control Flag B is set, it is the X1 output of the decoder which produces a signal. During the next 8 major cycles one bit at a time is again transferred from CRC/ASYNCHRONOUS COUNTER 00 to the line adapter, this operation taking place in the same manner as for the first half of the CRC character.

At the end of a message, a message end may be generated without transferring the CRC character, if Message Control Flags A, B, C and D are all set. In FIG. 41 all inputs to AND 4132 will be at the high level and it produces an output signal that passes through NOT 4134, or 4136, OR 4122, and AND 4122, now enabled by the EOC ON 2 signal, to enable one input of OR-AND Inverter 4100. All inputs to OR 4104 are at the high level and it enables the second input of OR-AND Inverter 4100 so that it produces the high level signal WRITE MESSAGE CONTROL FLAG C.

In FIG. 45, the SX, SY, A1, and A0 inputs of decoder 4506 are all enabled and the decoder receives the high level signal $\overline{IC}$·OUT. The resulting low level output from the X3 output terminal of decoder 4506 passes through OR 4530 to the B2 input of D/MUX 4512. The D/MUX is receiving a high level signal at addressing input A1 so the B2 input of the D/MUX is gated through to the ZB output and from there through Exclusive OR 4514 to become the signal MESSAGE END.

If, at the end of the message, the message control flags D–A have the value 1101, then a pad is inserted rather than transmitting the CRC character. In FIG. 45, the SX and A0 inputs of decoder 4506 will be receiving low level signals while the X and A1 inputs are receiving high level signals. Therefore, a low level output signal from the X2 output of the decoder is applied to the A2 input of D/MUX 4512. Since the D/MUX is being addressed only by the high level signal CHECK CRC applied to its A1 input, the signal at the A2 input is passed through to the ZA output and from there through NOT 4518 to become the high level signal INSERT PAD.

STARTING AND ENDING CONVENTIONS

In view of the large number of possible variations in the operation of the CMM, depending upon the programming set into certain control bits, no attempt will be made to trace through the circuits for all of these possibilities. However, the following conventions are employed and will assist in following through the logic circuits.

For block check character (BCC) computation Byte 3 bit 04 specifies whether or not the start character is included in the summation. The message end character will be included in the BCC summation unless bit 8 in the CI table is set for that character. For CRC computation in either the BSC or ASCII transparent mode, the following convention is employed. The CRC generation is started by the first appearance in a message of transmission block of either the sequence DLE SOH or DLE STX. The CRC generation is stopped by the appearance of any of the sequences DLE ETB, DLE ETX, or DLE ITB. The following table designates what is included in the CRC generation. All characters not shown in the table are included in the CRC generation.

| Sequence | Yes | No |
|---|---|---|
| DLE SYN | — | DLE SYN |
| DLE SOH | — | DLE SOH |
| DLE STX* | — | DLE STX |
| DLE STX** | STX | DLE |
| DLE STX*** | DLE STX | — |
| DLE ETB | ETB | DLE |
| DLE ETX | ETX | DLE |
| DLE DLE | DLE(ONE) | DLE(Other) |
| DLE ITB | ITB | DLE |

*If not proceeded within the same block by transparent heading information. This could be either no heading at all or a non-transparent heading.
**If preceded within the same block by transparent heading information.
***If preceded by ITB CRC when operating in the BSC mode.

The CMM is capable of handling the transmission of messages or sequences which are embedded into another transmission, without including the embedded message in the BCC accumulation for that transmission. This applies only to the LRC check and not to the CRC check. This is accomplished by setting bit CI 08 in the CI table.

A requirement of transparent operation is the insertion of an additional DLE everytime a DLE is found in the text. This does not apply to the starting and ending control sequences. An end condition flag is transmitted to the CMM to control the insertion. Reception of this flag indicates to the CMM that it is to stop insertion of extra DLE's immediately. This includes a pending insertion for a DLE received one character earlier. Any following DLE's will not be duplicated again until the ending characters have been sent and a new output transmission is begun.

The rules for transparent operation are as follows. Starting characters, either DLE STX or DLE SOH, must come from the host computer. If DLE STX is used, DLE ENQ, DLE ETX, DLE ETB, DLE ITB may be used to terminate that block. If DLE SOH is used, DLE STX terminates the header block and starts the data block. All ending sequences, including DLE STX when so used, DLE ETX, DLE ETB, DLE ITB and DLE ENQ must come from the host computer.

The CMM operates in the following manner. The first DLE and the following character, either STX or SOH, are transmitted without change. Any additional DLE's are transmitted as soon as they are read. Whether another DLE will be inserted depends on whether the flag is received with the next character. If it is present, no more duplicate DLE's are sent.

When the flag is set, the CMM has to decode the associated character. If an STX is sent, the CMM makes adjustments in the CRC accumulation and prohibits transmission of the CRC at that time. In this case the CMM returns to the state where it sends duplicate DLE's after the DLE STX has been transmitted. If ENQ follows a DLE, transmission is terminated without the transmission of the CRC. When ETX or ETB follows DLE, the CRC accumulation is sent, followed by termination. When ITB follows DLE, the CRC accumulation is sent but there is no termination. In this case again, the CMM returns to sending duplicate DLE's after the DLE STX has been transmitted. This case is different however since transmission of both DLE ITB and DLE STX must be covered by the end condition flag. If no DLE STX follows the DLE ITB, non-transparent operation is resumed.

STATUS ONE

FIG. 26 shows the logic circuits for setting Status 1, Bits 04–07. If any of these status bits is set, OR 2620 is enabled to generate the high level output signal WRITE ENABLE STATUS 1. In FIG. 24, this signal passes through AND-OR Inverter 2444 and OR 2450 to generate the STATUS 1 REQUEST signal which requests priority for the port. The output of AND-OR Inverter 2444 is the signal IC + WRITE ENABLE STATUS 1. This signal is applied to FIG. 23, where it passes through OR 2330 to generate the PERMIT PRIORITY REQUEST signal. In FIG. 25, the PERMIT PRIORITY REQUEST signal passes through AND 2500 and OR 2502 to generate the signal WRITE ENABLE REQUEST. This latter signal is applied to Multiplexer 508 to generate the ENABLE 7 signal which enables the writing of the request bit into the Status 1 area of Main Memory at time TP 13–14.

Status is set by the MESSAGE END signal which passes through NOT 2632 and OR's 2634 and 2638. Status 1 04 is also set upon occurrence of the signal ABORT which passes through OR's 2634 and 2638.

Status 1 05 is also set by the ABORT signal which passes through OR's 2608 and NOT 2612. Status 1 05 and Status 1 06 are both set if the signal ASSEMBLY TO STORAGE should occur while either of the bits DATA REQUEST 00 and DATA REQUEST 01 is set. The request signals are applied to OR 2602 whose output is inverted at 2604 to enable AND 2600. The ASSEMBLY TO STORAGE signal further enables AND 2600. The output of AND 2600 passes through OR 2606 and NOT 2610 to set Status 1 06 and passes through OR 2608 and NOT 2612 to set Status 1 05.

Status 1 07 is set by the output of OR 2640 upon occurrence of either of the signals MONITOR and ITB MESSAGE END.

While the foregoing description describes the input and output sequences for synchronously operating ports, it should be understood that it is within the scope of the present invention to provide for asynchronous operation of any or all ports. Further modifications of the invention, falling within the scope of the appended claims, will be obvious to those skilled in the art.

The embodiments of the invention in which an exclusive property or privilege are claimed is defined as follows:

1. In a communications multiplexer module for transferring digital data between a data processor and a plurality of line adapters, said multiplexer module including an addressable memory having a plurality of storage locations for storing a plurality of control words, one control word being associated with each line adapter, a register connected to said memory for receiving and storing one control word at a time, time shared logic circuit means responsive to said register for modifying control words received therefrom and applying them to said memory, and means for addressing said memory to sequence said control words one at a time in a predetermined sequence into said register and back into their storage locations through said time shared logic circuit means, the improvement comprising:

first means for generating signals representing increments of time;

second means for generating signals indicating the occurrence of starting and ending conditions;

each control word having a first field defining a time count and a second field defining a timing interval limit and the conditions for starting and ending said timing interval;

counter means connected to said register, said first means, and said second means for applying incremented timer counts to said memory;

said counter means including means responsive to the first and second fields of a given control word in said register for applying an incremented timer count to the first field of a control word location in said memory if said first means is generating a signal and said second means has produced a signal indicating the occurrence of a starting condition corresponding to the starting condition defined by said second field but has not produced a signal indicating the occurrence of an ending condition corresponding to the ending condition defined by said second field.

2. The improvement as claimed in claim 1 wherein said second field in some of said control words defines different starting or ending conditions from the second field in other of said control words.

3. The combination as claimed in claim 1 wherein the second fields in said control words define different timing intervals.

4. The improvement as claimed in claim 3 and further comprising comparing means connected to said register for comparing the first field in a control word with the portion of the second field of the same control word that defines a timing interval limit, and means for producing an output signal if the compared portion of the second field is equal to the first field of the same control word.

5. The improvement as claimed in claim 1 wherein the second field of each control word includes a rate indication indicating the rate at which the first field is to be incremented, said counter means including gating means connected to said register and responsive to said rate indication for selectively inhibiting the signals representing increments of time.

6. The improvement as claimed in claim 5 wherein said gating means is connected to said register to respond to the first field in a control word to increment the first field of said control word at different rates over an interval of time defined by the second field of the same control word.

7. The improvement as claimed in claim 4 wherein said second field of one control word defines the starting condition as being that where the associated line adapter is on, and defines the ending condition as being the detection of a SYN character being transferred between the communications multiplexer module and said associated line adapter.

8. The improvement as claimed in claim 4 wherein said second field of one control word defines the starting condition as the detection of an end of message character being transferred from the communication multiplexer module to the associated line adapter, and defines the ending condition as the detection of an input start character from the associated line adapter to the communication multiplexer module.

9. The improvement as claimed in claim 4 wherein said second field of one control word defines the starting condition as the detection of an input start character transferred to the communication multiplexer module from the associated line adapter, and defines the ending condition as the detection of an input end character transferred to the communication multiplexer module from the associated line adapter.

10. The improvement as claimed in claim 4 wherein the second field of a control word includes a control bit which may be set or reset, and when set defines the starting condition and when reset defines the ending condition, each said control word having a storage field for temporarily storing characters of a message as they are transferred one at a time through the communication multiplexer module to the line adapters, and means for setting or resetting said one control bit each time a character is transferred through the communication multiplexer module.

* * * * *